(12) United States Patent
Sinclair et al.

(10) Patent No.: US 12,416,064 B2
(45) Date of Patent: Sep. 16, 2025

(54) SYSTEMS AND METHODS FOR SELECTIVE RECOVERY OF METALS FROM ION EXCHANGE RESINS

(71) Applicants: CF Technologies, Inc., Hyde Park, MA (US); Battelle Energy Alliance, LLC, Idaho Falls, ID (US)

(72) Inventors: Laura Katherine Sinclair, Boston, MA (US); Robert Vincent Fox, Idaho Falls, ID (US); John M. Moses, Milton, MA (US); Jessica Lee Sweeney, Dedham, MA (US); Mary Ellen Case, Idaho Falls, ID (US); Justin Ernesto Gonzalez, Boston, MA (US)

(73) Assignees: CF Technologies, Inc., Hyde Park, MA (US); Battelle Energy Alliance, LLC, Idaho Falls, ID (US)

( * ) Notice: Subject to any disclaimer, the term of this patent is extended or adjusted under 35 U.S.C. 154(b) by 864 days.

(21) Appl. No.: 17/006,776

(22) Filed: Aug. 28, 2020

(65) Prior Publication Data

US 2021/0062296 A1    Mar. 4, 2021

Related U.S. Application Data

(60) Provisional application No. 62/922,800, filed on Aug. 29, 2019.

(51) Int. Cl.
*C22B 3/42* (2006.01)
*B01D 15/20* (2006.01)
(Continued)

(52) U.S. Cl.
CPC .............. *C22B 3/42* (2013.01); *B01D 15/203* (2013.01); *B01D 15/362* (2013.01);
(Continued)

(58) Field of Classification Search
CPC ......... C22B 3/42; C22B 59/00; B01D 15/203; B01D 15/362; B01D 15/426;
(Continued)

(56) References Cited

U.S. PATENT DOCUMENTS 2,366,007 A * 12/1944 Gaetano .................... C08F 8/36
525/353
5,340,474 A    8/1994 Kauvar
(Continued)

FOREIGN PATENT DOCUMENTS

| CA | 683998 A | * | 7/1964 | |
|----|----------|---|--------|---|
| JP | S63-304163 A | | 12/1988 | |
| WO | WO2018/085234 A1 | * | 5/2018 | ............... C22B 7/00 |

OTHER PUBLICATIONS

Achuthan et al. Ion Exchange Separation of Eu(III), Th(IV), U(VI), and Pu(IV) ions on Amberlyst A-15 in non-aqueous Solutions, Journal of Radioanalytical and Nuclear Chemistry, vol. 141, No. 1 (1990) pp. 171-178 (Year: 1990).*

(Continued)

*Primary Examiner* — Danielle M. Carda

(57) ABSTRACT

Systems and methods for selectively recovering a target metal from an ion exchange resin are generally described. In certain embodiments, such methods and systems can be employed for metal purification and enrichment of target metal species from mixtures containing contaminating or non-target metals. In some embodiments, ion exchange is accomplished in the presence of one or more species that facilitate the recovery of a metal from a composition further comprising one or more other metals. The recovered metal-containing composition may contain the recovered metal at relatively high purity and/or in relatively large amounts. In some embodiments, the conditions present during ion exchange are varied in a manner that facilitates the enrichment of a metal from an initial (e.g. sample) composition (Continued)

further comprising one or more other metals to result in a product that contains the enriched metal at relatively high purity and/or in relatively large amounts.

25 Claims, 38 Drawing Sheets

(51) Int. Cl.
| | |
|---|---|
| B01D 15/36 | (2006.01) |
| B01D 15/42 | (2006.01) |
| B01J 39/04 | (2017.01) |
| B01J 39/20 | (2006.01) |
| B01J 47/02 | (2017.01) |
| B01J 49/06 | (2017.01) |
| B01J 49/53 | (2017.01) |
| C22B 59/00 | (2006.01) |

(52) U.S. Cl.
CPC ............ *B01D 15/426* (2013.01); *B01J 39/04* (2013.01); *B01J 39/20* (2013.01); *B01J 47/02* (2013.01); *B01J 49/06* (2017.01); *B01J 49/53* (2017.01); *C22B 59/00* (2013.01)

(58) Field of Classification Search
CPC ............ B01D 11/0292; B01D 11/0219; B01D 11/0288; B01D 11/0203; B01J 39/04; B01J 39/20; B01J 47/02; B01J 49/06; B01J 49/53; B01J 39/05; B01J 39/07; B01J 39/26; B01J 45/00; B01J 49/60; Y02P 10/20; G21G 1/02; G21G 2001/0094; G21F 9/12
USPC .......................................................... 75/711
See application file for complete search history.

(56) References Cited

U.S. PATENT DOCUMENTS

| | | | |
|---|---|---|---|
| 5,651,883 | A | 7/1997 | Horwitz et al. |
| 5,851,401 | A | 12/1998 | Horwitz et al. |
| 6,187,911 | B1 | 2/2001 | Wai et al. |
| 6,248,797 | B1 | 6/2001 | Dias et al. |
| 6,716,353 | B1 | 4/2004 | Mirzadeh et al. |
| 9,816,156 | B2 | 11/2017 | Marx et al. |
| 10,533,239 | B2 | 1/2020 | Fox et al. |
| 2011/0277592 | A1 | 11/2011 | Cutler et al. |
| 2019/0054457 | A1 | 2/2019 | Xu et al. |

OTHER PUBLICATIONS

Dupont, Amberlyst 15 Product data sheet (Year: 2023).*
Xie et al. A critical review on solvent extraction of rare earths from aqueous solutions, Minerals Engineering (2014) (Year: 2014).*
Bio-Rad, AG 50W and AG MP-50 Cation Exchange Resins Instruction Manual, online pdf captured by Way back machine on Oct. 12, 2013 (Year: 2013).*
International Preliminary Report on Patentability (Chapter 1) for International Application No. PCT/US2020/048647 dated Mar. 10, 2022.
International Search Report and Written Opinion for International Application No. PCT/US2020/048647 mailed May 18, 2021.
Achuthan et al. Ion exchange separation of Eu(III), Th(IV), U(VI) and Pu(IV) ions on Amberlyst A-15 in non-aqueous solutions. J Radioanal Nucl Chem. Jul. 1990; 141:171-8. https://doi.org/10.1007/BF02060195.
Achuthan et al. Ion exchange studies of U(VI), Th(IV), Pu(IV) and Eu(III) on a macroreticular resin in TBP-Shell Sol-T solutions. J Radioanal Nucl Chem. Mar. 1989; 130:203-8. https://doi.org/10.1007/BF02037714.
Aslani et al. Lutetium-177 DOTATATE Production with an Automated Radiopharmaceutical Synthesis System. Asia Ocean J Nucl Med Biol. 2015;3(2):107-115.
Barkhausen et al. Production of n.c.a. $^{177}$Lu at FRM II for radiopharmaceutical applications. Technical University of Munich. https://www.rcm.tum.de/index.php?id=54&L=1 [last accessed Sep. 11, 2020].
Chen et al. Chromatographic Techniques for Rare Earth Elements Analysis. Phys Sci Rev. Jan. 20, 2016;2(4):1-35. https://doi.org/10.1515/psr-2016-0057. Epub Apr. 25, 2017.
Chetty et al. Ion exchange studies for the removal of plutonium and americium from organic liquid scintillator waste solution. Radiochim Acta. Sep. 24, 2009;94(12):807-13. https://doi.org/10.1524/ract.2006.94.12.807.
Colby, MU reactor plays important role in nuclear medicine advancements. Columbia Missourian. May 3, 2019. https://www.columbiamissourian.com/news/local/mu-reactor-plays-important-role-in-nuclear-medicine-advancements/article_0e4ddb74-6abd-11e9-a270-9b097blefaf8.html [last accessed Sep. 11, 2020].
Dash et al. Production of $^{177}$Lu for Targeted Radionuclide Therapy: Available Options. Nucl Med Mol Imaging. 2015;49(2):85-107. https://doi.org/10.1007/s13139-014-0315-z.
Dumont et al. Ion chromatographic separation of alkali metals in organic solvents. J Chromatogr A. Jul. 7, 1995;706(1-2):149-58. https://doi.org/10.1016/0021-9673(94)01119-Y.
Dvorakova. Production and Chemical Processing of $^{177}$Lu for Nuclear Medicine at the Munich Research Reactor FRM-II. Technical University of Munich. 2007:92 pages. Dissertation.
Galia et al. Transesterification of rapeseed oil over acid resins promoted by supercritical carbon dioxide. J Supercrit Fluids. Mar. 2011;56(2):186-93. https://doi.org/10.1016/j.supflu.2010.12.005.
Hennrich et al. Lutathera®: The First FDA- and EMA-Approved Radiopharmaceutical for Peptide Receptor Radionuclide Therapy. Pharmaceuticals. Jul. 29, 2019;12(3):114. https://dx.doi.org/10.3390%2Fph12030114.
Hung et al. Supercritical $CO_2$ extraction of molybdenum-ligand complexes from sulfuric solutions. J Supercrit Fluids. May 2016;111:97-103. https://doi.org/10.1016/j.supflu.2016.01.017.
Ju et al. Extraction of Co ions from ion-exchange resin by supercritical carbon dioxide. Green Nuclear Research Laboratory. 2005:2 pages.
Knapp, Jr. Lutetium-177—Broad Production Capabilities Are Expected to Stimulate Clinical Applications of This Important Therapeutic Radioisotope. Technical Meeting on Therapeutic Radiopharmaceuticals. IAEA. Nov. 16-20, 2009:42 pages.
Kuznetsov et al. Production of Lutetium-177: Process Aspects. Radiochemistry. Aug. 28, 2019;61:381-95. https://doi.org/10.1134/S1066362219040015.
Li et al. Development course of separating rare earths with acid phosphorus extractants: A critical review. J Rare Earth. May 2019;37(5):468-86. https://doi.org/10.1016/j.jre.2018.07.016.
Mayankutty et al. Ion exchange in organic solvents. J Radioanal Chem. Mar. 1979;54:113-22. https://doi.org/10.1007/BF02517767.
Paphiti et al. Comparative Dosimetric Evaluation on the course of PRRT using non carrier added LU-177 DOTATATE (i.a., i.v), non carrier added LU-177 DOTATOC (i.v.) and carrier added LU-177 DOTATATE (i.v.). Eur J Nucl Med Mol Imaging. Sep. 21, 2016;43(1):S190-1. https://doi.org/10.1007/s00259-016-3484-4.
Pillai et al. Evolving Important Role of Lutetium-177 for Therapeutic Nuclear Medicine. Curr Radiopharm. 2015;8(2):78-85. https://doi.org/10.2174/1874471008666150312155959.
Pillai et al. Studies on the uptake of Th(IV), U(VI) and Pu(IV) on Dowex 50WX8 resin from TBP-Shell Sol-T mixtures. J Radioanal Nucl Chem. Apr. 1986;98:303-13. https://doi.org/10.1007/BF02037093.
Pitchaiah et al. Supercritical fluid extraction of uranium and thorium from nitric acid medium using organophosphorous compounds. Radiochim Acta. Nov. 2014;103(4):245-55. https://doi.org/10.1515/ract-2014-2300.
Rabin et al. Practical aspects on the use of organic solvents in ion chromatography. J Chromatogr A. Jun. 10, 1994;671(1-2):63-71.

(56) References Cited

OTHER PUBLICATIONS

Samsonov et al. Recovery of Rare Earth Elements, Uranium, and Thorium from Monazite Concentrate by Supercritical Fluid Extraction. Radiochemistry. Aug. 2015;57(4):343-47.

Shamsipur et al. Extraction of uranium from solid matrices using modified supercritical fluid CO2. J Supercrit Fluids. Jun. 2001;20(2):163-9. https://doi.org/10.1016/S0896-8446(01)00052-3.

Sinclair et al. The role of water in extraction and separation of rare earth elements in supercritical carbon dioxide. J Supercrit Fluids. Jun. 2018;136:180-8.

Tarasov et al. Production of No. Carrier Added Lutetium-177 by Irradiation of Enriched Ytterbium-176. Curr Radiopharm. 2015;8(2):95-106. https://doi.org/10.2174/1874471008666150312160855.

Xie et al. A critical review on solvent extraction of rare earths from aqueous solutions. Miner Eng. Feb. 2014;56:10-28. https://doi.org/10.1016/j.mineng.2013.10.021.

Office Action for CA Application No. 3,149,552 dated Feb. 7, 2024 and claims pending as of Feb. 7, 2024.

\* cited by examiner

SYSTEMS AND METHODS FOR SELECTIVE RECOVERY OF METALS FROM ION EXCHANGE RESINS

RELATED APPLICATIONS

This application claims priority under 35 U.S.C. § 119(e) to U.S. Provisional Application No. 62/922,800, filed Aug. 29, 2019, and entitled "Ion Exchange in Non-Aqueous Fluid for Separation of Mixtures" which is incorporated herein by reference in its entirety for all purposes.

STATEMENT REGARDING FEDERALLY SPONSORED RESEARCH OR DEVELOPMENT

This invention was made with government support under Contract Numbers DE-AC07-051D14517, DE-SC0019565, and DE-SC0020589 awarded by the United States Department of Energy. The Government has certain rights in the invention.

PARTIES TO A JOINT RESEARCH AGREEMENT

The claimed invention was made under a joint research agreement between CF Technologies, Inc. and Battelle Energy Alliance, LLC in effect on or before the effective filing date of the claimed invention.

FIELD

The present invention relates generally to systems and methods for selective recovery of metals from ion exchange resins, and in specific embodiments to the use of such methods and system for purification of metals.

BACKGROUND

Metals having utility for one or more purposes are often present in compositions further comprising other metals less suited for such purposes. Some methods of purifying desired metals from such compositions are unable to achieve high purity and/or high recovery of one or more of the metals in the composition.

Accordingly, improved systems and methods for metal enrichment are needed.

SUMMARY

Systems and methods for metal purification in the presence of ion exchange resins, related components, and related methods are generally described.

In some embodiments, a method of selectively recovering a first metal from an ion exchange resin is provided. The method comprises contacting a non-polar fluid and an extractant with the ion exchange resin, the first metal, and a second metal, wherein at least one of the first metal and the second metal are bound to the ion exchange resin, wherein the ion exchange resin comprises a plurality of functional groups having a proton dissociation constant of greater than or equal to $10^{-5}$ and less than or equal to $10^4$. The method further comprises selectively eluting the first metal from the ion exchange resin into the non-polar fluid such that a ratio of the first metal to the second metal in the non-polar fluid is greater than a ratio of the first metal to the second metal bound to the ion exchange resin.

In some embodiments, a method of selectively recovering a first metal from an ion exchange resin comprises contacting a supercritical fluid and an extractant with the ion exchange resin, the first metal, and a second metal, wherein at least one of the first metal and the second metal are bound to the ion exchange resin, wherein the ion exchange resin comprises a plurality of functional groups having a proton dissociation constant of greater than or equal to $10^{-5}$ and less than or equal to $10^4$. The method further comprises selectively eluting the first metal from the ion exchange resin into the supercritical fluid such that a ratio of the first metal to the second metal in the supercritical fluid is greater than a ratio of the first metal to the second metal bound to the ion exchange resin.

In some embodiments, a method of selectively recovering a first metal from an ion exchange resin comprises contacting an ionic liquid and an extractant with the ion exchange resin, the first metal, and a second metal, wherein at least one of the first metal and the second metal are bound to the ion exchange resin, wherein the ion exchange resin comprises a plurality of functional groups having a proton dissociation constant of greater than or equal to $10^{-5}$ and less than or equal to $10^4$. The method further comprises selectively eluting the first metal from the ion exchange resin into the ionic liquid such that a ratio of the first metal to the second metal in the ionic liquid is greater than a ratio of the first metal to the second metal bound to the ion exchange resin.

In some embodiments, a method of selectively recovering a first lanthanide from an ion exchange resin is provided. The method comprises contacting a non-aqueous fluid and an extractant with the ion exchange resin, the first lanthanide, and a second lanthanide, wherein at least one of the first lanthanide and the second lanthanide are bound to the ion exchange resin, wherein the ion exchange resin comprises a plurality of functional groups having a proton dissociation constant of greater than or equal to $10^{-5}$ and less than or equal to $10^4$. The method further comprises selectively eluting the first lanthanide from the ion exchange resin into the non-aqueous fluid such that a ratio of the first lanthanide to the second lanthanide in the non-aqueous fluid is greater than a ratio of the first lanthanide to the second lanthanide bound to the ion exchange resin.

In some embodiments, a method of selectively recovering a first lanthanide from an ion exchange resin comprises introducing a non-aqueous fluid and an extractant into a column containing the ion exchange resin, the first lanthanide, and a second lanthanide, wherein at least one of the first lanthanide and the second lanthanide are bound to the ion exchange resin, and wherein a concentration of the extractant in the non-aqueous fluid being introduced is varied with time. The method further comprises flowing the non-aqueous fluid through the column. The method further comprises selectively eluting the first lanthanide from the ion exchange resin such that a ratio of the first lanthanide to the second lanthanide in the non-aqueous fluid being eluted is greater than a ratio of the first lanthanide to the second lanthanide in the column.

In some embodiments, a system for selectively recovering a first metal from an ion exchange resin is provided. The system comprises a column containing the ion exchange resin connectable to one or more sources of fluid, at least one of which is a source of a non-polar fluid and a fluid introducer configured to introduce the non-polar fluid and an extractant from the one or more sources of fluid into the column. The ion exchange resin further contains bound thereto and/or is configured to bind at least one of the first metal and a second metal. The ion exchange resin comprises a plurality of functional groups having a proton dissociation constant of greater than or equal to $10^{-5}$ and less than or equal to $10^4$ so that it is configured to release the first metal such that, under conditions prevailing in the column after introduction of the non-polar fluid and the extractant into the column, a ratio of the first metal to the second metal in the non-polar fluid being eluted is greater than a ratio of the first metal to the second metal in the column.

In some embodiments, a system for selectively recovering a first metal from an ion exchange resin comprises a column containing the ion exchange resin that is connectable to one or more sources of fluid, at least one of which is a source of a supercritical fluid and a fluid introducer configured to introduce the supercritical fluid and an extractant from the one or more sources of fluid into the column. The ion exchange resin further contains bound thereto and/or is configured to bind at least one of the first metal and a second metal. The ion exchange resin comprises a plurality of functional groups having a proton dissociation constant of greater than or equal to $10^{-5}$ and less than or equal to $10^4$. The ion exchange resin is configured to release the first metal such that, under conditions prevailing in the column after introduction of the supercritical fluid and the extractant into the column, a ratio of the first metal to the second metal in the supercritical fluid being eluted is greater than a ratio of the first metal to the second metal in the column.

In some embodiments, a system for selectively recovering a first metal from an ion exchange resin comprises a column containing an ion exchange resin connectable to one or more sources of fluid, at least one of which is a source of an ionic liquid and a fluid introducer configured to introduce the ionic liquid and an extractant from the one or more sources of fluid into the column. The ion exchange resin further contains bound thereto and/or is configured to bind at least one of the first metal and the second metal. The ion exchange resin comprises a plurality of functional groups having a proton dissociation constant of greater than or equal to $10^{-5}$ and less than or equal to $10^4$. The ion exchange resin is configured to release the first metal such that, under conditions prevailing in the column after introduction of the ionic liquid and the extractant into the column, a ratio of the first metal to the second metal in the ionic liquid being eluted is greater than a ratio of the first metal to the second metal in the column.

In some embodiments, a system for selectively recovering a first lanthanide from an ion exchange resin is provided. The system comprises a column containing the ion exchange resin connectable to one or more sources of fluid, at least one of which is a source of a non-aqueous fluid and a fluid introducer configured to introduce the non-aqueous fluid and an extractant from the one or more sources of fluid into the column. The ion exchange resin further contains bound thereto and/or is configured to bind at least one of the first lanthanide and the second lanthanide. The ion exchange resin comprises a plurality of functional groups having a proton dissociation constant of greater than or equal to $10^{-5}$ and less than or equal to $10^4$. The ion exchange resin is configured to release the first lanthanide such that, under conditions prevailing in the column after introduction of the non-aqueous fluid and the extractant into the column, a ratio of the first lanthanide to the second lanthanide in the non-aqueous fluid being eluted is greater than a ratio of the first lanthanide to the second lanthanide in the column.

In some embodiments, a system for selectively removing a first lanthanide from an ion exchange resin comprises a column containing an exchange resin connectable to one or more sources of fluid, at least one of which is a non-aqueous fluid and a fluid introducer configured to introduce the non-aqueous fluid and an extractant from the one or more sources of fluid into the column. The ion exchange resin further contains bound thereto and/or is configured to bind at least one of the first lanthanide and the second lanthanide. The fluid introducer is configured to vary a concentration of the extractant in the non-aqueous fluid introduced into the column. The ion exchange resin is configured to release the first lanthanide such that, under conditions prevailing in the column after introduction of the non-aqueous fluid and the extractant into the column, a ratio of the first lanthanide to the second lanthanide in the non-aqueous fluid being eluted is greater than a ratio of the first lanthanide to the second lanthanide in the column.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

[Introduction]

Figure 1A:
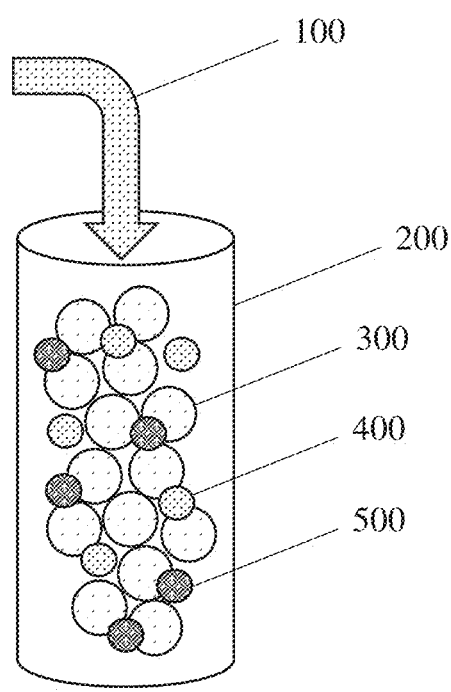
FIGS. 1A-1C show a method of selectively recovering a target metal from an ion exchange resin, in accordance with some embodiments.

Systems and methods for selectively recovering a target metal from an ion exchange resin are generally described. In certain embodiments, such methods and systems can be employed for metal purification and enrichment of target metal species from mixtures containing contaminating or non-target metals. In some embodiments, ion exchange is accomplished in the presence of one or more species that facilitate the recovery of a metal from a composition further comprising one or more other metals. The recovered metal-containing composition may contain the recovered metal at relatively high purity and/or in relatively large amounts. In some embodiments, the conditions present during ion exchange are varied in a manner that facilitates the enrichment of a metal from an initial (e.g. sample) composition further comprising one or more other metals to result in a product that contains the enriched metal at relatively high purity and/or in relatively large amounts.

As one example, in some embodiments, ion exchange is performed in the presence of an ion exchange resin comprising a plurality of functional groups having a proton dissociation constant sufficiently high to bind an appreciable amount of at least some of the metals in the composition to be treated and sufficiently low to release an appreciable amount of one or more of the metals in the composition upon exposure to an extractant. Exposure of a composition comprising two or more metals to an ion exchange resin having this property may result in the binding of an appreciable amount of at least some of the metals to the ion exchange resin. The binding may be differential (in other words, different metals in the composition may bind to the ion exchange resin to different extents and/or with different affinity) or may be non-differential (in other words, different metals in the composition may bind to the ion exchange resin to the same extent/affinity). In either case, it may be desirable for such binding to be sufficiently weak with respect to a target metal such that there exists one or more extractants strong enough to differentially release the target metal(s) from the ion exchange resin and/or remove them from the column. When this is true, the column in which the ion exchange resin is positioned may be capable of being loaded with a composition from which one or more metals may be differentially recovered.

As another example, in some embodiments, ion exchange is performed in the presence of a fluid comprising a component of the mobile phase and having one or more properties that facilitate the operation of ion exchange for metal enrichment. For instance, ion exchange may be performed in the presence of a non-aqueous, non-polar, and/or supercritical fluid. Non-aqueous fluids and/or non-polar fluids may be capable of dissolving extractants suitable for selectively recovering metals that are insoluble in conventional aqueous and/or polar fluids used as mobile phase solvents. Supercritical fluids may also be capable of solubilizing such extractants. Some extractants soluble in non-aqueous, non-polar, and/or supercritical fluids but insoluble in aqueous and/or polar fluids may be particularly suitable for use in certain embodiments for purifying one or more metals having commercial utility and/or that are challenging to solubilize in other conventional mobile phase fluids. Additionally, supercritical fluids may have high diffusivities and/or low viscosities, which may enhance the rate at which ion exchange is performed.

As a third example, in some embodiments, ion exchange is performed in a manner such that the conditions in the column are varied as a function of time. For instance, ion exchange may be performed in the presence of an extractant whose concentration in the column and/or in the fluid introduced into the column changes with time. In some embodiments, the concentration of the extractant in the column and/or in the fluid introduced into the column is increased with time. Performing ion exchange under such conditions may allow a metal that is bound relatively weakly to the ion exchange resin (or unbound) to be released from the ion exchange resin and/or removed from the column relatively early in the ion exchange process. Other metal(s) bound more strongly to the ion exchange resin may remain mostly or completely bonded to the ion exchange resin during this time period. Later, when the concentration of the extractant is higher, such metal(s) may be released from the ion exchange resin.

As a fourth example, in some embodiments, ion exchange is performed to enrich metals from a composition comprising at least one target metal having relatively high utility for one or more applications. For instance, some embodiments relate to selectively recovering lanthanide target metals, such as radioactive isotopes of lanthanide metals, from compositions. Some lanthanides are useful in cancer drugs. It is also challenging to purify some lanthanides in a manner such that samples comprising the lanthanide at a high degree of purity are recovered and/or such that a relatively high percentage of the lanthanide is recovered from the purification process.

[Overview]

Figure 1B:
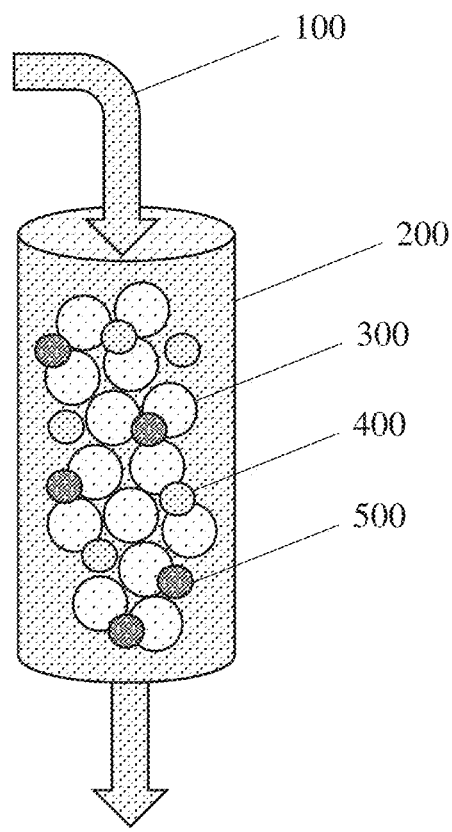
Figure 1C:
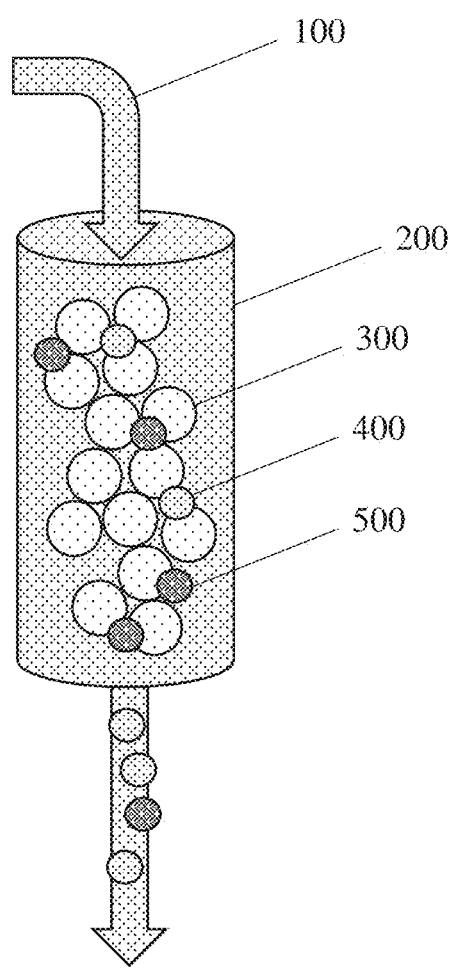

Some embodiments relate to methods of selectively recovering metals from ion exchange resins and some embodiments relate to systems for recovering metals from ion exchange resins. A method for selectively recovering metals from an ion exchange resin may comprise contacting a fluid with the ion exchange resin and at least a first and a second metal and selectively eluting the first metal from the ion exchange resin in the fluid. The selective elution may comprise recovering a fluid that has a higher ratio of the first metal to the second metal than the ratio of the first metal to the second metal bound to the ion exchange resin. In some embodiments, contacting a fluid with the ion exchange resin comprises introducing the fluid to a column containing the metals from which one or more metals are to be selectively recovered and an ion exchange resin. The method may further comprise flowing the fluid through the column and/or collecting the eluted metal from the column. FIGS. 1A-1C show these steps schematically. In FIG. 1A, a fluid 100 is introduced into a column 200 which contains an ion exchange resin 300, a first metal 400, and a second metal 500. In FIG. 1B, the fluid 100 flows through the column 200. In FIG. 1C, the first metal 400 is selectively eluted and removed from the column and the ion exchange resin with respect to the second metal 500.

Figure 1D:
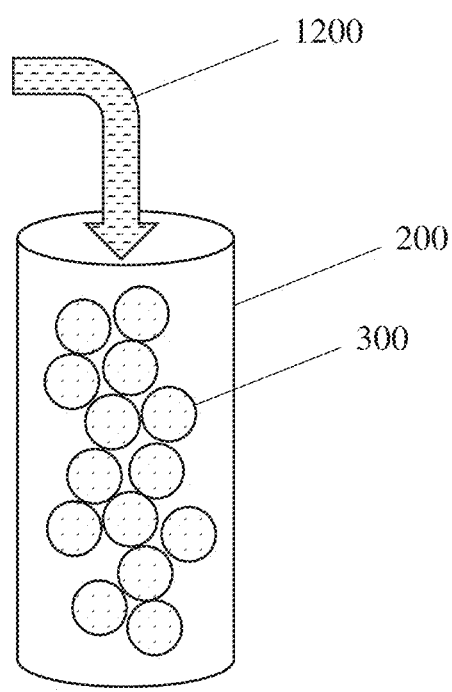
FIG. 1D shows a step of preparing an ion exchange resin for exposure to a composition comprising two or more metals, in accordance with some embodiments.

In some embodiments, a method for selectively recovering a metal from an ion exchange resin comprises performing some or all of the steps in the preceding paragraph in the presence of an ion exchange resin to which at least a portion of at least one or more of the metals to be selectively recovered are initially bound, for example following a loading process described in more detail below in the context of FIGS. 1D-1E. The column at any given time during the performance of the method may contain some portion of one or more of the metals that are not bound to the ion exchange resin, may contain some portion of one or more of the metals that are bound to the ion exchange resin, may comprise some metal species that are or are almost entirely bound to the ion exchange resin, and/or may comprise some metal species that are or are almost entirely free of binding to the ion exchange resin. References to species "in the column" should be understood to refer to all such species. In some embodiments, the elution of a metal may comprise removal of the metal from binding to the ion exchange resin and removal from the column.

Some methods may comprise performing the steps shown in FIGS. 1A-1C sequentially (e.g., first a fluid may be introduced into a column containing an ion exchange resin and the first and second metals, then the fluid may be flowed through the column, and finally the first metal may be selectively eluted from the column). It is also possible for a method to comprise performing some or all of the steps shown in FIGS. 1A-1C in periods of time that at least partially overlap. For instance, in some embodiments, fluid may be continually introduced to the column during the method. The fluid being introduced into the column may displace fluid previously introduced into the column, which then flows through and/or out of the column.

It should also be noted that some methods may comprise further steps than those shown in FIGS. 1A-1C and/or some methods may lack some or all of the steps shown in FIGS. 1A-1C. For instance, some methods further comprise some or all of the steps shown in FIGS. 1D-1E. FIGS. 1D-1E show two examples of steps that may be performed prior to the performance of steps 1A-1C. In FIG. 1D, an ion exchange resin 300 initially lacking any metals to be selectively recovered is exposed to a composition 1200 to clean and/or prepare the ion exchange resin for selective recovery of one or more metals therefrom. In some embodiments, this composition may be and/or comprise an extractant employed during a later stage of the method. In FIG. 1E, an ion exchange resin 300 is exposed to a composition 1300 (e.g., a fluid) comprising a first metal 400 and a second metal 500. This fluid may be injected into the column containing the ion exchange resin. The two or more metals may comprise one metal to be selectively recovered. In some embodiments, the steps shown in FIGS. 1D and 1E may be performed sequentially. It is also possible for step shown in FIG. 1E to be performed without the prior performance of the step shown in FIG. 1D.

Figure 1E:
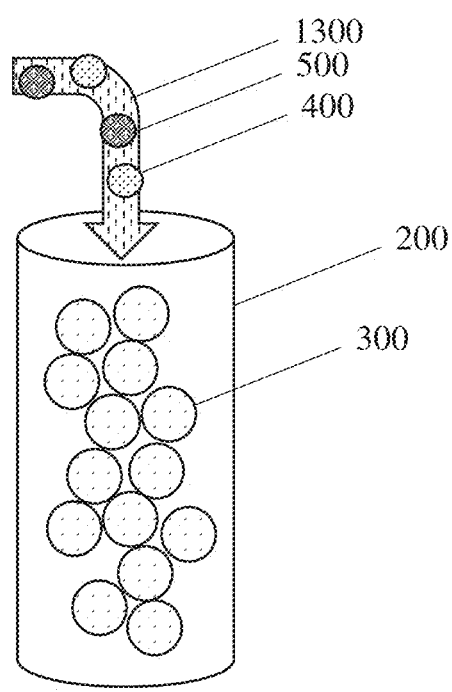
FIG. 1E shows a step of exposing a composition comprising two or more metals to an ion exchange resin, in accordance with some embodiments.

Additionally, in some embodiments, metals are exposed to and/or loaded on an ion exchange resin by a process other than that shown in FIG. 1E. As one example, in some embodiments, the ion exchange resin is mixed with a fluid comprising the metals. After this mixing, the ion exchange resin may be removed from the fluid, optionally washed and/or dried, and then placed in a column. The fluid comprising the metals and mixed with the ion exchange resin may be of a variety of suitable types. For instance, the fluid may be aqueous or non-aqueous. The fluid may be acidic, may comprise one or salts, may comprise one or more organic solvents for the metals, and/or may comprise one or more extractants. The metals may be dissolved in the fluid in the form of salts and/or organometallic complexes. The mixing may occur in a variety of suitable vessels, such as tanks, beakers, stirred vessels, and/or packed beds.

In some embodiments, systems and equipment suitable for performing some or all of the steps of certain embodiments of methods described herein are disclosed. Some such systems may be capable of and configured to perform some or all of the methods described herein, such as a method comprising the steps shown in FIGS. 1A-1E. In some embodiments, a system comprises a column containing an ion exchange resin and a fluid introducer connectable to one or more sources of fluid (e.g., one or more reservoirs of fluid, such as one or more tanks and/or pressure vessels comprising a fluid). The sources of fluid may in certain embodiments include solubilized species to be introduced into the column (e.g., the fluid may be a composition comprising one or more metals to be purified, one or more extractants, etc.). The fluid introducer may be configured to introduce fluid from some or all of the one or more sources of fluid into the column, and may include one or more mixers to combine or mix fluids from different sources before introduction into the column. In some embodiments, the fluid introducer is configured to apply pressure to facilitate this introduction and/or to supply the fluid at a pressure suitable for dissolving one or more species being introduced (e.g., a composition comprising one or more metals to be purified, one or more extractants, etc.). For instance, the fluid introducer may comprise one or more pumps to pump fluid into the column. In some embodiments, the fluid introducer is configured to introduce fluid into a column by placing a source of fluid in fluidic communication with the column. As an example, in some embodiments, a fluid introducer comprises a valve that can be opened to place a source of fluid (e.g., a pressurized source of fluid) in fluidic communication with the column and may include automated and/or manual flow regulators to adjust and control the flow rate of a pressurized fluid.

Introduction of fluid from two or more sources of fluid into a column may be sequential, simultaneous, and/or may comprise some periods of time in which the introduction is sequential and some period of time in which the introduction is simultaneous. In some embodiments, a fluid introducer may be configured to vary the relative amounts of different fluid species entering the column over time (e.g., the various amounts of a carrier solvent fluid, extractant, and/or a composition comprising one or more metals to be purified) and/or the concentration of various solute species in a fluid entering the column over time (e.g., the concentration of the extractant and/or the metals in the composition comprising the one or more metals to be selectively recovered). This may be accomplished by, for instance, changing the relative flow rates of the various fluids and species introduced into the column over time.

Figure 2:
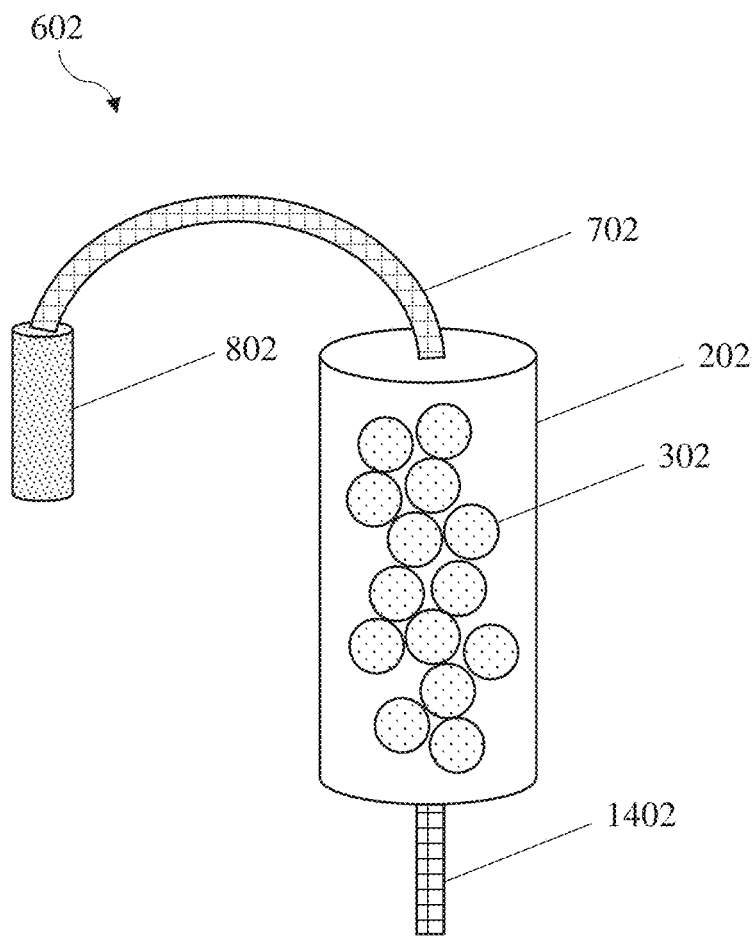
FIG. 2 shows a system for selectively recovering a target metal from an ion exchange resin, in accordance with some embodiments.

FIG. 2 shows one non-limiting example of a system comprising components described in the preceding paragraph. In FIG. 2, the system 602 comprises a column 202, a fluid introducer, e.g. a conduit 702, and an outlet 1402. The column 202 contains an ion exchange resin 302 and the fluid introducer 702 is fluidically connected with a source 802 of a fluid (e.g. a pump or cylinder of pressurized gas or source of a supercritical fluid). Like for FIGS. 1A-1C, it should be understood that some systems may comprise further components than those shown in FIG. 2 and some systems may lack some or all of the components shown in FIG. 2.

As described above, some methods of selectively recovering metals from ion exchange resins and some systems for selectively recovering metals from ion exchange resins make use of ion exchange resins. The ion exchange resin may comprise a plurality of functional groups capable of binding one or more metals in a composition comprising metals to be selectively recovered. Accordingly, exposure of the ion exchange resin to a composition containing the metals to be enriched in one or more desired target metal species may result in at least some of the metals in the composition binding to the ion exchange resin (e.g., via the functional groups). As initially supplied or provided, functional groups on ion exchange resins may be associated with species such as counter ions (collectively, "displaceable ions") that bind or associate with the functional groups with lower affinity than at least some of the metals to be processed using the resin according to the disclosed methods. Accordingly, the above-described initial loading process of the ion exchange resin with the metal containing composition to be purified/enriched can cause the displacement of at least a portion of any such displaceable ions initially bound to the ion exchange resin, e.g. to the relevant functional groups.

Figure 3A:
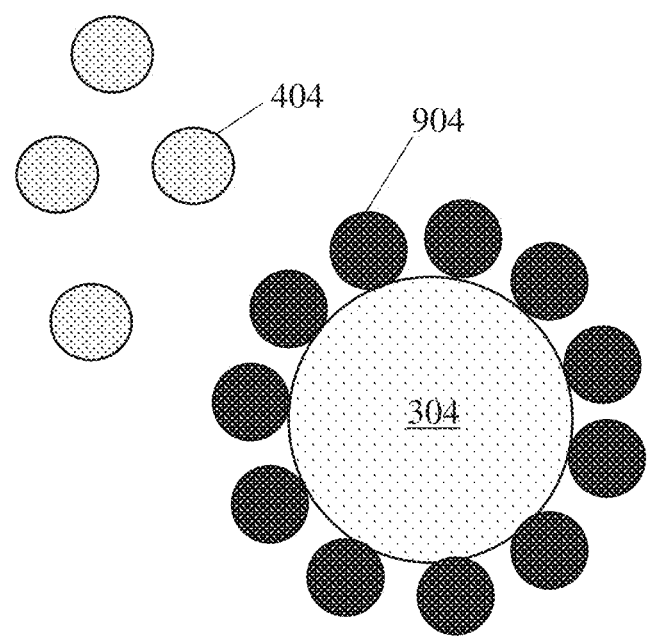
FIGS. 3A-3B show a resin loading process, in accordance with some embodiments.
Figure 3B:
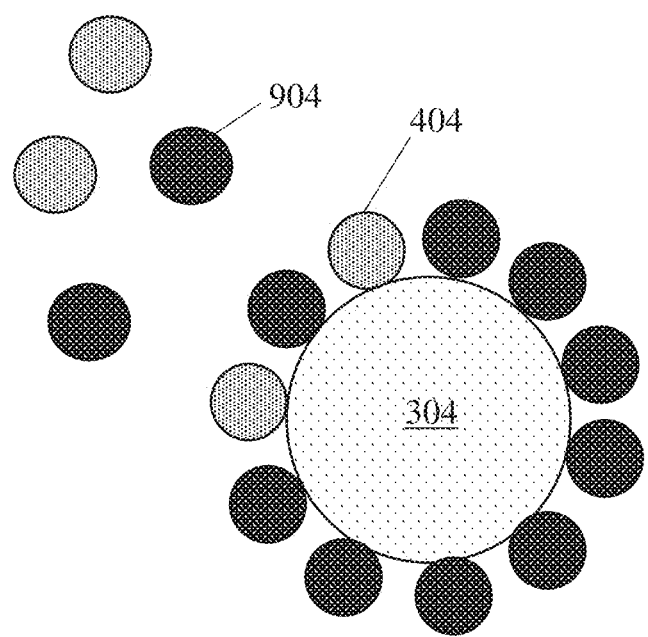

This resin loading process is shown schematically in FIGS. 3A-3B. In FIG. 3A, a plurality of displaceable ions 904 are initially bound to a resin 304. This resin is exposed to a composition comprising a first metal 404. As shown in FIG. 3B, this may result in at least a portion of the plurality of displaceable ions 904 being displaced from the ion exchange resin and replaced by at least some of the first metal ions or atoms, complexes or metal-containing molecules 404. The process shown in FIGS. 3A-3B may occur during the method step shown in FIG. 1E. In other words, exposure of the ion exchange resin to the first metal and the second metal as shown in FIG. 1E may cause some of the first metal and/or some of the second metal to bind to the ion exchange resin as shown in FIGS. 3A-3B.

In some embodiments, like the embodiment shown in FIGS. 3A-3B, ion displacement by first and second metals may be incomplete. In other words, exposure of an ion exchange resin to a composition comprising one or more metals may cause some, but not all, of a plurality of displaceable ions initially bound thereto to be displaced and replaced by the first metal ions or atoms, complexes or metal-containing molecules 404. In some embodiments, the fraction of displaceable ions displaced from the ion exchange resin is relatively small. It is also possible for exposure of an ion exchange resin to a composition comprising one or more metals to cause all, or substantially all, of a plurality of displaceable ions initially bound thereto to be displaced.

The number of displaceable ions displaced by each metal ion in a composition to which an ion exchange resin is exposed during the metal enrichment methods of certain embodiments of the methods described generally depends on the relative charges of the displaceable ions and the metals displacing the displaceable ions. When the charge of the ion exchange resin and the ions bound thereto is maintained, the charge of the ions displaced is equal to the charge of the metal ions displacing the displaceable ions. As an example, if the metal ions have the same charge as the displaceable ions that they displace, the charge of the ion exchange resin and the ions bound thereto is maintained if the number of ions displaced equals the number of metal ions performing the displacement. As another example, if the metal ions have a charge twice as large as the displaceable ions that they displace, the charge of the ion exchange resin and the ions bound thereto is maintained if the number of ions displaced equals twice the number of ions performing the displacement.

Figure 4A:
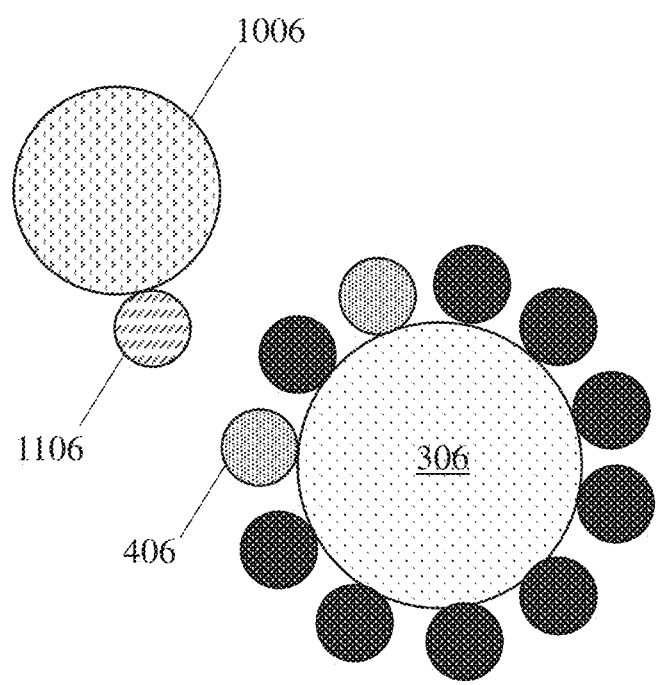
FIGS. 4A-4B show an ion exchange process in which an extractant removes a metal from an ion exchange resin, in accordance with some embodiments.

In some embodiments, an ion exchange resin to which one or more metals in the composition processed with the resin are bound is exposed to an elution fluid able to elute or displace all or some of the bound ions of the one or more metals in the composition. The fluid may be passed through a column with the resin and bound metals contained by the column, e.g., as shown and described above in the context of FIGS. 1A-1C. In some embodiments, the fluid has the effect of displacing some or all of the one or more metals from the ion exchange resin. This may be accomplished with the assistance of an extractant provided with and/or dissolved in the fluid. The extractant may have an affinity for one or more of the metals bound to the ion exchange resin such that it binds and/or is configured to bind to the metal(s) such that it is able to displace and remove bound metal ions from the ion exchange resin. This binding may be accomplished by a further ion-exchange process. For instance, in some embodiments, the extractant may initially be bound to one or more displaceable ions that bind to and/or are configured to bind to the ion exchange resin upon removal of the metal(s) therefrom. Such an elution process using an extractant facilitating ion-exchange displacement and removal of bound metal ions from the ion exchange resin is shown schematically in FIGS. 4A-4B. In FIG. 4A, an ion exchange resin 306 to which a first metal ion 406 is bound is exposed to an extractant 1006 to which a displaceable ion 1106 is bound. After such exposure, as shown in FIG. 4B, the extractant 1006 binds to the metal ion 406, which has been displaced from the ion exchange resin 306 by displaceable ion 1106.

Figure 4B:
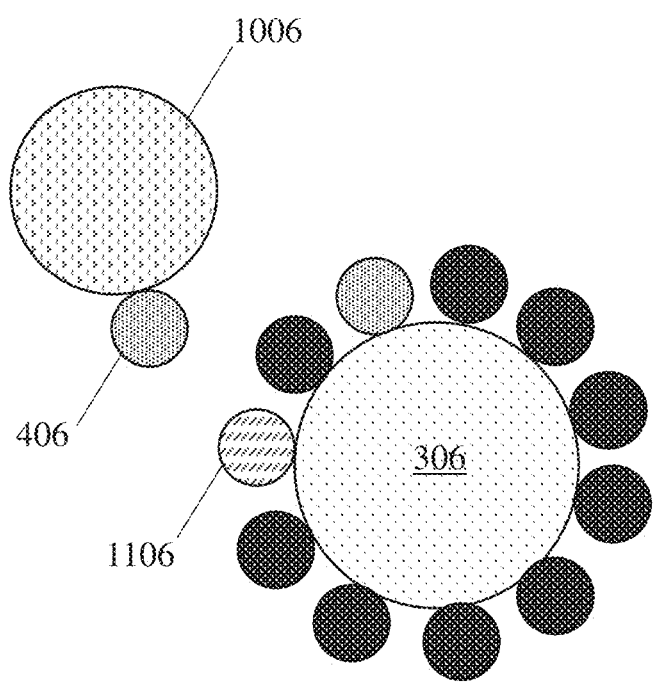

It should be understood that, although FIGS. 4A and 4B show a single extractant and a single displaceable ion, some methods may comprise performing ion-exchange displacement and removal of bound metal ions in the presence of two or more extractants and/or two or more displaceable ions. In some embodiments, an ion-exchange process comprises forming a bond between two or more (e.g., three or more) extractant molecules and a single metal ion bound to an ion exchange resin. It is also possible for a single extractant molecule to initially bind two or more displaceable ions, of which some or all are released upon binding of the extractant molecule to the metal ion.

Similarly to the case of the initial displacement of displaceable ions initially bound to the ion exchange resin during the loading process described above, the number of displaceable ions associated with an extractant that are exchanged with metal ions bound to an ion exchange resin generally depends on the number of displaceable ions bound to each extractant molecule, the relative charge of the displaceable ions bound to the extractant molecules, and the charge of the metal ions bound to the ion exchange resin. Additionally, the number of displaceable ions binding to an ion exchange resin to replace metal ions displaced generally depends on the relative charges of the displaceable ions and the metals bound to the ion exchange resin, as described above.

In some embodiments, an extractant may be provided with chemical properties and/or in an amount such that the extractant is able to extract an appreciable amount of one or more metal ion species bound to the ion exchange resin. The properties of the extractant may be selected to facilitate the debinding and removal of the metal(s) from the ion exchange resin and/or the solubilization of the metal(s) in the fluid flowing through the column. In some embodiments, the extractant has a higher binding affinity for one of the metal species bound to an ion exchange resin than other metal species bound to the ion exchange resin, allowing the metal for which the extractant has a higher binding affinity to be preferentially eluted. Such preferential elution may permit recovering a fluid from the column that contains the metal for which the extractant has a higher binding affinity to in an enhanced amount compared to a composition initially loaded onto the ion exchange resin, thus resulting in purification and enrichment of such metal species. As one example, preferential elution of a first metal from an ion exchange resin to which two or more metals are bound can permit the recovery of a fluid from a column containing the resin in which the ratio of the first metal to the second metal is greater than the ratio of the first metal to the second metal bound to the ion exchange resin, and/or contained by the column.

In some embodiments, a target metal (e.g., a metal that the method is employed to recover) is preferentially eluted first. It is also possible for a metal initially contaminating a target metal to be preferentially eluted first. Then, the target metal remaining in the column and/or bound to the ion exchange resin may be subsequently eluted. It is also possible for a composition to comprise multiple target metals (e.g., multiple metals to be recovered in separate, relatively pure, compositions). In such embodiments, the target metals and/ or any non-target metals mixed therewith may each be preferentially eluted in any suitable order.

It should be understood that the above discussion of binding and bound ions may refer to a variety of types of binding. For instance, in some embodiments, a metal and/or a metal ion is bound (e.g., to an ion exchange resin, to an extractant, etc.) via ionic bonding. As another example, in some embodiments, a metal and/or an ion is bound (e.g., to an ion exchange resin, to an extractant, etc.) via coordination bonding. Other types of binding are also possible.

The methods described above and elsewhere herein may be performed over a period of time. Accordingly, it should be understood that one or more features of the method may change over time. As one example, the amount of one or more metals eluting from the column and/or ion exchange resin may change with time. For instance, a method may comprise some points in time in which one metal preferentially elutes from the column and/or ion exchange resin and some points in time in which another metal preferentially elutes from the column and/or ion exchange resin. References herein to features of fluids being introduced into, present in, and/or exiting (e.g., eluting) from columns should thus be understood to refer to the properties of such fluids at one or more points in time. It is possible that at other, earlier or later, points in time, the properties of such fluids may be different. As one specific example, reference to a ratio of a first metal to a second metal in a column, bound to an ion exchange resin, and/or exiting a column should be understood to refer to the ratio of those metals at one or more points in time with the understanding that such ratios may vary over time.

In some embodiments, a method comprises performing two or more discrete steps at different points in time. As one example, a method may comprise a first step in which a composition comprising two or more metals from which one metal is to be selectively recovered are introduced into the column and/or exposed to the resin. This first step may be followed by a second step of allowing at least a portion of at least one of the two or more metals to bind to the ion exchange resin. For instance, the second step may comprise an equilibration procedure in which the ion exchange resin is exposed to the composition under relatively static conditions for a period of time. The second step may then be followed by one or more steps in which an extractant (e.g. dissolved in or otherwise in the presence of a carrier/mobile phase fluid) is introduced into the column and optionally flowed through the column to selectively elute one or more metals from the resin for removal from the column.

Other methods may comprise none, some, or all of the above steps. It is also possible for some methods to comprise further steps not described in the preceding paragraph. As one example, a method may comprise a first step of flowing a fluid and/or an extractant through the column to clean and/or prepare the ion exchange resin for loading with the metals of the sample or fed composition to be enriched in at least one target metal (e.g., as shown in FIG. 1D). This step may be performed before the first step described in the preceding paragraph. As another example, a method may comprise introducing a composition comprising two or more metals to be processed that is not followed by an equilibration procedure. The method may comprise introducing the composition comprising two or more metals to be processed concurrently with or immediately prior to introducing a fluid extractant or a fluid containing an extractant into the column and flowing the extractant through the column to begin the selective metal elution (e.g., as shown in FIG. 1E).

One exemplary embodiment comprises performing the following steps in sequence: (1) flowing a non-aqueous fluid and an extractant through the column; (2) introducing into the column the composition comprising the metals from which one or more metals are to be selectively recovered from the column at a later point in time; and (3) flowing further extractant and non-aqueous fluid through the column to selectively elute one or more metals from the column. If two or more metals are selectively eluted, they may be selectively eluted sequentially to each other (e.g., a first metal may be selectively eluted, then a second metal, then a third metal, etc.), for example as described below. In some embodiments, the non-aqueous fluid and the extractant continuously flow through the column during these three steps.

Some methods may comprise changing one or more properties and/or conditions of the method as a function of time. For instance, a method may comprise introducing a non-aqueous fluid and an extractant into the column and changing the concentration of the extractant in the non-aqueous fluid as a function of time (e.g., via a fluid introducer configured to vary this concentration). As the fluid being introduced flows into and/or through the column, the concentration of the extractant in the column may also change as a function of time. It is also possible for a method to comprise maintaining one, some, or all conditions constant as a function of time. As one example, in some embodiments, a method comprises maintaining a constant extractant concentration over time.

Additionally, methods may comprise some steps that are performed continuously, some that are performed discontinuously, and/or some that are performed semicontinuously. For instance, each of the ionic resin preparation, metal loading, and/or metal elution steps may independently be performed continuously, discontinuously, semicontinuously, and/or by simulated moving bed chromatography. As further examples, the properties and/or conditions of the method that are changed may be changed continuously or in a step-wise manner.

In some embodiments, a method comprises initially introducing a non-aqueous fluid and an extractant in which the concentration of the extractant is relatively low into the column. Then, further fluid may be introduced into the column having a higher concentration of extractant. In some such embodiments, fluid and extractant are continually introduced into the column, and the concentration of the extractant in the fluid continually increases in time. The extractant concentration in the fluid introduced close to the beginning of the method may comprise an amount of extractant that is only sufficient to extract metal(s) to which it binds with high affinity in appreciable amounts. These metal(s) may be displaced from the ion exchange resin and/or selectively eluted first. The extractant concentration in the fluid introduced later in the method may comprise an amount of extractant that is sufficient to extract other metal (s) to which it binds less strongly. Such metal(s) may then be selectively eluted later, allowing for purification of multiple metal species, for example, in some embodiments.

It is also possible to selectively elute two or more metals sequentially by other processes. For instance, in some embodiments, a non-aqueous fluid and an extractant may be introduced into a column in a manner such that the concentration of the extractant in the non-aqueous fluid remains relatively constant. In such embodiments, the metal having a relatively lower affinity for the ion exchange resin and/or a relatively high affinity for the extractant may selectively elute more quickly. After a time period in which an appreciable amount of the first metal has been eluted from the column and/or the ion exchange resin, other metals may elute and/or elute in more appreciable amounts. It is also possible for two or more metals bound to an ion exchange resin and/or present in a column may be differentially released from the ion exchange resin and/or to migrate down the column at different rates when the extractant concentration in the column is constant. Either or both of these two phenomena in combination may cause differential recovery of the two metals sequentially. As another example, in some embodiments, two or more metals are eluted sequentially by sequentially introducing two or more different extractants into a column. A first extractant may be employed to sequentially elute one of the metals, and then a second extractant may be employed to elute a second metal. In some embodiments, one or more other properties of the column (e.g., temperature, pressure) could be varied in order to elute different metals.

It should be understood that the methods described herein may be employed to selectively recover one or more individual metals from a composition comprising two or more metals and/or to selectively recover one or more types of metals from a composition comprising two or more types of metals. One example of a method of doing the former is selectively recovering Lu from a composition comprising both Lu and Yb (possibly followed by selective recovery of Yb). One example of a method of doing the latter is selectively recovering heavy rare earth elements from a composition comprising both heavy rare earth elements and light rare earth elements (possibly followed by selective recovery of light rare earth elements).

It should also be understood that the metal elution and recovery discussed above and elsewhere herein need not perfectly purify and/or recover all of the metals introduced into the column to be effective and an improvement over conventional methods. As one example, in some embodiments, selective elution of a first metal may also involve some concurrent elution of a second metal. The elution of the second metal may be to a lower degree than that of the first metal. As another example, in some embodiments, elution of a first metal may comprise incomplete elution of that metal. In other words, some of the metal bound to the ion exchange resin and/or contained by the column may be eluted while some of the metal remains bound to the ion exchange resin and/or contained by the column and is not recovered.

[Ion Exchange Resins]

Further details regarding some suitable ion exchange resins are provided below.

In some embodiments, an ion exchange resin comprises a plurality of functional groups to which two or more metals in a composition from which one or more metals to be preferentially eluted can be bound. In some embodiments, such functional groups are able to form a chelate with one or more of the metals in the relevant composition. In some embodiments, such functional groups are anionic. In other words, some resins may comprise a plurality of anionic functional groups. Non-limiting examples of suitable functional groups capable of binding one or more typical target metal species for purification include sulfonate functional groups (e.g., styrene sulfonate functional groups, methyl sulfonate functional groups), carboxylate functional groups, phosphonate functional groups, phosphinate functional groups, iminodiacetate functional groups, methyl phosphonate functional groups, aminophosphonate functional groups, and thiourea functional groups. The plurality of functional groups capable of binding one or more metals may comprise functional groups that are initially bound to a displaceable ion, or that are charged and not bound to a counter ion prior to loading with metal ions in the compositions to be processed for purification. In some embodiments, the displaceable ion is a proton (in other words, references to sulfonate functional groups, carboxylate functional groups, phosphonate functional groups, phosphinate functional groups, iminodiacetate functional groups, methyl phosphonate functional groups, and aminophosphonate functional groups should be understood to encompass sulfonic acid functional groups, carboxylic acid functional groups, phosphonic acid functional groups, phosphinic acid functional groups, iminodiacetic acid functional groups, methyl phosphonic acid functional groups, and aminophosphonic acid functional groups). Further non-limiting examples of suitable displaceable ions can include metal ions (e.g., cations of alkali metals, such as sodium and/or potassium ions) and polyatomic ions (e.g., ammonium). In some embodiments, a plurality of functional groups may comprise two or more of the above types of functional groups and/or displaceable ions.

As described elsewhere herein, functional groups in an ion exchange resin may be capable of binding one or more metals in a composition to which they are exposed. In some embodiments, the ability of the functional groups to bind such metal(s) is such that the metal(s) may be capable of being both bound and released under appropriate conditions (e.g., the metal(s) may be bound during one or more initial steps of a purification process and then released later during selective elution). The proton dissociation constant of the functional groups may correlate with this ability, as it characterizes the tendency of the functional groups to dissociate from one particular displaceable ion. However, it should be understood that reference to a proton dissociation constant does not imply that the ion exchange resin so characterized necessarily is used in the methods of the invention with a proton as the displaceable ion. For instance, as described elsewhere herein, ion exchange may be performed in the presence of other displaceable ions. Without wishing to be bound by any particular theory, it is believed that the dissociation constant of such displaceable ions from the functional groups may be different than the proton dissociation constant because different displaceable ions may have different affinities for any given functional group and that these differences may affect the behavior of the ion exchange resin. As an example, displaceable ions that are bound relatively strongly to a functional group may suppress ion exchange between the displaceable ion and metals to which the functional group is exposed, which may suppress binding of these metals to the functional group. On the other hand, displaceable ions that are bound relatively weakly to a functional group may readily undergo ion exchange with metals to which the functional group is exposed.

Nevertheless, the proton dissociation constants for functional groups is a characteristic that is typically correlated with the binding affinity of the functional group generally, is widely known and available for a large variety of ion exchange resin functional group chemistries, and therefore is a metric for evaluating their comparative tendency to bind ions. In some embodiments, the functional groups have a proton dissociation constant of greater than or equal to $10^{-5}$, greater than or equal to $10^{-4}$, greater than or equal to $10^{-3}$, greater than or equal to $10^{-2}$, greater than or equal to $10^{-1}$, greater than or equal to 1, greater than or equal to 10, greater than or equal to $10^2$, or greater than or equal to $10^3$. In some embodiments, the functional groups have a proton dissociation constant of less than or equal to $10^4$, less than or equal to $10^3$, less than or equal to $10^2$, less than or equal to 10, less than or equal to 1, less than or equal to $10^{-1}$, less than or equal to $10^{-2}$, less than or equal to $10^{-3}$, or less than or equal to $10^{-4}$. Combinations of the above-referenced ranges are also possible (e.g., greater than or equal to $10^{-5}$ and less than or equal to $10^4$). Other ranges are also possible.

As used herein, the proton dissociation constant of a functional group refers to the following ratio: $[A][H]^+/[AH]$, where A is the functional group, H is a proton, and AH is the complex formed by the functional group and its proton when they are bound together. The proton dissociation constants of the functional groups referred to herein are those measured at 25° C. in water and may be determined by performing a titration measurement in water at 25° C. It should be understood that, despite this definition, methods of the invention are not limited to such conditions and may be performed using other fluid solvents and/or at other temperatures.

An ion exchange resin may comprise two or more types of functional groups, where each type of functional group may independently have a proton dissociation constant in one or more of the ranges described above.

Ion exchange resins may comprise further functional groups in addition to the functional groups capable of binding one or more metals to be purified. Such functional groups may serve to bind together the functional groups that are capable of binding the one or more metals to be purified and/or may make up other portions of the resin. Non-limiting examples of such functional groups include divinylbenzene, vinyl acrylamide, and methacrylate. In some embodiments, an ion exchange resin comprises a polymer comprising one or more such repeat units (e.g., polyvinyl acrylamide, a polymethacrylate polymer).

Some ion exchange resins described herein are porous. For instance, in some embodiments, an ion exchange resin is a macroporous resin. The macroporous resin may comprise pores that are relatively large and/or rigid. Such pores may be relatively resistant to undergoing swelling and/or collapse in the presence of solvents. In some embodiments, an ion exchange resin comprises pores having a number average pore size of greater than or equal to 10 nm, greater than or equal to 20 nm, greater than or equal to 50 nm, greater than or equal to 75 nm, greater than or equal to 100 nm, greater than or equal to 200 nm, greater than or equal to 500 nm, greater than or equal to 750 nm, greater than or equal to 1000 nm, greater than or equal to 1500 nm, greater than or equal to 2000 nm, greater than or equal to 3000 nm, or greater than or equal to 4000 nm. In some embodiments, an ion exchange resin comprises pores having a number average pore size of less than or equal to 5000 nm, less than or equal to 4000 nm, less than or equal to 3000 nm, less than or equal to 2000 nm, less than or equal to 1500 nm, less than or equal to 1000 nm, less than or equal to 750 nm, less than or equal to 500 nm, less than or equal to 200 nm, less than or equal to 100 nm, less than or equal to 75 nm, less than or equal to 50 nm, or less than or equal to 10 nm. Combinations of the above-referenced ranges are also possible (e.g., greater than or equal to 10 nm and less than or equal to 5000 nm, or greater than or equal to 10 nm and less than or equal to 1000 nm). Other ranges are also possible. As used herein, the number average pore size of an ion exchange resin refers to the number average diameter of the pores in the ion exchange resin. The number average pore size of an ion exchange resin may be determined by mercury intrusion porosimetry.

In some embodiments, an ion exchange resin is particulate and/or comprises particles. The particles may have a number average particle size of greater than or equal to 0.1 micron, greater than or equal to 0.2 microns, greater than or equal to 0.5 microns, greater than or equal to 0.75 microns, greater than or equal to 1 micron, greater than or equal to 2 microns, greater than or equal to 5 microns, greater than or equal to 7.5 microns, greater than or equal to 10 microns, greater than or equal to 20 microns, greater than or equal to 50 microns, greater than or equal to 75 microns, greater than or equal to 100 microns, greater than or equal to 200 microns, greater than or equal to 500 microns, greater than or equal to 600 microns, greater than or equal to 800 microns, greater than or equal to 1000 microns, greater than or equal to 1500 microns, greater than or equal to 2000 microns, greater than or equal to 3000 microns, or greater than or equal to 4000 microns. The particles may have a number average particle size of less than or equal to 5000 microns, less than or equal to 4000 microns, less than or equal to 3000 microns, less than or equal to 2000 microns, less than or equal to 1500 microns, less than or equal to 1000 microns, less than or equal to 800 microns, less than or equal to 600 microns, less than or equal to 500 microns, less than or equal to 200 microns, less than or equal to 100 microns, less than or equal to 75 microns, less than or equal to 50 microns, less than or equal to 20 microns, less than or equal to 10 microns, less than or equal to 7.5 microns, less than or equal to 5 microns, less than or equal to 2 microns, less than or equal to 1 micron, less than or equal to 0.75 microns, less than or equal to 0.5 microns, or less than or equal to 0.2 microns. Combinations of the above-referenced ranges are also possible (e.g., greater than or equal to 0.1 micron and less than or equal to 5000 microns, or greater than or equal to 0.1 micron and less than or equal to 800 microns). Other ranges are also possible. As used herein, the number average particle size of an ion exchange resin refers to the number average diameter of the particles making up the ion exchange resin. The number average particle size of an ion exchange resin may be determined by dynamic light scattering.

The ion exchange resins described herein may have a variety of suitable bed densities. In some embodiments, the bed density of the ion exchange resin is greater than or equal to 0.15 g/mL, greater than or equal to 0.2 g/mL, greater than or equal to 0.25 g/mL, greater than or equal to 0.3 g/mL, greater than or equal to 0.4 g/mL, greater than or equal to 0.5 g/mL, greater than or equal to 0.6 g/mL, greater than or equal to 0.7 g/mL, greater than or equal to 0.8 g/mL, or greater than or equal to 0.9 g/mL. In some embodiments, the bed density of the ion exchange resin is less than or equal to 1 g/mL, less than or equal to 0.9 g/mL, less than or equal to 0.8 g/mL, less than or equal to 0.7 g/mL, less than or equal to 0.6 g/mL, less than or equal to 0.5 g/mL, less than or equal to 0.4 g/mL, less than or equal to 0.3 g/mL, less than or equal to 0.25 g/mL, or less than or equal to 0.2 g/mL. Combinations of the above-referenced ranges are also possible (e.g., greater than or equal to 0.15 g/mL and less than or equal to 1 g/mL). Other ranges are also possible. The bed density of an ion exchange resin may be determined by weighing a known volume of the ion exchange resin and then dividing the measured mass by the known volume.

In some embodiments, an ion exchange resin has a relatively high binding capacity. The binding capacity of the ion exchange resin may be greater than or equal to 100 µeq/g, greater than or equal to 200 µeq/g, greater than or equal to 500 µeq/g, greater than or equal to 750 µeq/g, greater than or equal to 1000 µeq/g, greater than or equal to 2000 µeq/g, or greater than or equal to 4000 µeq/g. The binding capacity of the ion exchange resin may be less than or equal to 6000 µeq/g, less than or equal to 4000 µeq/g, less than or equal to 2000 µeq/g, less than or equal to 1000 µeq/g, less than or equal to 750 µeq/g, less than or equal to 500 µeq/g, or less than or equal to 200 µeq/g. Combinations of the above-referenced ranges are also possible (e.g., greater than or equal to 100 µeq/g and less than or equal to 6000 µeq/g). Other ranges are also possible. The binding capacity of an ion exchange resin may be determined by measuring the breakthrough curve of the ion exchange resin. Briefly, measuring the breakthrough curve may comprise feeding a sodium chloride solution into a column containing the ion exchange resin in protonated form and then measuring the concentration of sodium at the outlet of the column over time.

[Extractants]

Further details regarding suitable extractants are provided below.

In some embodiments, an extractant is capable of and/or configured to bind to one or more metals that are bound to an ion exchange resin e.g. as present in a column. The extractant may comprise one or more functional groups that serve as sources of both one or more cations and one or more anions. The extractant may further comprise one or more neutral functional groups. In some embodiments, the extractant may be a salt. It is also possible for the extractant to be an acid (i.e., the cation(s) may comprise protons). In some embodiments, an extractant comprises one or more ligands capable of and/or configured to bind to one or more metals that are neutral. Non-limiting examples of suitable types of extractants include organic phosphorus compounds, amine salts, beta diketones, carboxylic acids, amides, dithiocarbamates, and mineral acids. In some embodiments, an extractant is an organic acid and/or a fluorinated species (e.g., an organic acid and/or fluorinated species that falls into one or more of the preceding categories, an organic acid and/or fluorinated species that does not fall into any of the preceding categories). In some embodiments, two or more extractants are employed together (e.g., at the same time, during different times during loading and/or elution). The two or more extractants may both be capable of and/or configured to bind to one or more metals that are bound to an ion exchange resin e.g. as present in a column. In embodiments relating to two or more extractants, it should be understood that each extractant may independently comprise one or more of the compositions described herein.

Non-limiting examples of suitable organic phosphorus extractant compounds include phosphoric acids (e.g., bis(2-ethylhexyl) phosphate, ammonium-substituted bis(2-ethylhexyl) phosphate, bis-isodecyl phosphoric acid, bis-isostearyl phosphoric acid, di-n-butyl phosphoric acid, di-n-amyl phosphoric acid, di-n-octyl phosphoric acid, diisoamyl phosphoric acid), phosphoric acid esters, phosphonic acids (e.g., 2-ethylhexylphosphonic acid mono-2-ethylhexyl ester), phosphinic acids (e.g., di-(2,4,4-trimethylpentyl) phosphinic acid), monothiophosphinic acids (e.g., bis(2,4,4-trimethylpentyl) monothiophosphinic acid)), dithiophosphinic acids (e.g., bis(2,4,4-trimethylpentyl) dithiophosphinic acid)), and compounds comprising neutral ligands comprising phosphorus (e.g., tributyl phosphate, octyl(phenyl)-N,N-diisobutylcarbamoylmethylphosphine oxide, tetraamyl methylenediphosphonate, dioctyl N,N-diethylcarbamylphosphonate, tetraamyl methylenediphosphonate, Cyanex 923, dihexyl N,N-dibutylcarbamylmethylenephosphonate, trioctylphosphine oxide, tributylphosphine oxide, triisobutylphosphine oxide, tris(2-ethylhexyl)phosphine oxide).

Non-limiting examples of suitable amine salt extractants include trioctyl amine, tridecyl amine, bis(2-ethylhexyl) amine, tris(2-ethylhexyl)amine, tripentylamine, tributyl amine, and triisobutylamine.

Non-limiting examples of suitable beta diketone extractants. include fluorinated beta diketones, such as hexafluoroacetylacetone, 2,2-dimethyl-6,6,7,7,8,8,8-heptafluoro-3,5-octanedione, and thenoyltrifluoroacetone.

Non-limiting embodiments of suitable amide extractants include diglycolamides and malonamides. Non-limiting examples of diglycolamides include N,N,N',N'-tetraoctyl diglycolamide, N,N-di-2-ethylhexyl-N',N'-di-octyl diglycolamide, N,N,N',N'-tetra-2-ethylhexyl diglycolamide, N,N-di-decyl-N',N'-di-hexyl glycolamide, N,N-di-butyl-N',N'-di-dodecyl glycolamide, N,N,N',N'-tetra-hexyl diglycolamide, N,N,N',N'-tetradecyl diglycolamide, N,N,N',N'-tetrado-decyl-diglycolamide, N,N,N',N'-tetraamyl-3-oxapentanediamide, N,N,N',N'-tetrapropyl-3-oxapentanediamide, N,N,N',N'-tetramethyldiglycolamide, N,N,N',N'-tetraethyl diglycolamide, and N,N-dioctyldiglycolamic acid. One non-limiting example of a malonamide is N,N'-dimethyl-N,N'-dioctylhexylethoxymalonamide. Further non-limiting examples of amides include N,N,N',N',N'',N''-hexaalkyl-nitrilotriacetamide, N,N,N',N'-tetraethyl-3,6-dioxaoctane diamide, and N,N,N',N'-tetraoctyl-3,6-dioxaoctane diamide.

Non-limiting examples of dithiocarbamate extractants include bis(trifluoroethyl) dithiocarbamate and diethyldithiocarbamate.

Non-limiting examples of suitable mineral acid extractants include hydrochloric acid and nitric acid.

Non-limiting examples of further suitable organic acid extractants include propanoic acid, butanoic acid, and pentanoic acid.

Four non-limiting examples of combinations of extractants that may be suitable for use together include hexafluoroacetylacetone with tributyl phosphate, 2-thenoyltrifluoroacetone with tributyl phosphate, 2-(trifluoromethyl)-2-hydroxypropionic acid with tributyl phosphate, and mineral acids (e.g., hydrochloric acid, nitric acid) with neutral extractants (e.g., tributyl phosphate). In some embodiments, one extractant may assist with solubilizing one or more other extractants. For instance, neutral extractants may assist with solubilizing mineral acids.

In some embodiments, an extractant comprises a functional group capable of binding one or more target metals for purification. In some embodiments, such functional groups are anionic. The functional group capable of binding one or more target metals may have a relatively low proton dissociation constant. In other words, the functional group capable of binding one or more target metals may have a relatively high tendency to bind to displaceable ions. In some embodiments, the functional group has a proton dissociation constant of less than or equal to $10^{-1}$, less than or equal to $10^{-2}$, less than or equal to $10^{-3}$, or less than or equal to $10^{-4}$. In some embodiments, the functional group has a proton dissociation constant of greater than or equal to $10^{-5}$, greater than or equal to $10^{-4}$, greater than or equal to $10^{-3}$, or greater than or equal to $10^{-2}$. Combinations of the above-referenced ranges are also possible (e.g., less than or equal to $10^{-1}$ and greater than or equal to $10^{-5}$). Other ranges are also possible.

The proton dissociation constant for the functional groups for the extractant has the same meaning as that described elsewhere herein with respect to the proton dissociation constant for the functional groups for the ion exchange resin except that the relevant functional groups are those of the functional group for the extractant.

When an extractant comprises two or more types of functional groups capable of binding one or more target metals, each type of functional group capable of binding one or more such metals may independently have a proton dissociation constant in one or more of the ranges described above. Similarly, when two or more extractants are employed together, each extractant may independently comprise a functional group capable of binding one or more such metals having a proton dissociation constant in one or more of the ranges described above.

In some embodiments, an extractant may have a relatively high solubility in a carrier fluid solvent used for forming a mobile phase for flow through the column containing the ion exchange resin and/or introduced into the ion exchange resin with the extractant. The solubility may be greater than or equal to 50 mmol/L, greater than or equal to 75 mmol/L, greater than or equal to 100 mmol/L, greater than or equal to 200 mmol/L, greater than or equal to 500 mmol/L, greater than or equal to 750 mmol/L, greater than or equal to 1000 mmol/L, greater than or equal to 1500 mmol/L, greater than or equal to 2000 mmol/L, or greater than or equal to 3000 mmol/L. The solubility may be less than or equal to 5000 mmol/L, less than or equal to 3000 mmol/L, less than or equal to 2000 mmol/L, less than or equal to 1500 mmol/L, less than or equal to 1000 mmol/L, less than or equal to 750 mmol/L, less than or equal to 500 mmol/L, less than or equal to 200 mmol/L, less than or equal to 100 mmol/L, or less than or equal to 75 mmol/L. Combinations of the above-referenced ranges are also possible (e.g., greater than or equal to 50 mmol/L and less than or equal to 5000 mmol/L). Other ranges are also possible.

When two or more extractants are employed together, each extractant may independently have a solubility in a carrier fluid used for forming a mobile phase for flow through the column containing the ion exchange resin and/or introduced into the ion exchange resin with the extractant in one or more of the ranges described above.

When introduced into a column in the presence of such a fluid, the concentration of the extractant in the fluid during the introduction may be selected as desired for the particular ion exchange resin loading or elution process being performed. In some embodiments, the concentration is greater than or equal to 50 mmol/L, greater than or equal to 75 mmol/L, greater than or equal to 100 mmol/L, greater than or equal to 200 mmol/L, greater than or equal to 500 mmol/L, greater than or equal to 750 mmol/L, greater than or equal to 1000 mmol/L, greater than or equal to 1500 mmol/L, or greater than or equal to 2000 mmol/L. In some embodiments, the concentration is less than or equal to 3000 mmol/L, less than or equal to 1500 mmol/L, less than or equal to 1000 mmol/L, less than or equal to 750 mmol/L, less than or equal to 500 mmol/L, less than or equal to 200 mmol/L, less than or equal to 100 mmol/L, or less than or equal to 75 mmol/L. Combinations of the above-referenced ranges are also possible (e.g., greater than or equal to 50 mmol/L and less than or equal to 3000 mmol/L). Other ranges are also possible.

As described above, some embodiments involve introducing a fluid into a column that has an extractant concentration that varies with time. In such cases, it should be understood that, for each moment in time, the extractant concentration may individually be in one or more of the above-referenced ranges. For instance, the initial extractant concentration may be in one or more of the above-referenced ranges and/or the final extractant concentration may be in one or more of the above-referenced ranges. In embodiments in which two extractants are provided together, each extractant may independently be present (at one or more points in time) in one or more of the above-referenced ranges and/or all of the extractants together may be present (at one or more points in time) in one or more of the above-referenced ranges.

When the concentration of extractant in a fluid being introduced into a column changes with time, it may do so discontinuously or continuously and at a variety of suitable rates. In some embodiments, the rate of change of the extractant concentration is greater than or equal to 0.5 mmol/(L*min), greater than or equal to 0.75 mmol/(L*min), greater than or equal to 1 mmol/(L*min), greater than or equal to 2 mmol/(L*min), greater than or equal to 5 mmol/(L*min), greater than or equal to 7.5 mmol/(L*min), greater than or equal to 10 mmol/(L*min), greater than or equal to 12.5 mmol/(L*min), greater than or equal to 15 mmol/(L*min), or greater than or equal to 17.5 mmol/(L*min). In some embodiments, the rate of change of the extractant concentration is less than or equal to 20 mmol/(L*min), less than or equal to 17.5 mmol/(L*min), less than or equal to 15 mmol/(L*min), less than or equal to 12.5 mmol/(L*min), less than or equal to 10 mmol/(L*min), less than or equal to 7.5 mmol/(L*min), less than or equal to 5 mmol/(L*min), less than or equal to 2 mmol/(L*min), less than or equal to 1 mmol/(L*min), or less than or equal to 0.75 mmol/(L*min). Combinations of the above-referenced ranges are also possible (e.g., greater than or equal to 0.5 mmol/(L*min) and less than or equal to 20 mmol/(L*min)). Other ranges are also possible.

The ranges in the preceding paragraph should be understood to be rates at which the concentration of the extractant may increase or rates at which the concentration of the extractant may decrease (i.e., the concentration of extractant may increase at a rate in one or more of these ranges or may decrease at a rate in one or more of these ranges). In embodiments in which two extractants are provided together, the concentration of each extractant may independently have a rate of change in one or more of the above-referenced ranges and/or all of the extractants together may be have a rate of change in one or more of the above-referenced ranges.

[Target Metals for Purification Using the Methods Described]

Further details regarding some suitable target metals that may be enriched or purified are provided below.

In some embodiments, a composition comprises two or more (e.g., three or more, four or more, five or more, six or more, etc.) metals with one or more being a target species to be purified. The metals to be processed advantageously have differing tendencies to bind to the ion exchange resin and/or to the extractant, which can facilitate elution of the different metals at different points in time. Without wishing to be bound by any particular theory, it is believed that a metal's charge and/or ionic radius may affect such tendencies. For instance, it is believed that metals having higher charges will have a higher tendency to bind to ion exchange resins. As another example, it is believed that metals having smaller ionic radii (and, possibly, higher atomic number) may bind more strongly to some extractants (e.g., some organic phosphorus compounds, such as bis(2-ethylhexyl) phosphate, where bonding is believed to occur between a deprotonated oxygen and the metal) than metals having larger ionic radii.

Non-limiting examples of metals that may be purified from initial compositions containing such target metals in combination with other metal species include lanthanides, rare earth metals, aluminum, iron, and chromium. These metals may be purified from compositions that do not comprise any other types of metals (e.g., some embodiments may relate to selectively recovering one or more lanthanides from compositions lacking metals other than lanthanides) or from compositions that comprise two or more types of metals (e.g., some embodiments may relate to selectively recovering one or more lanthanides from a composition further comprising one or more non-lanthanide rare earth metals, aluminum, iron, and/or chromium).

The metals to be purified may be present in a variety of suitable forms during the purification process. In some embodiments, the metals are in ionic form during one or more steps of the purification process (e.g., during introduction of the metals to the column, during ion exchange, during elution). For instance, some embodiments relate to purification of trivalent ions from compositions comprising two or more metals (e.g., two or more trivalent metal ions, one or more trivalent ions in the presence of metals other than trivalent ions) and/or non-trivalent ions from compositions comprising two or more metals. It is also possible for the metals to form a portion of an organometallic complex during one or more steps of the selective recovery process (e.g., during introduction of the metals to the column, during ion exchange, during elution). For instance, the metal may be introduced into the column while coordinated to one or more organic ligands with which it forms an organometallic complex, may bind to the ion exchange resin to form an organometallic complex with the ion exchange resin, and/or may elute from the column and/or ion exchange resin while coordinated to an extractant with which it forms an organometallic complex. The metals to be enriched may be a variety of suitable isotopes, including those naturally occurring, those not occurring naturally, those that are radioactive, and those that are not radioactive.

Non-limiting examples of lanthanides that may be purified include La, Ce, Nd, Pr, Pm, Sm, Eu, Gd, Tb, Dy, Ho, Er, Tm, Yb, and Lu. Non-limiting examples of suitable isotopes of these metals include $^{177}$Lu, $^{143}$Pr, $^{157}$Gd, $^{149}$Gd, $^{149}$Sm, $^{148}$Sm, $^{150}$Sm, $^{153}$Sm, $^{149}$Pm, $^{147}$Nd, $^{148}$Nd, $^{150}$Nd, $^{151}$Eu, $^{166}$Yb, $^{169}$Yb, $^{171}$Yb, $^{175}$Yb, $^{176}$Yb, $^{177}$Yb, $^{161}$Ho, $^{166}$Ho, $^{165}$Dy, $^{166}$Dy, $^{157}$Dy, $^{161}$Tb, $^{149}$Tb, $^{167}$Tm, $^{169}$Er, $^{165}$Er, $^{160}$Er, and $^{171}$Er.

Non-limiting examples of rare earth metals that may be purified include the lanthanides described above, Y, and Sc. Non-limiting examples of suitable isotopes of Y and Sc include $^{90}$Y, $^{43}$Sc, $^{44}$Sc, and $^{47}$Sc.

Metals may be provided in a variety of suitable amounts. In some embodiments, a composition comprising metals to be purified, an ion exchange resin to which metals are bound, and/or a column containing metals may comprise greater than or equal to 1 ng, greater than or equal to 10 ng, greater than or equal to 100 ng, greater than or equal to 1 μg, greater than or equal to 10 μg, greater than or equal to 100 μg, greater than or equal to 1 mg, greater than or equal to 10 mg, greater than or equal to 100 mg, greater than or equal to 1 g, greater than or equal to 10 g, greater than or equal to 100 g, greater than or equal to 1 kg, greater than or equal to 10 kg, or greater than or equal to 100 kg of metal. In some embodiments, a composition comprising metals to be purified, an ion exchange resin to which metals are bound, and/or a column containing metals may comprise less than or equal to 1000 kg, less than or equal to 10 kg, less than or equal to 1 kg, less than or equal to 100 g, less than or equal to 10 g, less than or equal to 1 g, less than or equal to 100 mg, less than or equal to 10 mg, less than or equal to 1 mg, less than or equal to 100 μg, less than or equal to 10 μg, less than or equal to 1 μg, less than or equal to 100 ng, or less than or equal to 10 ng. Combinations of the above-referenced ranges are also possible (e.g., greater than or equal to 1 ng and less than or equal to 1000 kg). Other ranges are also possible. In some embodiments, the composition, ion exchange resin, and/or column comprises two or more metals, each of which independently is present in an amount in one or more of the above-referenced ranges. In some embodiments, the composition, ion exchange resin, and/or column comprises two or more metals, and the mass of all of the metals together is in one or more of the above-referenced ranges.

Metals may be introduced to an ion exchange resin and/or into a column at a variety of suitable rates. In some embodiments, a fluid comprising metals is introduced to an ion exchange resin and/or into a column at a rate of greater than or equal to 0.001 mL/min, greater than or equal to 0.01 mL/min, greater than or equal to 0.1 mL/min, greater than or equal to 1 mL/min, greater than or equal to 10 mL/min, greater than or equal to 100 mL/min, greater than or equal to 1 L/min, greater than or equal to 10 L/min, greater than or equal to 100 L/min, or greater than or equal to 1 kL/min. In some embodiments, a fluid comprising metals is introduced to an ion exchange resin and/or into a column at a rate of less than or equal to 2 kL/min, less than or equal to 1 kL/min, less than or equal to 100 L/min, less than or equal to 10 L/min, less than or equal to 1 L/min, less than or equal to 100 mL/min, less than or equal to 10 mL/min, less than or equal to 1 mL/min, less than or equal to 0.1 mL/min, or less than or equal to 0.01 mL/min. Combinations of the above-referenced ranges are also possible (e.g., greater than or equal to 0.001 mL/min and less than or equal to 2 kL/min). Other ranges are also possible.

[Carrier Fluids for the Mobile Phase]

Further details regarding some suitable carrier fluids are provided below.

Some embodiments relate to selective recovery of metals in the presence of a non-aqueous fluid. The non-aqueous fluid may lack water and/or may comprise water in only trace amounts. Without wishing to be bound by any particular theory, it is believed that some extractants that are particularly suited for purification of some or all of the target metals described in the section above may be insoluble or minimally soluble in water. For such extractants, non-aqueous fluids can provide appropriate solubilization and can allow use of advantageous extractants that would otherwise not be possible. In some embodiments, a non-aqueous fluid comprises one, two, or more non-aqueous solvents, such as organic solvent(s). Non-limiting examples of suitable non-aqueous solvents include carbon dioxide ($CO_2$), alkanes, alkenes, benzenes and benzene derivatives, ketones, ethers (e.g., tetrahydrofuran), alcohols, kerosene, acetates, sulfoxides (e.g., dimethylsulfoxide), chlorinated species, and ionic liquids. Non-limiting examples of suitable alkanes include straight chain alkanes (e.g., hexanes, such as n-hexane), isoalkanes, and cycloalkanes.

A fluid for use in the mobile phase may also be or comprise an ionic liquid, e.g., an ionic liquid cation and/or an ionic liquid anion. Non-limiting examples of suitable ionic liquid cations include imidazolium ions, pyrrolidinium ions, morpholinium ions, pyridinium ions, quaternary ammonium ions (e.g., trioctylmethylammonium, trialkylmethylammonium-sec-nonylphenoxy, trioctyl(2-ethoxy-2-oxoethyl)ammonium, tricaprylmethylammonium, tetrabutylammonium), isoquinolinium ions, piperidinium ions, pyrazinium ions, and phosphonium ions (e.g., trihexyltetradecylphosphonium).

Non-limiting examples of suitable ionic liquid anions include bis(trifluoromethylsulfonyl)imide, triflate, thiocyanate, halide ions, nitrate ions, carboxylate ions, phosphate ions (e.g., hexafluorophosphate, dihydrogen phosphate, bis (2-ethylhexyl) phosphate, di(2-ethylhexyl)phosphate), sulfate ions, silicon hexafluoride, benzoate, acetate, and dihexyl diglycolamate.

Non-limiting examples of suitable ionic liquids include trioctylmethylammonium bis(2-ethylhexyl) phosphate, trioctylmethylammonium benzoate, trihexyltetradecylphosphonium bis(2-ethylhexyl) phosphate, trihexyltetradecylphosphonium benzoate, trialkylmethylammonium-sec-nonylphenoxy acetate, trioctyl(2-ethoxy-2-oxoethyl) ammonium dihexyl diglycolamate, tricaprylmethylammonium dihexyl diglycolamate, and tetrabutylammonium di(2-ethylhexyl)phosphate.

In some embodiments, an ionic liquid comprises further species in addition to ions. Non-limiting examples of such species include beta diketones, methanides (e.g., dinitromethanide, cyanonitromethanide, cyanonitronitrosomethanide dicyanonitromethanide, dinitromethanide), and polynitrile.

In some embodiments, a non-aqueous carrier fluid may be a supercritical or near-supercritical fluid and/or it may comprise one or more solvents that are supercritical (e.g., carbon dioxide ($CO_2$), one or more organic solvents). Advantageously, the supercritical fluid may have a high diffusivity and/or a low viscosity, both of which may enhance the rate at which metals can be extracted into an extractant provided therewith. It is also possible for the non-aqueous carrier fluid to be a liquid, such as an unpressurized liquid, a pressurized liquid, and/or a near-critical liquid.

In some embodiments, a suitable non-aqueous fluid is non-polar and/or has a relatively low dielectric constant. The dielectric constant of the non-aqueous fluid may be less than or equal to 15, less than or equal to 14, less than or equal to 13, less than or equal to 12, less than or equal to 11, less than or equal to 10, less than or equal to 9, less than or equal to 8, less than or equal to 7, less than or equal to 6, less than or equal to 5, less than or equal to 4, less than or equal to 3, or less than or equal to 2. The dielectric constant of the non-aqueous fluid may be greater than or equal to 1, greater than or equal to 2, greater than or equal to 3, greater than or equal to 4, greater than or equal to 5, greater than or equal to 6, greater than or equal to 7, greater than or equal to 8, greater than or equal to 9, greater than or equal to 10, greater than or equal to 11, greater than or equal to 12, greater than or equal to 13, or greater than or equal to 14. Combinations of the above-referenced ranges are also possible (e.g., less than or equal to 15 and greater than or equal to 1). Other ranges are also possible. The dielectric constant of a non-aqueous fluid may be determined by measuring the capacitance of a dielectric probe immersed therein.

Such solvents and/or fluids may be provided to the column and/or present in the column at a variety of suitable pressures. In some embodiments, the solvents and/or fluids are provided to the column and/or present in the column at a pressure of greater than or equal to 0 psig, greater than or equal to 1 psig, greater than or equal to 2 psig, greater than or equal to 5 psig, greater than or equal to 7.5 psig, greater than or equal to 10 psig, greater than or equal to 20 psig, greater than or equal to 50 psig, greater than or equal to 75 psig, greater than or equal to 100 psig, greater than or equal to 200 psig, greater than or equal to 500 psig, greater than or equal to 750 psig, greater than or equal to 1000 psig, greater than or equal to 2000 psig, greater than or equal to 5000 psig, greater than or equal to 7500 psig, greater than or equal to 10,000 psig, or greater than or equal to 15,000 psig. In some embodiments, the solvents and/or fluids are provided to the column and/or present in the column at a pressure of less than or equal to 20,000 psig, less than or equal to 15,000 psig, less than or equal to 10,000 psig, less than or equal to 7500 psig, less than or equal to 5000 psig, less than or equal to 2000 psig, less than or equal to 1000 psig, less than or equal to 750 psig, less than or equal to 500 psig, less than or equal to 200 psig, less than or equal to 100 psig, less than or equal to 75 psig, less than or equal to 50 psig, less than or equal to 20 psig, less than or equal to 10 psig, less than or equal to 7.5 psig, less than or equal to 5 psig, less than or equal to 2 psig, or less than or equal to 1 psig. Combinations of the above-referenced ranges are also possible (e.g., greater than or equal to 0 psig and less than or equal to 20,000 psig). Other ranges are also possible.

The pressure of solvents and/or fluids provided to a column and/or present in a column at may be varied in a variety of suitable manners. In some embodiments, the pressure of the solvents and/or fluids provided to the column and/or present in the column varies at a rate of greater than or equal to 1 psig/min, greater than or equal to 2 psig/min, greater than or equal to 5 psig/min, greater than or equal to 7.5 psig/min, greater than or equal to 10 psig/min, greater than or equal to 20 psig/min, greater than or equal to 50 psig/min, greater than or equal to 75 psig/min, greater than or equal to 100 psig/min, greater than or equal to 150 psig/min, greater than or equal to 200 psig/min, greater than or equal to 300 psig/min, or greater than or equal to 400 psig/min. In some embodiments, the pressure of the solvents and/or fluids provided to the column and/or present in the column varies at a rate of less than or equal to 500 psig/min, less than or equal to 400 psig/min, less than or equal to 300 psig/min, less than or equal to 200 psig/min, less than or equal to 150 psig/min, less than or equal to 100 psig/min, less than or equal to 75 psig/min, less than or equal to 50 psig/min, less than or equal to 20 psig/min, less than or equal to 10 psig/min, less than or equal to 7.5 psig/min, less than or equal to 5 psig/min, or less than or equal to 2 psig/min. Combinations of the above-referenced ranges are also possible (e.g., greater than or equal to 1 psig/min and less than or equal to 500 psig/min). Other ranges are also possible. It should also be understood that some embodiments may comprise increasing the pressure at a rate in one or more of the above-referenced ranges and some embodiments may comprise decreasing the pressure at a rate in one or more of the above-referenced ranges.

The solvents and/or fluids may be provided to the column and/or present in the column at a variety of suitable temperatures. In some embodiments, the solvents and/or fluids are provided to the column and/or present in the column at a temperature of greater than or equal to 15° C., greater than or equal to 20° C., greater than or equal to 25° C., greater than or equal to 30° C., greater than or equal to 35° C., greater than or equal to 40° C., greater than or equal to 45° C., greater than or equal to 50° C., greater than or equal to 55° C., greater than or equal to 60° C., greater than or equal to 65° C., greater than or equal to 70° C., or greater than or equal to 75° C. In some embodiments, the solvents and/or fluids are provided to the column and/or present in the column at a temperature of less than or equal to 80° C., less than or equal to 75° C., less than or equal to 70° C., less than or equal to 65° C., less than or equal to 60° C., less than or equal to 55° C., less than or equal to 50° C., less than or equal to 45° C., less than or equal to 40° C., less than or equal to 35° C., less than or equal to 30° C., less than or equal to 25° C., or less than or equal to 20° C. Combinations of the above-referenced ranges are also possible (e.g., greater than or equal to 15° C. and less than or equal to 80° C.). Other ranges are also possible.

In some embodiments, the column may be capable of being heated to and/or withstanding exposure to temperatures in one or more of the above-referenced ranges.

The temperature of solvents and/or fluids provided to a column and/or present in a column at may be varied in a variety of suitable manners. In some embodiments, the temperature of the solvents and/or fluids provided to the column and/or present in the column varies at a rate of greater than or equal to 0.1° C./min, greater than or equal to 0.2° C./min, greater than or equal to 0.5° C./min, greater than or equal to 0.75° C./min, greater than or equal to 1° C./min, greater than or equal to 1.5° C./min, greater than or equal to 2° C./min, greater than or equal to 3° C./min, greater than or equal to 5° C./min, or greater than or equal to 7.5° C./min. In some embodiments, the temperature of the solvents and/or fluids provided to the column and/or present in the column varies at a rate of less than or equal to 10° C./min, less than or equal to 7.5° C./min, less than or equal to 5° C./min, less than or equal to 3° C./min, less than or equal to 2° C./min, less than or equal to 1.5° C./min, less than or equal to 1° C./min, less than or equal to 0.75° C./min, less than or equal to 0.5° C./min, or less than or equal to 0.2° C./min. Combinations of the above-referenced ranges are also possible (e.g., greater than or equal to 0.1° C./min and less than or equal to 10° C./min). Other ranges are also possible. It should also be understood that some embodiments may comprise increasing the temperature at a rate in one or more of the above-referenced ranges and some embodiments may comprise decreasing the temperature at a rate in one or more of the above-referenced ranges.

In some embodiments, a non-aqueous fluid is selected such that, under the conditions present in the column during some or all of the methods described herein, it swells the ion exchange resin to a relatively low degree. For instance, in some embodiments, the non-aqueous fluid causes the column to swell by less than 10%, less than 7.5%, less than 5%, less than 2%, less than 1%, less than 0.75%, less than 0.5%, less than 0.2%, or less than 0.1%. In some embodiments, the non-aqueous fluid causes the column to swell by greater than or equal to 0%, greater than 0.1%, greater than 0.2%, greater than 0.5%, greater than 0.75%, greater than 1%, greater than 2%, greater than 5%, or greater than 7.5%. Combinations of the above-referenced ranges are also possible (e.g., less than 10% and greater than or equal to 0%). Other ranges are also possible.

The amount of ion exchange resin swelling may be determined by: (1) placing the ion exchange resin in a glass column; (2) measuring the height of the ion exchange resin; (3) filling the glass column with the non-aqueous fluid; (4) soaking the ion exchange resin in the non-aqueous fluid until the bed height is observed to stabilize; (5) measuring the new bed height of the ion exchange resin; and (6) calculating the change in volume of the ion exchange resin based on the difference between the initial height of the ion exchange resin and the bed height of the ion exchange resin after stabilization after soaking in the non-aqueous fluid.

[Fluid Flow Velocities in the Column]

Further details regarding suitable fluid flow rates through columns for performing methods disclosed herein are provided below.

The columns employed herein may have a variety of suitable diameters. In some embodiments, the column has a diameter of greater than or equal to 1 mm, greater than or equal to 1.25 mm, greater than or equal to 1.5 mm, greater than or equal to 1.75 mm, greater than or equal to 2 mm, greater than or equal to 2.25 mm, greater than or equal to 2.5 mm, greater than or equal to 2.75 mm, greater than or equal to 3 mm, greater than or equal to 3.25 mm, greater than or equal to 3.5 mm, greater than or equal to 3.75 mm, greater than or equal to 4 mm, greater than or equal to 4.25 mm, greater than or equal to 4.5 mm, or greater than or equal to 4.75 mm. In some embodiments, the column has a diameter of less than or equal to 5 mm, less than or equal to 4.75 mm, less than or equal to 4.5 mm, less than or equal to 4.25 mm, less than or equal to 4 mm, less than or equal to 3.75 mm, less than or equal to 3.5 mm, less than or equal to 3.25 mm, less than or equal to 3 mm, less than or equal to 2.75 mm, less than or equal to 2.5 mm, less than or equal to 2.25 mm, less than or equal to 2 mm, less than or equal to 1.75 mm, less than or equal to 1.5 mm, or less than or equal to 1.25 mm. Combinations of the above-referenced ranges are also possible (e.g., greater than or equal to 1 mm and less than or equal to 5 mm). Other ranges are also possible.

The columns employed herein may have a variety of suitable lengths. In some embodiments, the column has a length of greater than or equal to 2 cm, greater than or equal to 5 cm, greater than or equal to 7.5 cm, greater than or equal to 10 cm, greater than or equal to 20 cm, greater than or equal to 50 cm, greater than or equal to 75 cm, greater than or equal to 1 m, greater than or equal to 2 m, greater than or equal to 5 m, greater than or equal to 7.5 m, greater than or equal to 10 m, greater than or equal to 15 m, greater than or equal to 20 m, greater than or equal to 30 m, or greater than or equal to 50 m. In some embodiments, the column has a length of less than or equal to 80 m, less than or equal to 50 m, less than or equal to 30 m, less than or equal to 20 m, less than or equal to 15 m, less than or equal to 10 m, less than or equal to 7.5 m, less than or equal to 5 m, less than or equal to 2 m, less than or equal to 1 m, less than or equal to 75 cm, less than or equal to 50 cm, less than or equal to 20 cm, less than or equal to 10 cm, less than or equal to 7.5 cm, or less than or equal to 5 cm. Combinations of the above-referenced ranges are also possible (e.g., greater than or equal to 2 cm an dless than or equal to 80 m). Other ranges are also possible.

The fluid may flow through the column at a variety of suitable superficial velocities. In some embodiments, the fluid flows through the column at a superficial velocity of greater than or equal to 0.1 cm/min, greater than or equal to 0.2 cm/min, greater than or equal to 0.5 cm/min, greater than or equal to 0.75 cm/min, greater than or equal to 1 cm/min, greater than or equal to 2.5 cm/min, greater than or equal to 5 cm/min, greater than or equal to 7.5 cm/min, greater than or equal to 10 cm/min, greater than or equal to 15 cm/min, greater than or equal to 20 cm/min, greater than or equal to 50 cm/min, greater than or equal to 75 cm/min, greater than or equal to 100 cm/min, greater than or equal to 150 cm/min, or greater than or equal to 200 cm/min. In some embodiments, the fluid flows through the column at a superficial velocity of less than or equal to 300 cm/min, less than or equal to 200 cm/min, less than or equal to 150 cm/min, less than or equal to 100 cm/min, less than or equal to 75 cm/min, less than or equal to 50 cm/min, less than or equal to 20 cm/min, less than or equal to 15 cm/min, less than or equal to 10 cm/min, less than or equal to 7.5 cm/min, less than or equal to 5 cm/min, less than or equal to 2.5 cm/min, less than or equal to 1 cm/min, less than or equal to 0.75 cm/min, less than or equal to 0.5 cm/min, or less than or equal to 0.2 cm/min. Combinations of the above-referenced ranges are also possible (e.g., greater than or equal to 0.1 cm/min and less than or equal to 300 cm/min, or greater than or equal to 0.1 cm/min and less than or equal to 10 cm/min). Other ranges are also possible. The superficial velocity may be determined by measuring the volumetric flow rate of the fluid and dividing the measured volumetric flow rate by the cross-sectional area of the column.

The methods described herein may be performed for a variety of suitable amounts of time. In some embodiments, a method is performed for greater than or equal to 2 minutes, greater than or equal to 5 minutes, greater than or equal to 7.5 minutes, greater than or equal to 10 minutes, greater than or equal to 15 minutes, greater than or equal to 20 minutes, greater than or equal to 30 minutes, greater than or equal to 60 minutes, greater than or equal to 90 minutes, greater than or equal to 120 minutes, greater than or equal to 150 minutes, greater than or equal to 180 minutes, greater than or equal to 240 minutes, greater than or equal to 300 minutes, greater than or equal to 360 minutes, greater than or equal to 420 minutes, greater than or equal to 480 minutes, greater than or equal to 540 minutes, greater than or equal to 600 minutes, greater than or equal to 660 minutes, greater than or equal to 720 minutes, or greater than or equal to 780 minutes. In some embodiments, a method is performed for less than or equal to 800 minutes, less than or equal to 780 minutes, less than or equal to 720 minutes, less than or equal to 660 minutes, less than or equal to 600 minutes, less than or equal to 540 minutes, less than or equal to 480 minutes, less than or equal to 420 minutes, less than or equal to 360 minutes, less than or equal to 300 minutes, less than or equal to 240 minutes, less than or equal to 180 minutes, less than or equal to 150 minutes, less than or equal to 120 minutes, less than or equal to 90 minutes, less than or equal to 60 minutes, less than or equal to 30 minutes, less than or equal to 20 minutes, less than or equal to 15 minutes, less than or equal to 10 minutes, less than or equal to 7.5 minutes, or less than or equal to 5 minutes. Combinations of the above-referenced ranges are also possible (e.g., greater than or equal to 2 minutes and less than or equal to 800 minutes, or greater than or equal to 15 minutes and less than or equal to 800 minutes). Other ranges are also possible.

[Performance]

Some embodiments relate to the recovery of one or more metals at a relatively high purity. For instance, in some embodiments, the metal makes up greater than 1 wt %, greater than 2 wt %, greater than 5 wt %, greater than 7.5 wt %, greater than 10 wt %, greater than 15 wt %, greater than 20 wt %, greater than 30 wt %, greater than 40 wt %, greater than 50 wt %, greater than 60 wt %, greater than 70 wt %, greater than 80 wt %, greater than 90 wt %, greater than 95 wt %, greater than 99 wt %, greater than 99.5 wt %, greater than 99.9 wt %, or greater than 99.99 wt % of the species other than the extractant and the solvent in the fluid being eluted. In some embodiments, the metal makes up less than or equal to 100 wt %, less than 99.99 wt %, less than 99.9 wt %, less than 99.5 wt %, less than 99 wt %, less than 95 wt %, less than 90 wt %, less than 80 wt %, less than 70 wt %, less than 60 wt %, less than 50 wt %, less than 40 wt %, less than 30 wt %, less than 20 wt %, less than 15 wt %, less than 10 wt %, less than 7.5 wt %, less than 5 wt %, or less than 2 wt % of the species other than the extractant and the solvent in the fluid being eluted. Combinations of the above-referenced ranges are also possible (e.g., greater than 1 wt % and less than or equal to 100 wt %, or greater than 80 wt % and less than or equal to 100 wt %). Other ranges are also possible. The recovery of a metal may be determined by Inductively Coupled Plasma Mass Spectrometry.

When two or more metals are recovered together (e.g., two or more target metals, which may be later purified), each metal may independently make up a wt % of the species other than the extractant and the solvent in the fluid being eluted in one or more of the ranges described above and/or both metals together may make up a wt % of the species other than the extractant and the solvent in the fluid being eluted in one or more of the ranges described above. It should also be understood that target metals may be recovered such that it makes up a wt % of the species other than the extractant and the solvent in the fluid being eluted in one or more of the ranges described above and that non-target metals may be recovered such that they make up a wt % of the species other than the extractant and the solvent in the fluid being eluted in one or more of the ranges described above.

Some embodiments relate to the recovery of a relatively large percentage of one or more metals from an ion exchange resin and/or a composition comprising the metal (s). In some embodiments, greater than 0 wt %, greater than or equal to 1 wt %, greater than or equal to 2 wt %, greater than or equal to 5 wt %, greater than or equal to 7.5 wt %, greater than or equal to 10 wt %, greater than or equal to 15 wt %, greater than or equal to 20 wt %, greater than or equal to 30 wt %, greater than or equal to 40 wt %, greater than or equal to 50 wt %, greater than or equal to 60 wt %, greater than or equal to 70 wt %, greater than or equal to 80 wt %, greater than or equal to 90 wt %, greater than or equal to 95 wt %, greater than or equal to 99 wt %, greater than or equal to 99.5 wt %, greater than or equal to 99.9 wt %, or greater than or equal to 99.99 wt % of a metal present in a composition to be separated, present in a fluid introduced into a column, and/or bound to an ion exchange resin is recovered. In some embodiments, less than or equal to 100 wt %, less than or equal to 99.99 wt %, less than or equal to 99.9 wt %, less than or equal to 99.5 wt %, less than or equal to 99 wt %, less than or equal to 95 wt %, less than or equal to 90 wt %, less than or equal to 80 wt %, less than or equal to 70 wt %, less than or equal to 60 wt %, less than or equal to 50 wt %, less than or equal to 40 wt %, less than or equal to 30 wt %, less than or equal to 20 wt %, less than or equal to 15 wt %, less than or equal to 10 wt %, less than or equal to 7.5 wt %, less than or equal to 5 wt %, or less than or equal to 2 wt % of a metal present in a composition to be separated, present in a fluid introduced into a column, and/or bound to an ion exchange resin is recovered. Combinations of the above-referenced ranges are also possible (e.g., greater than 0 wt % and less than or equal to 100 wt %). Other ranges are also possible. The percentage recovery of a metal may be determined by Inductively Coupled Plasma Mass Spectrometry.

When two or more metals are recovered together (e.g., two or more target metals, which may be later purified), each metal may independently be recovered to degree in one or more of the ranges described above and/or the percentage recovery of both metals together may be in one or more of the ranges described above. It should also be understood that target metals may be recovered to a degree in one or more of the ranges described above and that non-target metals may be recovered to a degree in one or more of the ranges described above.

Some embodiments relate to recovery of a composition comprising a target metal at a relatively high purity from an initial composition comprising the target metal at a relatively low purity. For instance, some embodiments may comprise exposing a composition comprising a target metal at a relatively low purity to an ion exchange resin and then recovering a composition from the ion exchange resin comprising the target metal at a higher purity. The target metal may be present in the composition exposed to the ion exchange resin at a first concentration, and one or more other metals may together be present in the composition exposed to the ion exchange resin at a second concentration. The target metal may be present in the composition recovered from the ion exchange resin at a third concentration, and the one or more other metals may together be present in the composition recovered the ion exchange resin at a fourth concentration.

The ratio of the third concentration to the fourth concentration divided by the ratio of the first concentration to the second concentration may be greater than or equal to 1, greater than or equal to 10, greater than or equal to $10^2$, greater than or equal to $10^3$, greater than or equal to $10^4$, greater than or equal to $10^5$, greater than or equal to $10^6$, greater than or equal to $10^7$, greater than or equal to $10^8$, greater than or equal to $10^9$, greater than or equal to $10^{10}$, or greater than or equal to $10^{11}$. The ratio of the third concentration to the fourth concentration divided by the ratio of the first concentration to the second concentration may be less than or equal to $10^{12}$, less than or equal to $10^{11}$, less than or equal to $10^{10}$, less than or equal to $10^9$, less than or equal to $10^8$, less than or equal to $10^7$, less than or equal to $10^6$, less than or equal to $10^5$, less than or equal to $10^4$, less than or equal to $10^3$, less than or equal to $10^2$, or less than or equal to 10. Combinations of the above-referenced ranges are also possible (e.g., greater than or equal to 1 and less than or equal to $10^{12}$). Other ranges are also possible.

When two or more metals are recovered together (e.g., two or more target metals, which may be later purified), each metal may independently be recovered in a manner that can be characterized by one or more of the ranges described above and/or all of the metals together may be recovered in a manner that can be characterized by one or more of the ranges described above.

In some embodiments, selectively recovering a metal comprises recovering a fluid comprising a higher ratio of a first metal to a second metal than the ratio of the first metal to the second metal bound to the ion exchange resin and/or present in the column. The ratio of the first metal to the second metal in the fluid recovered from the column divided by the ratio of the first metal to the second metal bound to the ion exchange resin and/or present in the column may be greater than or equal to 1, greater than or equal to 10, greater than or equal to $10^2$, greater than or equal to $10^3$, greater than or equal to $10^4$, greater than or equal to $10^5$, greater than or equal to $10^6$, greater than or equal to $10^7$, greater than or equal to $10^8$, greater than or equal to $10^9$, greater than or equal to $10^{10}$, or greater than or equal to $10^{11}$. The ratio of the first metal to the second metal in the fluid recovered from the column divided by the ratio of the first metal to the second metal bound to the ion exchange resin and/or present in the column may be less than or equal to $10^{12}$, less than or equal to $10^{11}$, less than or equal to $10^{10}$, less than or equal to $10^9$, less than or equal to $10^8$, less than or equal to $10^7$, less than or equal to $10^6$, less than or equal to $10^5$, less than or equal to $10^4$, less than or equal to $10^3$, less than or equal to $10^2$, or less than or equal to 10. Combinations of the above-referenced ranges are also possible (e.g., greater than or equal to 1 and less than or equal to $10^{12}$). Other ranges are also possible.

As described above, in some embodiments, two or more metals may be recovered together and/or one or more metals may be recovered from an ion exchange resin to which two or more other metals are bound and/or from a column containing two or more other metals. In such cases, the quotients above may refer to the quotient of any particular metal being recovered in a particular step to any particular metal not being recovered in that step, to all of the metals being recovered in a particular step to any particular metal not being recovered in that step, to any particular metal being recovered in that step to all of the metals not being recovered in that step, and/or to all of the metals being recovered in a particular step to all of the metals not being recovered in that step.

In some embodiments, a composition comprising two metals is differentially eluted such a separation factor may be computed. The separation factor may have a variety of suitable values. In some embodiments, the separation factor is greater than or equal to 0.01, greater than or equal to 0.02, greater than or equal to 0.05, greater than or equal to 0.075, greater than or equal to 0.1, greater than or equal to 0.2, greater than or equal to 0.5, greater than or equal to 0.75, greater than or equal to 1, greater than or equal to 2, greater than or equal to 5, greater than or equal to 7.5, greater than or equal to 10, greater than or equal to 20, greater than or equal to 50, or greater than or equal to 75. In some embodiments, the separation factor is less than or equal to 100, less than or equal to 75, less than or equal to 50, less than or equal to 20, less than or equal to 10, less than or equal to 7.5, less than or equal to 5, less than or equal to 2, less than or equal to 1, less than or equal to 0.75, less than or equal to 0.5, less than or equal to 0.2, less than or equal to 0.1, less than or equal to 0.075, less than or equal to 0.05, or less than or equal to 0.02. Combinations of the above-referenced ranges are also possible (e.g., greater than or equal to 0.01 and less than or equal to 1). Other ranges are also possible.

As used herein, the separation factor for any one metal with respect to another refers to the following ratio:

$$\frac{[\text{metal 1}]_{fluid}/[\text{metal 1}]_{resin}}{[\text{metal 2}]_{fluid}/[\text{metal 2}]_{resin}},$$

where $[\text{metal 2}]_{fluid}$ refers to the concentration of the first metal in the fluid exiting the column (which may be in ionic form, such as trivalent form), $[\text{metal 1}]_{resin}$ refers to the concentration of the first metal on the resin surface, $[\text{metal 2}]_{fluid}$ refers to the concentration of the first metal in the fluid exiting the column (which may be in ionic form, such as trivalent form), $[\text{metal 2}]_{resin}$ refers to the concentration of the second metal on the resin surface.

[Description of Specific Exemplary Uses, Applications, and Methods]

Some embodiments of the present invention relate to methods for separating a mixture containing ionic species (for example, a fluid containing dissolved metal salts or organometallic complexes) via ion exchange between a solid phase (e.g. an ion exchange resin) and a non-aqueous phase (e.g. a carrier fluid for the mobile phase) containing dissolved complexing agents (e.g. as embodiments of eluting agents). It should be understood that references to ionic species may refer to metal ions described elsewhere herein, that references to a solid phase may refer to ion exchange resins described elsewhere herein, and that complexing agents may refer to extractants described elsewhere herein. It should also be understood that descriptions of ionic species below may also describe metals that are not in ionic form.

One objective of some embodiments of the present invention described herein is the separation of a chemical mixture comprising ionic species. In this process, a mixture of chemical species (the "feed mixture") may be separated via ion exchange between a resin and a non-aqueous fluid. A solid material may be provided with functional groups capable of cation or anion exchange. In the loading stage, a fluid containing two or more ionic species may be loaded onto the solid material using an ion exchange mechanism. In the elution stage, a mobile phase comprising a non-aqueous fluid comprising dissolved ion exchange complexing agents may be exposed to the solid material. The ions may be transferred from the solid surface to the complexing agents in the non-aqueous mobile phase. Some ionic species may be preferentially stripped by the complexing agents, resulting in enrichment of one or more components (e.g., metals) in the eluting fluid. The process may include multiple separation stages in series and/or continuous separation along the length of a column.

In some embodiments, a method comprises:
a. providing a solid phase material with ion exchange functional groups on the surface (e.g., a resin);
b. introducing a fluid containing a mixture of ionic species into an apparatus containing the solid phase material such that one or more ionic species adhere to the surface via an ion exchange mechanism;
c. eluting the solid phase with a non-aqueous fluid containing dissolved complexing agent(s) (also referred to elsewhere herein as extractants) capable of undergoing ion exchange such that one or more ionic species is preferentially stripped into the fluid, which may be a supercritical phase.

Figure 5:
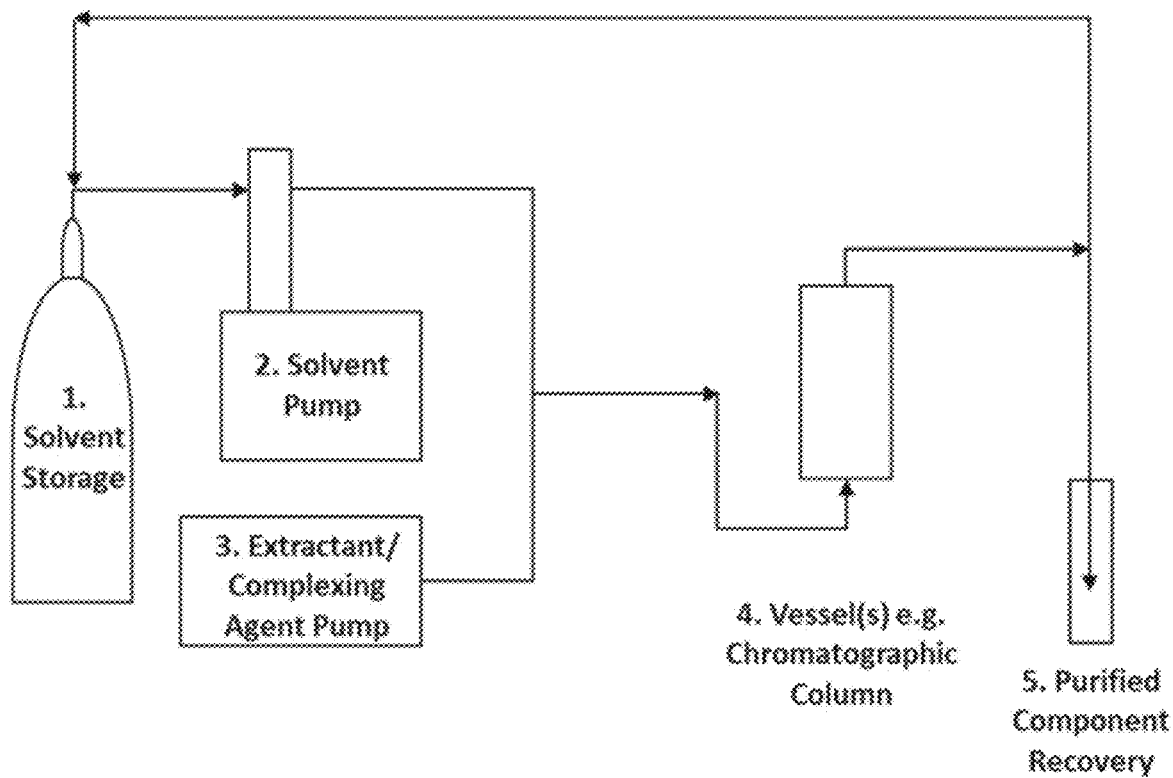
FIG. 5 shows a system for selectively recovering a target metal from an ion exchange resin, in accordance with some embodiments.

One aspect of the invention is illustrated in FIG. 5. In FIG. 5, the vessel (4) contains the solid phase material which has been loaded with the feed mixture. In some embodiments, the vessel (4) is a column. Fluid, from a storage vessel (1) is delivered using a pump (2) at the desired pressure. The fluid is combined with a complexing agent which is also pumped at the desired pressure (3). The complexing agent may be soluble in the fluid such that it forms a single phase therewith. In some embodiments, the complexing agent(s) have one or more of the following characteristics:

The complexing agent(s) may be soluble in the fluid at a sufficient concentration for effective ion exchange The complexing agent(s) may have sufficient affinity for the ionic species of interest to remove them from the ion exchange material The complexing agent(s) may have varying affinities to the ionic species present in the feed mixture, such that some species are preferentially removed from the ion exchange material.

The solvent with dissolved complexing agent(s) may then be delivered to the vessel (4) containing the solid ion exchange material. The ionic species may be transferred from the solid surface to the complexing agent(s) in the mobile phase via an ion exchange mechanism. Some ionic species may be preferentially stripped by the complexing agent(s), which may result in enrichment of one or more ionic species in the fluid phase. The process may include multiple separation stages in series and/or continuous separation along the length of a column. The eluting fluid may undergo a separation process (5) to recover solutes. The solvent may be recycled back to the solvent pump (2).

In some embodiments, a mixture containing multiple ionic species (the "feed mixture", which may also be referred to elsewhere herein as a composition comprising metals to be separated) is separated via loading onto a solid material, and eluting this solid material using complexing agent(s) dissolved in a non-aqueous fluid.

In one embodiment, the feed mixture may be an aqueous solution of Yb and Lu salts, and the ion exchange material may be a macroporous resin comprising a styrene and divinylbenzene copolymer with sulfonic acid functional groups. The Yb and Lu may be loaded onto the resin via a cation exchange. The loaded resin may then be exposed to supercritical CO$_2$ at 30-80° C. (e.g., 35° C. to 80° C.) and 2000-10,000 psi with solubilized 20-500 mmol/L bis(2-ethylhexyl) phosphate (HDEHP). The HDEHP may undergo cation exchange to strip the Yb and Lu off of the resin. Lu may be preferentially stripped, which may result in an enrichment of Lu relative to Yb in the supercritical phase. The exchange may occur along the length of a chromatographic column, which may result in the separation of Lu and Yb in the outlet fluid.

In another embodiment, the feed mixture may be an aqueous solution of Yb and Lu salts, and the ion exchange material may be a macroporous resin comprising a styrene and divinylbenzene copolymer with sulfonic acid functional groups. The Yb and Lu may be loaded onto the resin via cation exchange. The loaded resin may then be exposed to supercritical CO$_2$ at 30-80° C. (e.g., 35° C. to 80° C.) and 2000-10,000 psi with solubilized 20-500 mmol/L 2-ethylhexylphosphonic acid mono-2-ethylhexyl ester (EHEHPA). The EHEHPA may undergo cation exchange to strip the Yb and Lu off of the resin. Without wishing to be bound by any particular theory, it is believed that, because of its smaller atomic radius, Lu is preferentially stripped, resulting in an enrichment of Lu relative to Yb in the supercritical phase. The exchange may occur in a series of equilibrium stages along the length of a chromatographic column, which may result in the separation of Lu and Yb in the outlet fluid.

A list of exemplary embodiments follows:

Embodiment 1. A method of separating a feed mixture containing ionic species (for example, a fluid containing dissolved metal salts or organometallic complexes) comprising the steps of:
  a. providing a solid phase material with functional groups on the surface capable of participating in ion exchange;
  b. introducing the feed mixture into an apparatus containing the solid phase material such that one or more ionic species adhere to the surface via an ion exchange mechanism;
  c. eluting the solid phase with a non-aqueous fluid containing one or more dissolved complexing agents, which may include organic acids, phosphates, amides, and/or fluorinated versions thereof, capable of undergoing ion exchange such that one or more ionic species is preferentially stripped into the eluting fluid.

Embodiment 2. The method of embodiment 1, whereby the eluting fluid includes CO$_2$.

Embodiment 3. The method of embodiment 1, whereby the eluting fluid includes an alkane, isoalkane and/or cycloalkane.

Embodiment 4. The method of embodiment 1, whereby the eluting fluid includes an alkene.

Embodiment 5. The method of embodiment 1, whereby the eluting fluid includes a benzene derivative.

Embodiment 6. The method of embodiment 1, whereby the eluting fluid includes a ketone.

Embodiment 7. The method of embodiment 1, whereby the eluting fluid includes an ether.

Embodiment 8. The method of embodiment 1, whereby the eluting fluid includes an alcohol.

Embodiment 9. The method of embodiment 1, whereby the eluting fluid includes kerosene.

Embodiment 10. The method of embodiment 1, whereby the eluting fluid includes tetrahydrofuran.

Embodiment 11. The method of embodiment 1, whereby the eluting fluid includes an acetate.

Embodiment 12. The method of embodiment 1, whereby the eluting fluid includes dimethyl sulfoxide.

Embodiment 13. The method of embodiment 1, whereby the eluting fluid includes a chlorinated species.

Embodiment 14. The method of embodiment 1, whereby the eluting fluid is a supercritical fluid.

Embodiment 15. The method of embodiment 1, whereby the feed mixture contains trivalent metal salts which may include isotopes.

Embodiment 16. The method of embodiment 1, whereby the feed mixture contains trivalent metal organometallic complexes (e.g., trivalent metals as part of organometallic complexes) which may include isotopes.

Embodiment 17. The method of embodiment 1, whereby the feed mixture contains lanthanide and/or actinide salts which may include isotopes.

Embodiment 18. The method of embodiment 1, whereby the feed mixture contains lanthanide and/or actinide organometallic complexes which may include isotopes.

Embodiment 19. The method of embodiment 1, whereby the feed mixture contains Yb and Lu salts which may include isotopes.

Embodiment 20. The method of embodiment 1, whereby the feed mixture contains Yb and Lu organometallic complexes which may include isotopes.

Embodiment 21. The method of embodiment 1, whereby the separation apparatus is a chromatographic column.

Embodiment 22. The method of embodiment 1, whereby the ion exchange material is a resin with a macroporous structure.

Embodiment 23. The method of embodiment 1, whereby the complexing agent is bis(2-ethylhexyl) phosphate (HDEHP).

Embodiment 24. The method of embodiment 1, whereby the complexing agent is 2-ethylhexylphosphonic acid mono-2-ethylhexyl ester (EHEHPA).

Embodiment 25. The method of embodiment 1, whereby the complexing agent is hexafluoroacetylacetone with or without a neutral organophosphorus synergistic extractant.

Embodiment 26. The method of embodiment 1 whereby the composition, flowrate, temperature, and/or pressure of the eluting phase is varied over time during the elution process.

Embodiment 27. A method of separating a mixture containing ionic species (for example, a fluid containing dissolved metal salts or organometallic complexes) comprising the steps of:
  a. providing a solid phase material with functional groups on the surface capable of participating in ion exchange;
  b. introducing a fluid containing a mixture of ionic species into an apparatus containing the solid phase material such that one or more ionic species adhere to the surface via an ion exchange mechanism;
  c. eluting the solid phase with a supercritical fluid containing one or more dissolved complexing agents, capable of undergoing ion exchange such that one or more ionic species is preferentially stripped into the eluting fluid.

Embodiment 28. The method of embodiment 27, whereby the feed mixture contains trivalent metal salts which may include isotopes.

Embodiment 29. The method of embodiment 27, whereby the feed mixture contains trivalent metal organometallic complexes (e.g., trivalent metals as part of organometallic complexes) which may include isotopes.

Embodiment 30. The method of embodiment 27, whereby the feed mixture contains lanthanide and/or actinide salts which may include isotopes.

Embodiment 31. The method of claim embodiment 27, whereby the feed mixture contains lanthanide and/or actinide organometallic complexes which may include isotopes.

Embodiment 32. The method of embodiment 27, whereby the feed mixture contains Yb and Lu salts which may include isotopes.

Embodiment 33. The method of embodiment 27, whereby the feed mixture contains Yb and Lu organometallic complexes which may include isotopes.

Embodiment 34. The method of embodiment 27, whereby the separation apparatus is a chromatographic column.

Embodiment 35. The method of embodiment 27, whereby the ion exchange material is a resin with a macroporous structure.

Embodiment 36. The method of embodiment 27, whereby the complexing agent(s) includes an organic acid Embodiment 37. The method of embodiment 27, whereby the complexing agent(s) includes a phosphate Embodiment 38. The method of embodiment 27, whereby the complexing agent is bis(2-ethylhexyl) phosphate (HDEHP).

Embodiment 39. The method of embodiment 27, whereby the complexing agent is 2-ethylhexylphosphonic acid mono-2-ethylhexyl ester (EHEHPA).

Embodiment 40. The method of embodiment 27, whereby the complexing agent is hexafluoroacetylacetone with or without a neutral organophosphorus synergistic extractant.

Embodiment 41. The method of embodiment 27, whereby the composition, flowrate, temperature, and/or pressure of the eluting phase is varied over time during the elution process.

Embodiment 42. The method of embodiment 1, wherein the feed mixture comprises non-lanthanide metal salts and/or organometallic complexes which may include isotopes.

Embodiment 43. The method of embodiment 27, wherein the feed mixture comprises non-lanthanide metal salts and/or organometallic complexes which may include isotopes.

Embodiment 44. The method of embodiment 1, wherein the feed mixture comprises non-trivalent metal salts and/or organometallic complexes which may include isotopes.

Embodiment 45. The method of embodiment 27, wherein the feed mixture comprises non-trivalent metal salts and/or organometallic complexes which may include isotopes.

EXAMPLES

Lutetium 177 ($^{177}$Lu) is a key ingredient in promising cancer treatments for gastroenteropancreatic neuroendocrine tumors, prostate cancer, and non-Hodgkin's lymphoma. Applications and demand for $^{177}$Lu is growing very rapidly, and several late-stage clinical trials will be complete in 2021. Despite very promising medical applications, there are several challenges with the manufacturing supply chain which cast doubt on the industry's ability to meet this demand. Current manufacturing processes for high purity $^{177}$Lu are complex and time consuming. They may include irradiation of a $^{176}$Yb target to generate a $^{176}$Yb/$^{177}$Lu mixture followed by a series of chemical purification techniques to isolate the $^{177}$Lu. This purification process can take up to several days and/or result in significant losses of the product as off-spec material. $^{177}$Lu has a short (6.65 day) half-life, and therefore this long processing time results in further losses of the product due to radioactive decay.

The Examples below describe improved purification processes (and/or steps towards improved purification processes) that can be employed to deliver $^{177}$Lu faster, at lower cost, and/or with higher yield, resulting in a better supply for cancer patients.

Some of the Examples below describe the use of high-pressure fluids to rapidly isolate the $^{177}$Lu. The high-pressure fluids may be compatible with a wide range of chemistries which are simply not soluble in water. The process may employ a resin which can be loaded with a Yb/Lu mixture, a high pressure solvent, and/or extractant chemicals which are soluble in the solvent. Upon exposure to the resin, these chemicals may be able to selectively extract the Lu from the surface. This may allow for Yb and/or Lu purification to occur by loading the Yb/Lu mixture onto a column containing the resin, and then flowing the solvent and extractant chemicals through the column to elute the Lu as a pure (or relatively pure) material.

One application for the metal purification processes described herein is the development of an improved method for purifying the medical isotope lutetium 177 ($^{177}$Lu). $^{177}$Lu is an unstable isotope which decays by electron emission with a 6.65 day half-life. $^{177}$Lu is a key ingredient in a gastroenteropancreatic neuroendocrine tumor drug called $^{177}$Lu-DOTATATE. The drug is made up of a peptide which binds to cancer cells, the $^{177}$Lu isotope which delivers beta radiation to surrounding cells, and a chelator which links the peptide and the isotope together. $^{177}$Lu is also a key ingredient for several drugs in clinical trials for prostate cancer and non-Hodgkin's lymphoma.

$^{177}$Lu may be produced by neutron bombardment of $^{176}$Yb. After irradiation in a nuclear reactor, the $^{176}$Yb target typically contains a mixture of $^{176}$Yb and relatively small amounts of $^{177}$Lu; it would be advantageous to remove the $^{177}$Lu from the mix at relatively high efficiencies and/or purities to be sold and to recycle the $^{176}$Yb to the nuclear reactor. Additionally, methods having one or more of the following features may be advantageous:

The ability to recover micro amounts of $^{177}$Lu (approximately 0.05 to 0.3%) from macro amounts of $^{176}$Yb. It is also desirable for the Yb concentration in the final product to be less than 5%;

Suitability for batch sizes of several hundred milligrams (e.g., 200 mg) or more;

High $^{177}$Lu recovery (e.g., in excess of 80% and/or 85%);

Recovery of $^{176}$Yb for further use;

The ability to perform the entirety of the purification process in a relatively short amount of time (e.g., as short as 0.5-4 hours). This may minimize the decay of $^{177}$Lu during performance of the method; and The ability to perform the method in a hot cell.

One specific approach employed in the Examples below was the development of a supercritical chromatography process for Lu purification from a composition comprising Lu and Yb. It is believed that this process would be appropriate for $^{177}$Lu purification from an irradiated $^{176}$Yb target. Elution was performed in the presence of supercritical $CO_2$ instead of water. This provided two benefits: first, supercritical $CO_2$ is believed to have a high diffusivity and low viscosity, which are believed to promote fast reaction rates; and, second, there are a plethora of supercritical $CO_2$-soluble chemicals which are believed to deliver highly effective purification of lanthanides. Therefore, supercritical $CO_2$ is believed to both open up a wide range of possible chemistries and promote fast reaction rates.

Figure 6:
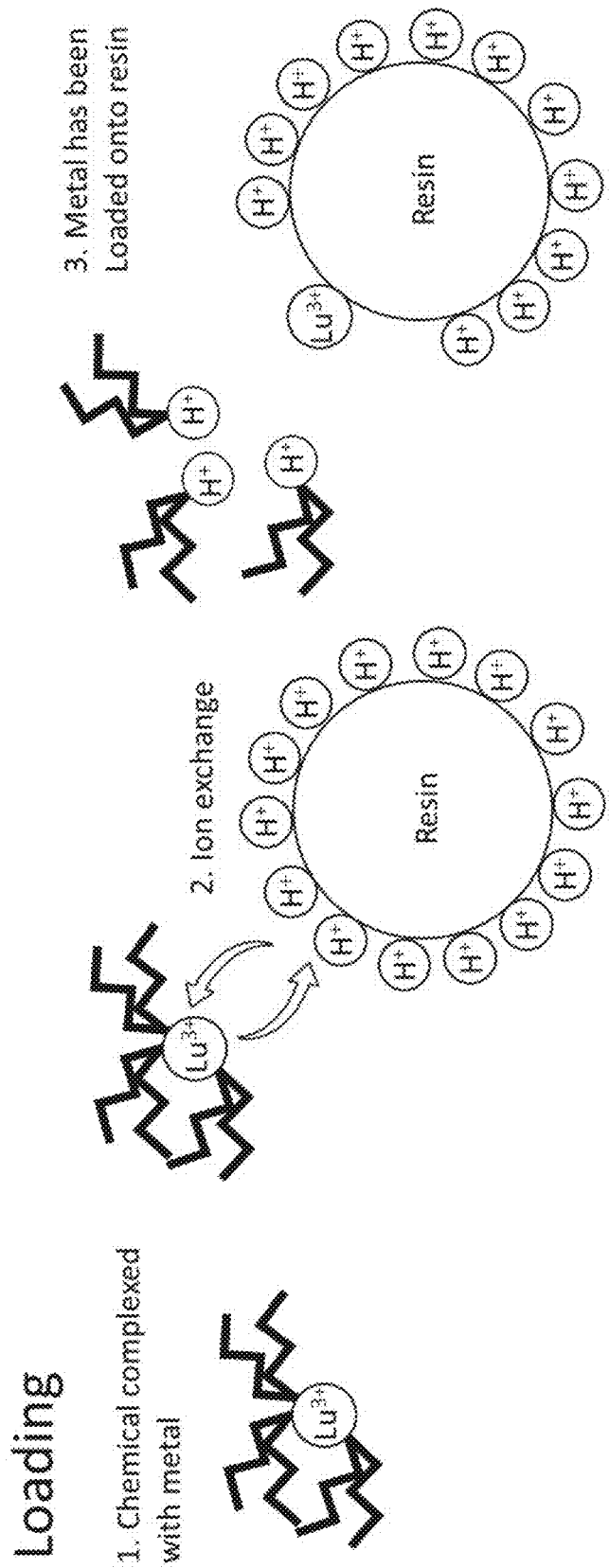
FIG. 6 shows a resin loading process, in accordance with some embodiments.
Figure 7:
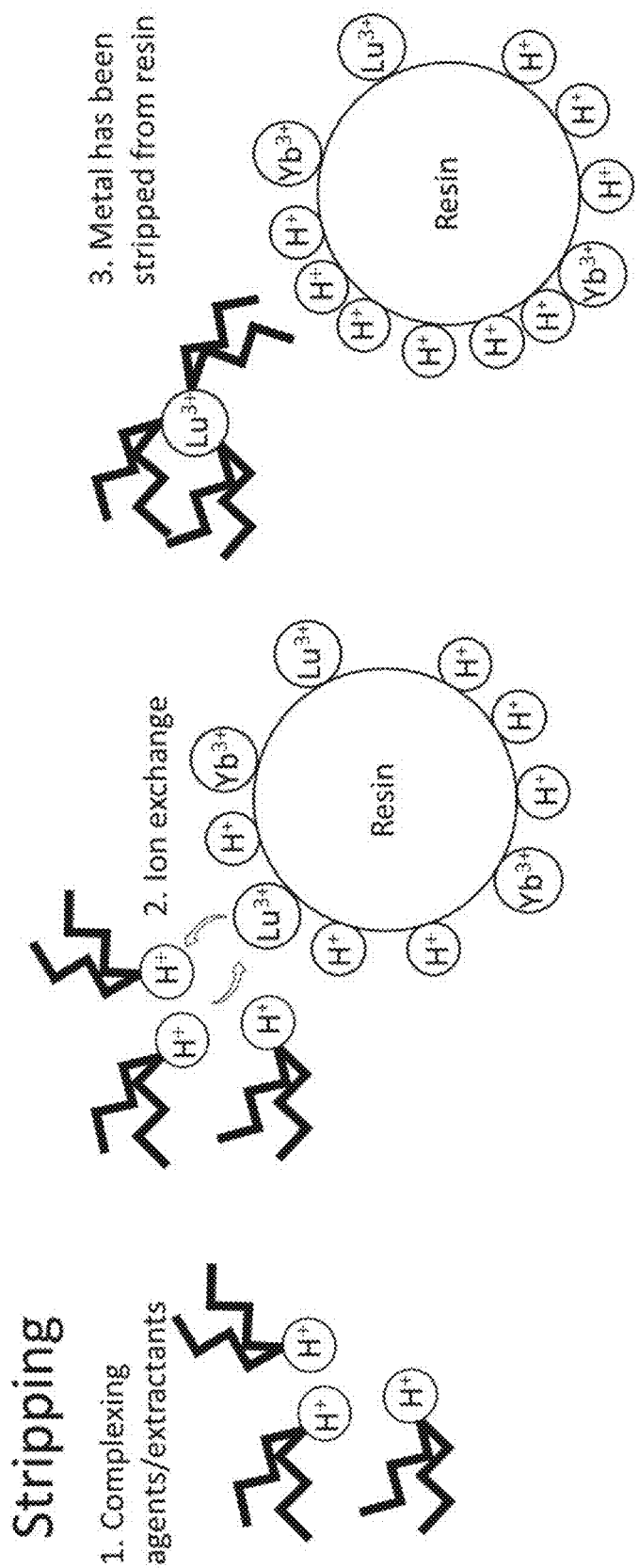
FIG. 7 shows an ion exchange process in which an extractant removes a metal from an ion exchange resin, in accordance with some embodiments.

One proposed process involves three stages: loading the Yb/Lu mixture onto a resin, eluting the Yb and Lu off of the resin, and recovering the Lu and Yb in a dilute hydrochloric acid solution. In the loading phase, the irradiated $^{176}$Yb target may be dissolved in a suitable fluid and that fluid may then passed over a resin to load the Yb and Lu onto the surface via ion exchange. After loading, the elution phase may begin; in this phase, Yb and Lu may be removed from the resin surface with a supercritical fluid in which one or more extractants are dissolved. The extractant(s) may strip both Yb and Lu off of the resin via another ion exchange reaction. In some embodiments, the extractant(s) are more effective at stripping the Lu, resulting in earlier breakthrough of the Lu at the outlet of the column. Finally, the Lu and Yb may be recovered in separate dilute hydrochloric acid solutions for delivery of Lu to the customer and preparation of Yb for reuse. FIGS. 6 and 7 show schematic depictions of loading and stripping, respectively, Lu from an ion exchange resin.

Example 1

Various complexing agents that served as complexing agents and were dissolved in hexane were used to extract Ho, Yb, and Lu from Amberlyst 15 resin (a macroporous resin comprising styrene sulfonate functional groups). The general procedure was as follows: first, the resin was loaded with the lanthanide by shaking the resin with a lanthanide chloride solution overnight; then, the resin was washed 3 times with water, filtered, and then dried in a vacuum oven at 60° C. Next, the loaded resin was combined with a liquid phase comprising hexane and a complexing agent. The complexing agent is believed to bind with the metal and strip it from the resin surface, which it is believed forms an equilibrium between the resin surface and the complexing agent. The liquid phase was stripped with $HNO_3$ and analyzed by ICP MS to determine the extent of extraction.

Complexing agents included bis (2-ethylhexyl) phosphate (HDEHP), hexafluoroacetylacetone with tributyl phosphate (HFA+TBP), 2-ethylhexylphosphonic acid mono-2-ethylhexyl ester (EHEHPA), 2-thenoyltrifluoroacetone with tributyl phosphate (HTTA+TBP), and 2-(trifluoromethyl)-2-hydroxypropionic acid with tributyl phosphate (2T2HA+TBP).

HTTA+TBP and 2T2HA+TBP showed no extraction from the resin during early experiments with Ho.

Figure 8:
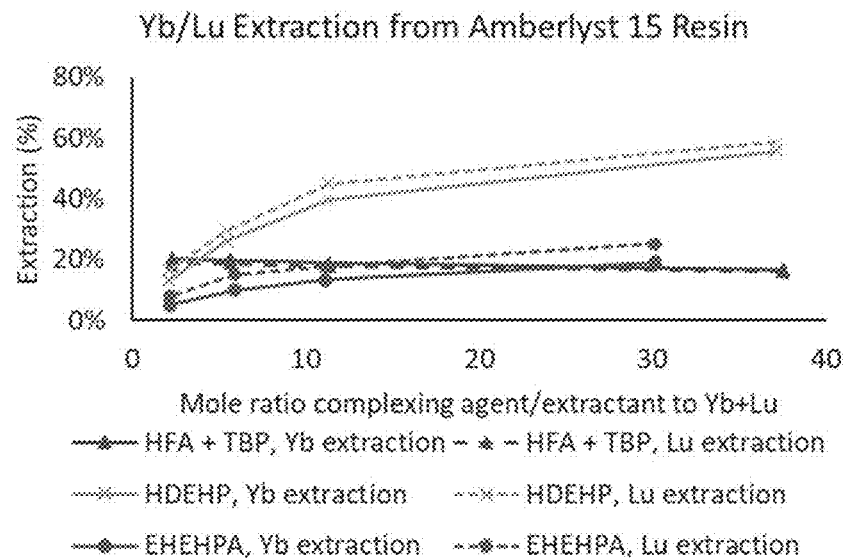
FIG. 8 is a plot showing Yb and Lu extraction from an Amberlyst 15 resin in the presence of extractants, in accordance with some embodiments.

HFA+TBP, HDEHP, and EHEHPA were used to extract both Yb and Lu from resin. HDEHP and EHEHPA showed the best separation, as shown in FIG. 8.

Figure 9:
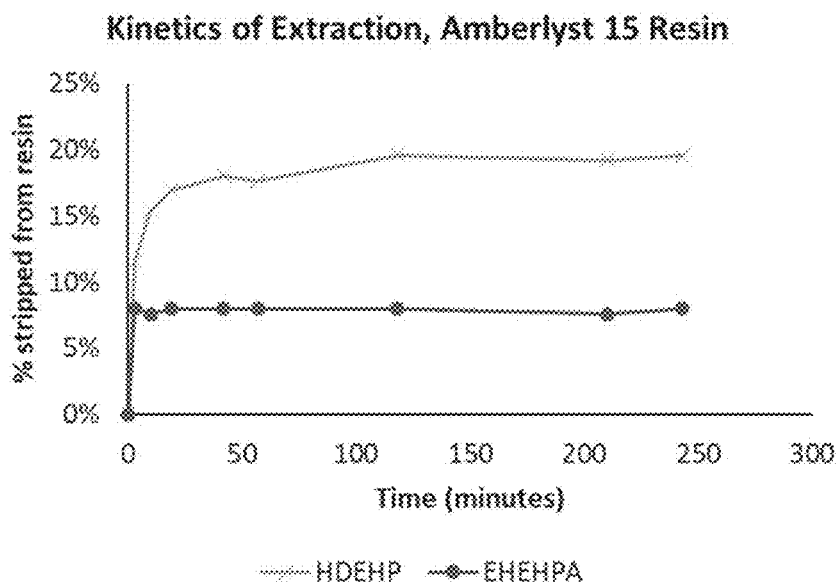
FIG. 9 is a plot showing the kinetics of Yb extraction from an ion exchange resin, in accordance with some embodiments.

To gain further insight into Yb and Lu ion exchange between Amberlyst 15 resin and HDEHP/EHEHPA, a kinetic test was performed. Yb-loaded resin was combined with 700 mmol/L HDEHP in hexane, and in a separate test tube Yb-loaded resin was combined with 700 mmol/L EHEHPA in hexane. The mole ratio in each tube was 1.9 moles complexing agent (HDEHP or EHEHPA) per mole Yb. The absorbance of the liquid phase was measured at regular intervals over time (Yb has an absorption band at 970 nm), and the final liquid sample after equilibration was stripped by $HNO_3$ and analyzed by ICP MS to confirm the extent of extraction. The results are shown in FIG. 9. Note that the $HNO_3$ stripping is a different process than the process employed to extract Yb and Lu from the ion exchange resin. The $HNO_3$ stripping is performed after such extraction and serves to remove the extracted metals from the fluid into which they were initially extracted.

Figure 10:
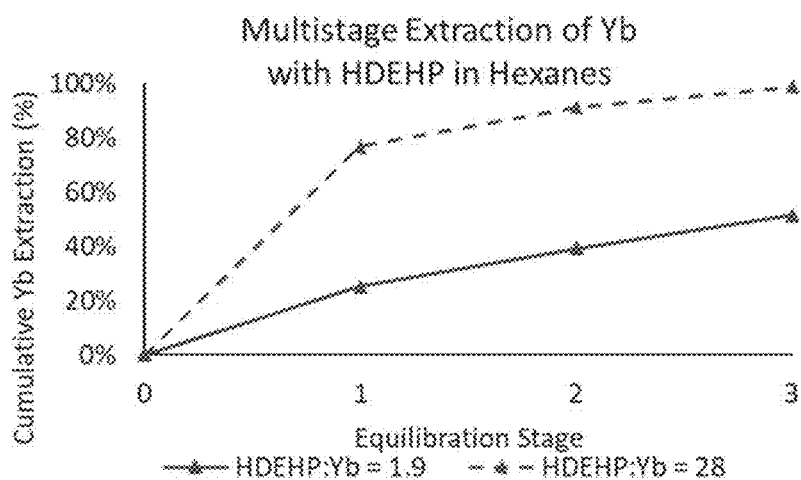
FIGS. 10-11 are plots showing Yb extraction into hexanes in the presence of an extractant, in accordance with some embodiments.
Figure 11:
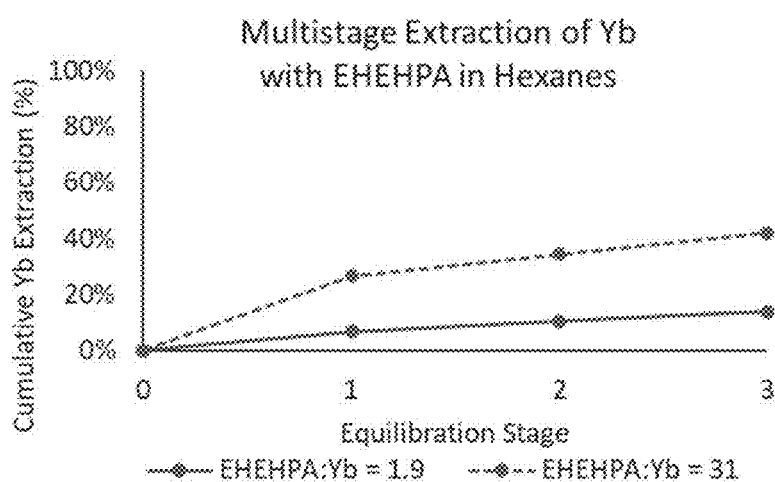

Further tests were performed to simulate the multiple equilibrium stages which would be established along the length of a chromatographic column. Some of the Amberlyst 15 was loaded with Yb and equilibrated with hexanes containing HDEHP (referred to as Chemistry A in FIG. 10) or EHEHPA (referred to as Chemistry B in FIG. 11). The liquid phase was then removed and analyzed via ICP MS. The resin was then washed briefly in hexanes, and then more hexanes mixed with HDEHP or EHEHPA were added to the resin and shaken for several hours. Afterwards, the liquid was removed and a third equilibration stage was performed using the same procedure. The results are shown in FIGS. 10 and 11. HDEHP resulted in greater extraction of Yb. Higher ratios of the chemical to Yb resulted in greater extraction.

Example 2

Figure 12:
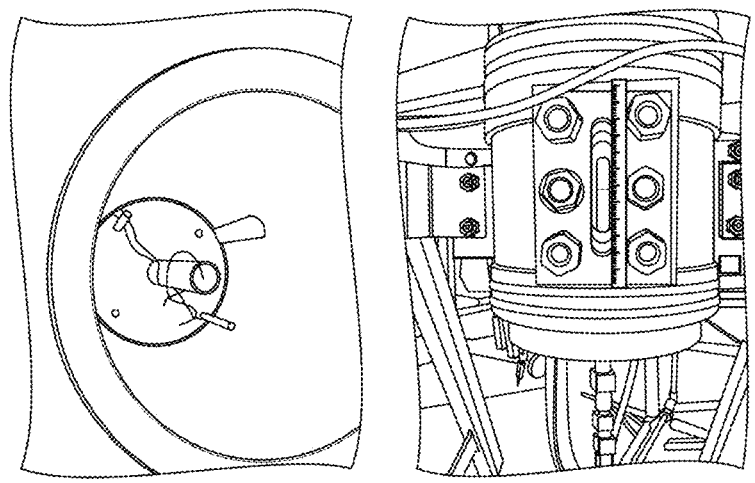
FIG. 12 shows photographs of a pressure vessel, in accordance with some embodiments.

To confirm compatibility between Amberlyst 15 resin and supercritical $CO_2$, some of the Amberlyst 15 resin was loaded with Yb, dried, put in a test tube, and placed inside a pressure vessel (see FIG. 12). The pressure vessel was equipped with a window which allowed for the level of the resin bed to be viewed and photographed. The vessel was then pressurized with carbon dioxide at temperatures ranging from 20° C. to 70° C. and pressures ranging from 900 to 4500 psi. The Amberlyst 15 resin was photographed after 1 minute and after 30 minutes for each pressure/temperature condition. In total, the Amberlyst 15 resin was in the vessel for three days continuously.

The Amberlyst 15 resin did not show any swelling. Upon removal from the vessel, the Amberlyst 15 resin did not have any change in appearance or any measurable change in mass.

To confirm that the ion exchange properties were unchanged, the $CO_2$-exposed Yb-loaded Amberlyst 15 resin and some fresh Yb-loaded Amberlyst 15 resin were both combined with 6 M nitric acid at a ratio of 75 moles $HNO_3$ per mole of Yb. Both the fresh resin and the $CO_2$-exposed resin showed identical extents of Yb stripping (63%).

Example 3

A solubility measurement was made for EHEHPA in $CO_2$ was performed. In this experiment, EHEHPA was pipetted into a windowed pressure vessel, heated to a specific temperature, and slowly pressurized and stirred until the vessel contents became a single phase. The final pressure was recorded. This measurement showed good solubility of EHEHPA at 40° C.

Example 4

Figure 13:
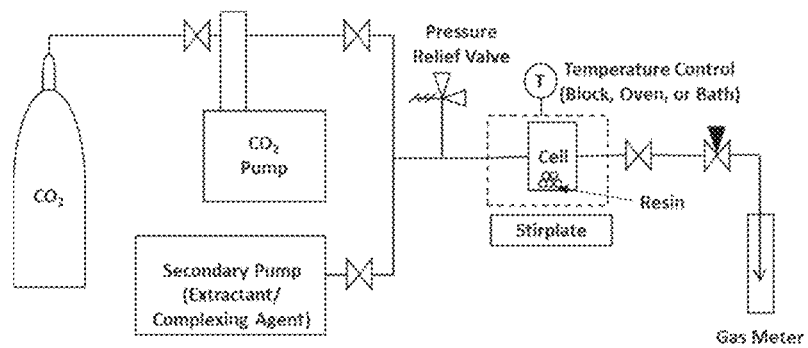
FIG. 13 shows a system for selectively recovering a target metal from an ion exchange resin, in accordance with some embodiments.

Supercritical extraction experiments were performed in order to demonstrate extraction of Yb and Lu from Amberlyst 15 resin using complexing agents (that served as extractants) in supercritical $CO_2$. These tests build off of early success separating Yb and Lu using complexing agents dissolved in hexane. The experimental setup is shown in FIG. 13. It is configured as a continuous flow of $CO_2$ and complexing agent through a small stirred vessel containing metal-loaded resin.

A small cell (approximately 72 mL) was filled with 2 g of resin which had been pre-loaded with Yb and/or Lu. A stir bar was placed in the cell, separated from the resin by a small piece of metal screen to prevent the stir bar from crushing the resin. Some HDEHP was pipetted into the cell to correspond to the desired concentration. The cell was heated, pressurized with $CO_2$, and stirred for at least 1 hour. Then flow of both $CO_2$ and complexing agent were begun. The flowrates of $CO_2$ and complexing agent were designed to maintain the target concentration throughout the experiment. The outlet from the cell passed through a needle valve, with the outlet directed into a sight gauge containing a test tube. This test tube therefore slowly filled with the complexing agent containing Yb and/or Lu which had been stripped from the resin. The test tube was replaced every hour, in order to collect a series of outlet samples over time. The test tube samples are stripped with $HNO_3$, confirmed to be soluble to at least 0.1 ppm in HCl, and analyzed with ICP MS. Two blank runs were conducted to confirm that there was negligible cross-contamination between runs.

Figure 14:
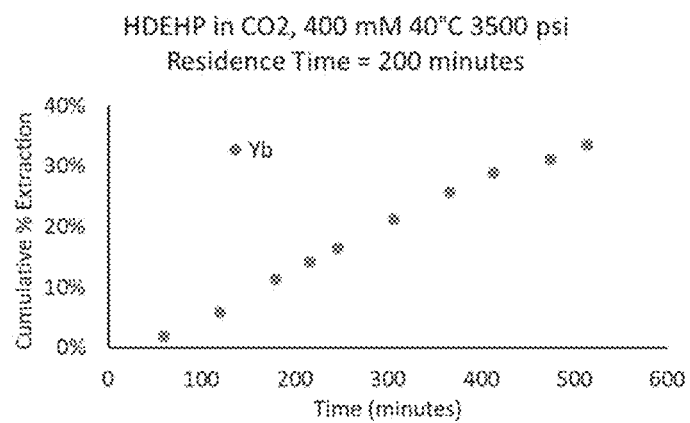
FIG. 14 is a plot showing Yb extraction in the presence of HDEHP in $CO_2$, in accordance with some embodiments.

In one test, the cell was loaded with 2.0 g of Amberlyst 15 resin which had been pre-loaded with 1.03 mmol/g Yb. The HDEHP concentration was maintained at about 400 mmol/L. The cell temperature was 40° C. and the pressure was 3500 psi. The flowrates were selected such that the cell residence time (200 minutes) was long enough to allow for the resin and supercritical phase to reach equilibrium. Extraction continued for 500 minutes and then the cell was depressurized. The Yb extraction results are shown in FIG. 14. The results show a mostly linear extraction rate during the entire run time.

Figure 15:
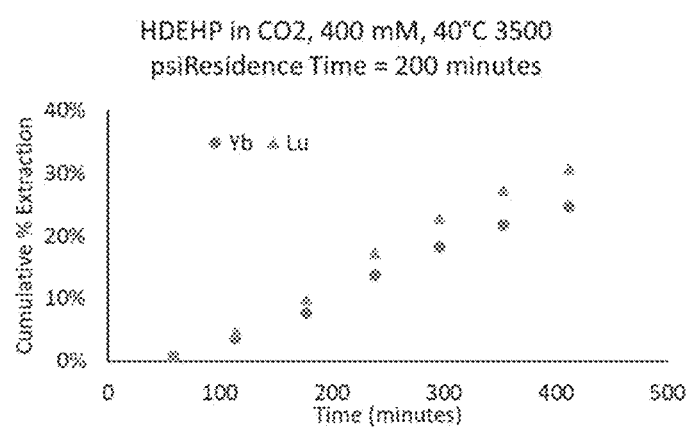
FIGS. 15-25 are plots showing Yb and Lu extraction from Amberlyst 15 under various conditions, in accordance with some embodiments.

A second test was conducted with 1.9 g Amberlyst 15 resin which had been pre-loaded with Yb at 0.58 mmol/g and Lu at 0.57 mmol/g. The HDEHP concentration was maintained at about 400 mmol/L. The cell temperature was 40° C. and the pressure was 3500 psi. The flowrates were selected such that the cell residence time (200 minutes) was long enough to allow for the resin and supercritical phase to reach equilibrium. Extraction continued for 420 minutes and then the cell was depressurized. The results are shown in FIG. 15. The extraction rate is mostly linear with Lu extraction consistently exceeding Yb extraction by approximately 20%.

Figure 16:
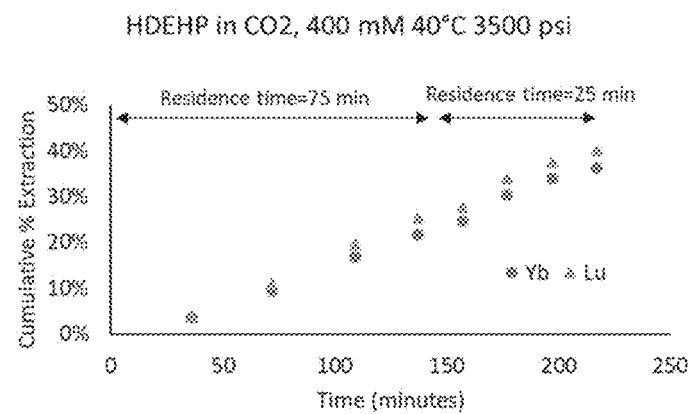

A third test was conducted to see whether the residence time could be shortened. The cell was loaded with 2.0 g Amberlyst 15 resin which had been pre-loaded with 0.53 mmol/g Yb and 0.51 mmol/g Lu. The HDEHP concentration was maintained at about 400 mmol/L. The cell temperature was 40° C. and the pressure was 3500 psi. The flowrates were selected such that the residence time was 75 minutes for the first four sample periods, and 25 minutes for the next four sample periods. The results are shown in FIG. 16. The results show that the first period (residence time=75 minutes) had equivalent separation to the residence time=200 minute case. The second period (residence time=25 minutes) had inferior separation behavior; Yb and Lu concentrations were approximately equal in those samples.

Figure 17:
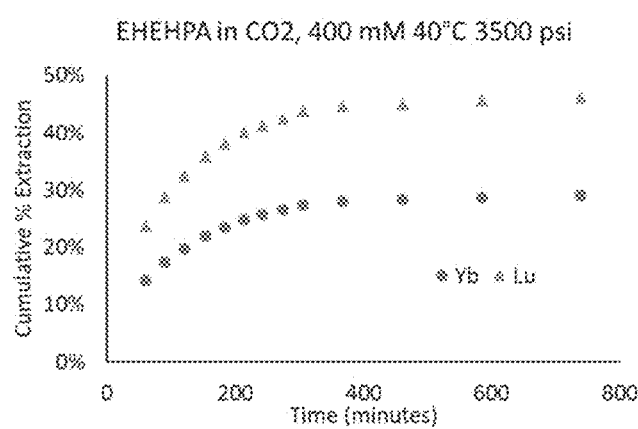
Figure 18:
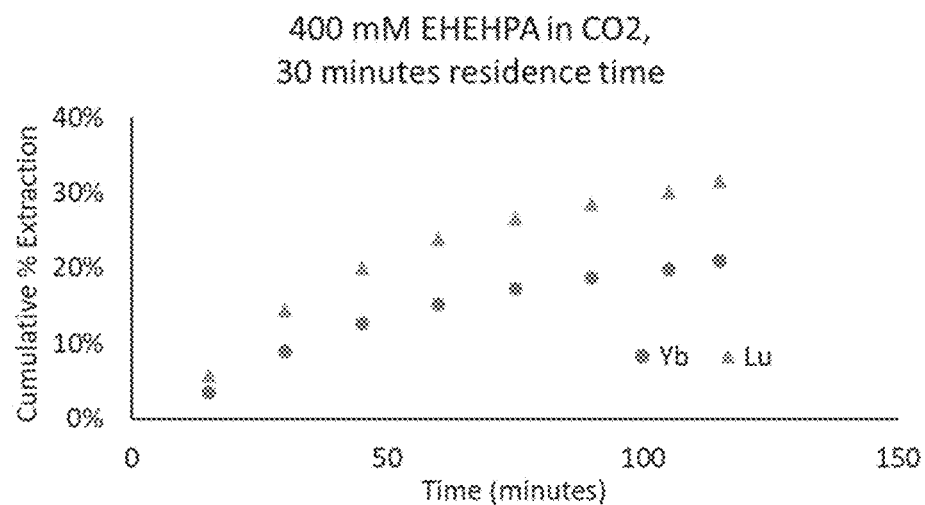
Figure 19:
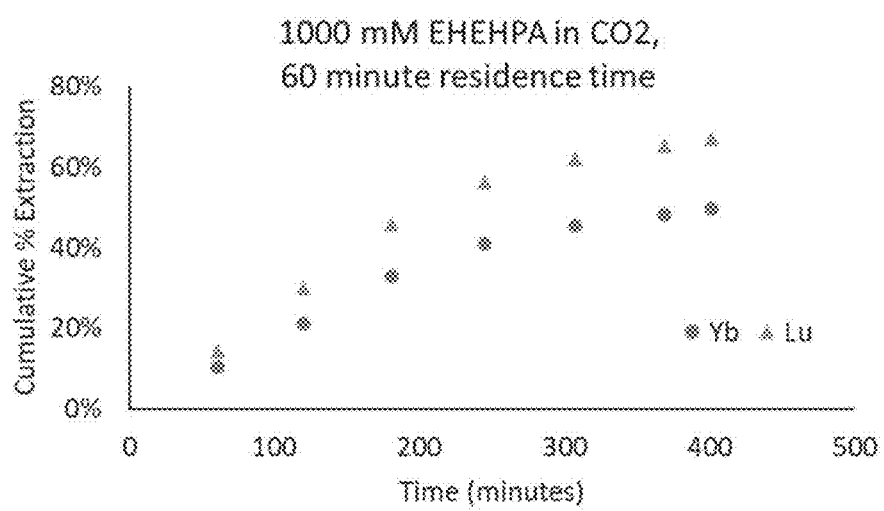
Figure 20:
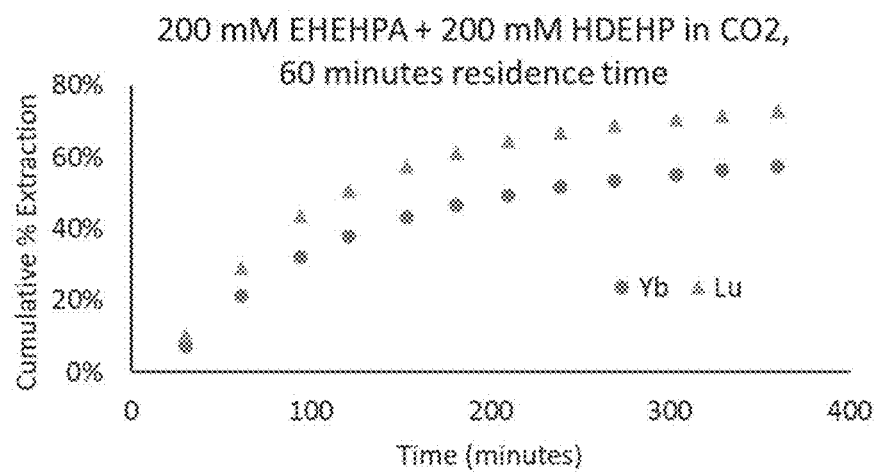
Figure 21:
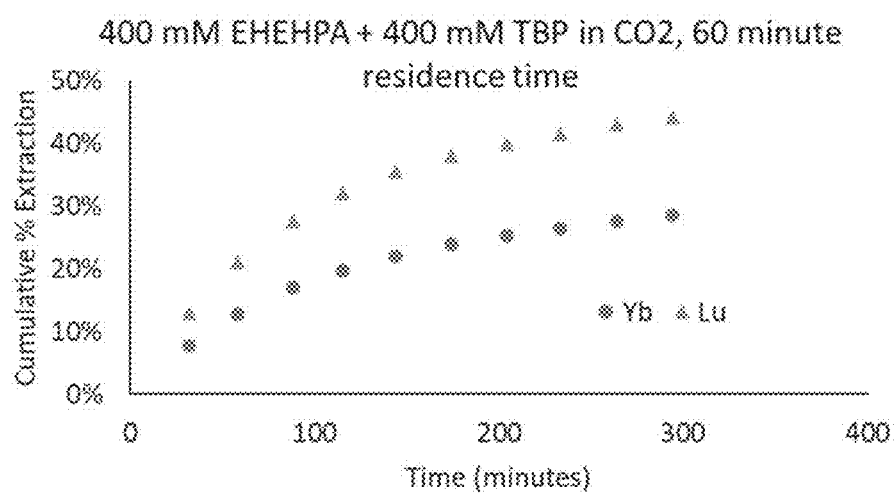
Figure 22:
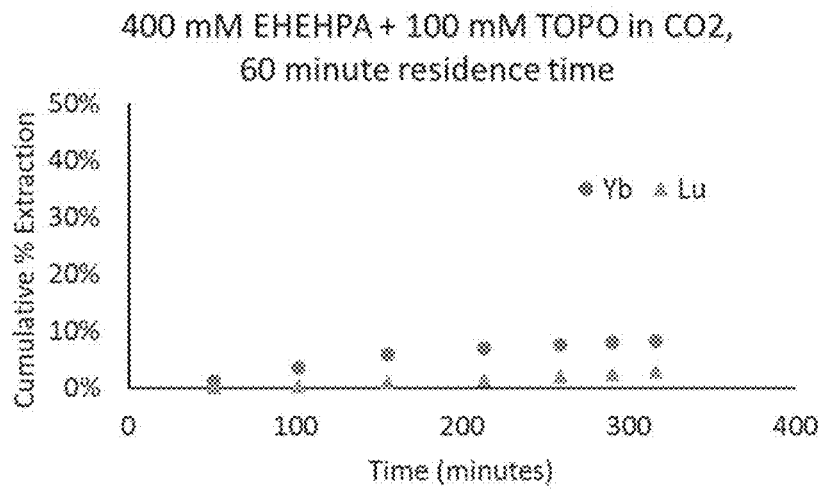
Figure 23:
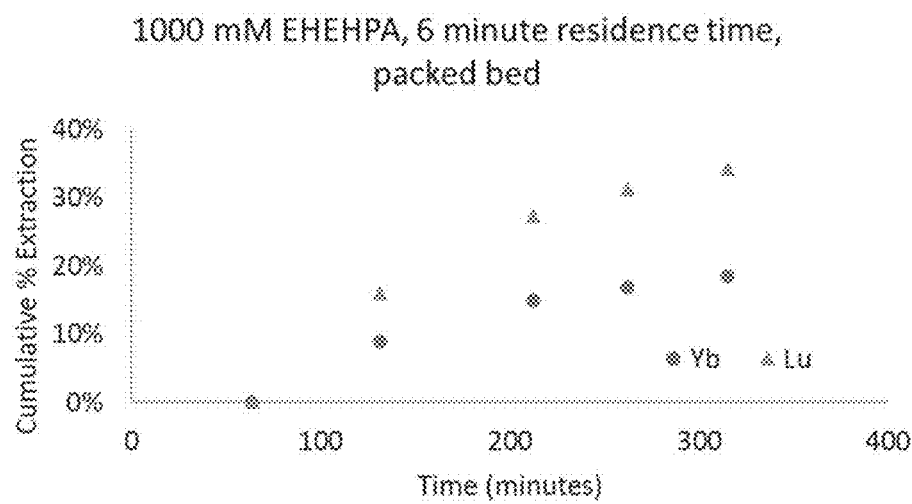
Figure 24:
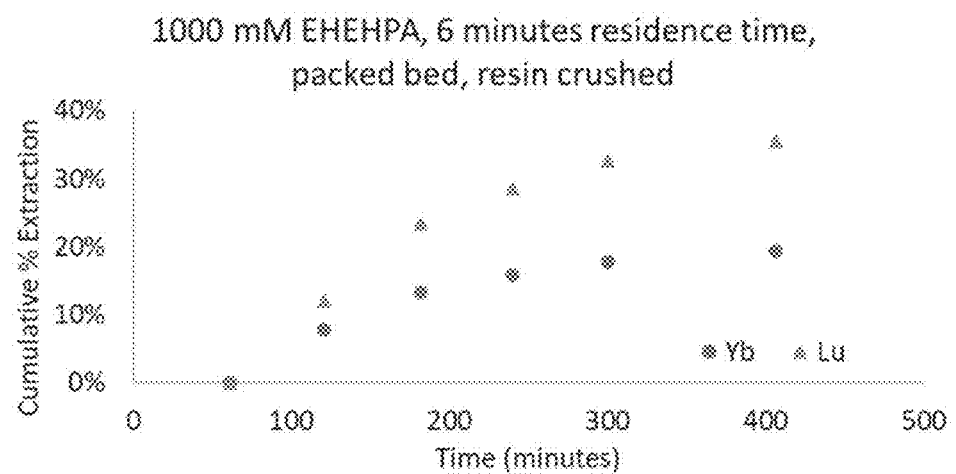
Figure 25:
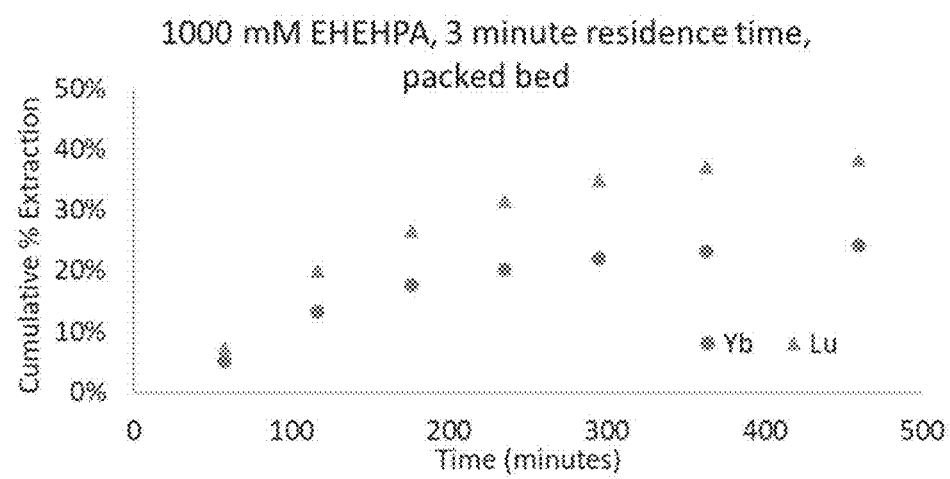

A fourth test was conducted using EHEHPA as a complexing agent in supercritical $CO_2$. The cell was loaded with 2.0 g Amberlyst 15 resin which had been pre-loaded with 0.53 mmol/g Yb and 0.51 mmol/g Lu. The EHEHPA concentration was maintained at about 400 mmol/L. The cell temperature was 40° C. and the pressure was 3500 psi. The flowrates were selected such that the residence time was 60 minutes. The results are shown in FIG. 17. The results show that separation is greater than separation in HDEHP, but extraction is incomplete (less metal was extracted off of the ion exchange resin).

The results of these four tests and further tests are summarized in Table 1 and the results from the further tests are shown in FIGS. 18-25. Tests 10-12 were performed in a 1.6 mL cell containing Amberlyst 15 loaded as a packed bed. This imitates the packed bed of resin that is often present in chromatography columns. The void space for the packed bed Amberlyst 15 was about 40%. As a result, residence times during flow were very short in these runs, ranging from 3 to 6 minutes. In the Test 11, the Amberlyst 15 was further crushed in an attempt to increase its surface area.

TABLE 1

| Test No. | Extractant (Concentration) | Metal(s) Loaded on Amberlyst 15 | Residence Time | Measured Metal Concentration in $CO_2$ | Separation Factor |
| --- | --- | --- | --- | --- | --- |
| 1 | HDEHP (400 mmol/L) | Yb | 200 minutes | 2-6 mM Yb | N/A |
| 2 | HDEHP (400 mmol/L) | Yb, Lu | 200 minutes | 2-4 mM Yb, 2-4 mM Lu | 1.29 |
| 3 | HDEHP (400 mmol/L) | Yb, Lu | 75 minutes | 2-3 mM Yb, 0.1-2 mM Lu | 1.21 |
| 3 | HDEHP (400 mmol/L) | Yb, Lu | 25 minutes | 2-3 mM Yb, 2-3 mM Lu | 1.06 |
| 4 | EHEHPA (400 mmol/L) | Yb, Lu | 60 minutes | 0.1-1 mM Yb, 0.1-2 mM Lu | 1.79 |
| 5 | EHEHPA (400 mmol/L) | Yb, Lu | 30 minutes | 0.3-1 mM Yb, 0.3-3 mM Lu | 1.64 |
| 6 | EHEHPA (1000 mmol/L) | Yb, Lu | 60 minutes | 0.3-2 mM Yb, 0.3-3 mM Lu | 1.70 |
| 7 | HDEHP (200 mmol/L) and EHEHPA (200 mmol/L) | Yb, Lu | 60 minutes | 0.3-3 mM Yb, 0.3-4 mM Lu | 1.57 |
| 8 | EHEHPA (400 mmol/L) and TBP (400 mmol/L) | Yb, Lu | 60 minutes | 0.3-2 mM Yb, 0.3-3 mM Lu | 1.75 |
| 9 | EHEHPA (400 mmol/L) and trioctylphosphine oxide (100 mmol/L) | Yb, Lu | 60 minutes | 0.07-3 mM Yb, 0.03-0.08 mM Lu | 0.70 |
| 10 | EHEHPA (1000 mmol/L) | Yb, Lu | 6 minutes | 1-4 mM Yb, 2-8 mM Lu | 2.21 |
| 11 | EHEHPA (1000 mmol/L) | Yb, Lu | 6 minutes | 1-5 mM Yb, 2-8 mM Lu | 2.21 |
| 12 | EHEHPA (1000 mmol/L) | Yb, Lu | 3 minutes | 0.5-3 mM Yb, 0.7-5 mM Lu | 1.98 |

Example 5

As noted in Example 1, Yb and Lu can be effectively loaded onto Amberlyst 15 in water. However, it may be desirable to load the metals on the resin from supercritical $CO_2$. This may allow for a smooth transition between the loading and elution stages by circumventing the need for resin drying in a vacuum oven. Tributyl phosphate in $CO_2$ was employed for the loading process.

Figure 26:
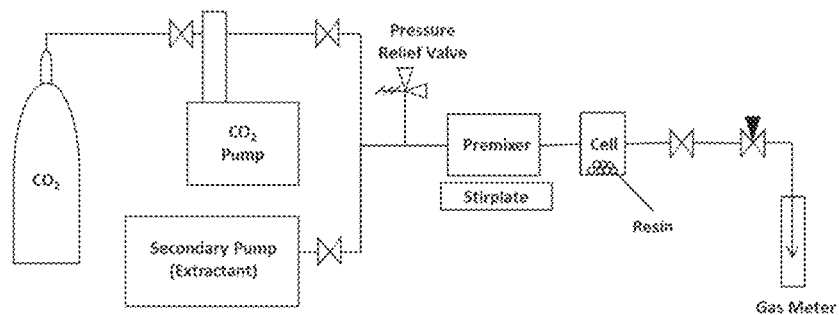
FIGS. 26-27 show systems for selectively recovering a target metal from an ion exchange resin, in accordance with some embodiments.

The loading process was accomplished by sealing 15 g of Amberlyst 15 inside a stainless steel cell and then loading the stainless steel cell into the apparatus shown in FIG. 26 (in which Chemistries A, B, and D refer to HDEHP, EHEHPA, and tributyl phosphate, respectively). The apparatus comprised a pump for $CO_2$, a secondary pump, a premixer to maintain a single phase fluid, the aforementioned cell containing the Amberlyst 15, a needle valve where the high-pressure fluid was capable of undergoing pressure drop, a liquid vapor separator where the outlet samples were capable of being collected, and a gas meter to measure the $CO_2$ flowrate.

The system was heated to the desired temperature and then pressurized using the $CO_2$ pump. Continuous flow of $CO_2$ through the system was initiated by opening the needle valve at the cell outlet. Next, $YbCl_3 \cdot 6H_2O$ and $LuCl_3 \cdot 6H_2O$ were dissolved in tributyl phosphate. Continuous flow of the metal-loaded tributyl phosphate was then initiated using the secondary pump. The flowrates were maintained to allow for a single-phase fluid to pass over the Amberlyst 15. The metal-depleted tributyl phosphate was collected at the system outlet. At shutdown, the secondary pump was stopped while the $CO_2$ flow continued for several hours to ensure that all tributyl phosphate was flushed out of the system and the resin was completely dry. Then the system was depressurized and the cell was opened to recover the Yb- and Lu-loaded resin.

To measure the amount of Yb and Lu loaded onto the Amberlyst 15 surface, a sample of the Amberlyst 15 was stripped with hydrochloric acid. The acid was analyzed using ICP MS. The results indicated that the resin had been loaded with the expected concentrations of Yb and Lu. To confirm, the outlet samples of tributyl phosphate which had been collected during loading were also analyzed by ICP MS. The results confirmed that the outlet samples were 97-98% depleted in Yb and Lu at the start of the loading run, and about 60-65% depleted of Yb and Lu at the end of the loading run, indicating that the resin progressively saturated with metal as the loading progressed.

Example 6

This Example describes a column chromatography test to determine how well Yb and Lu could be purified during the elution phase of chromatography. The setup employed was therefore meant to imitate a chromatography system after completion of the loading phase, so that the elution phase could be tested.

Figure 27:
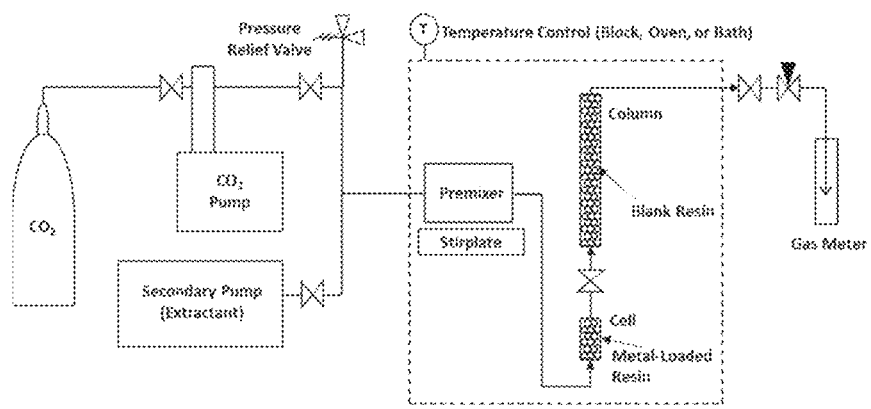

A 1.6 mL cell was filled with Amberlyst 15 pre-loaded with Yb and Lu. A column filled with blank resin was installed downstream of this cell. The column had a ⅜" outer diameter and was about 8 inches long. It contained approximately 4 grams of the Amberlyst 15. EHEHPA at 1000 mmol/L in supercritical $CO_2$ was used for elution. A schematic depiction of the instrumentation used is shown in FIG. 27. A low flowrate was used such that the residence time in the cell was 6 minutes (in a fashion similar to Test 10 in Example 4). The elution continued for 10 hours.

Figure 28:
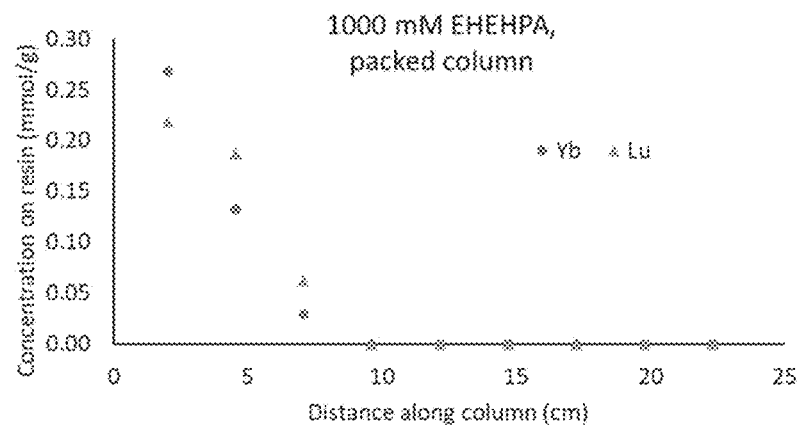
FIG. 28 is a plot showing the concentrations of Yb and Lu at various positions along a column, in accordance with some embodiments.

No Yb or Lu was detected at the column outlet during the run. To diagnose the issue, the metal content of the resin in the cell was analyzed. It was found that 25% of the Yb and 38% of the Lu had been extracted from the cell, similar to the results of Test 10 in Example 4 (see FIG. 23). Next, the resin was analyzed for metal content at 1 inch intervals along the column. The results are shown in FIG. 28. The results show that the metals had only moved about 5 cm by the end of the elution. There was also clear evidence of the Lu migrating faster than the Yb. Therefore, this Example provides preliminary evidence that Lu and Yb could be chromatographically separated if this migration process could be sped up, such as through stronger extractants, faster kinetics, and/or higher flowrates.

Example 7

As described in the preceding Examples, ion exchange resins having strong affinity for metals to be purified and/or that exhibit slow extraction of metals therefrom may cause slow migration of the metals to be purified down the chromatographic column. Accordingly, in this Example, different ion exchange resins were compared to each other in order to identify ion exchange resins that have an appropriate affinity for such metals and/or that exhibit extraction of such metals at moderate or faster rates.

Six ion exchange resins (Resins A, B, C, D, E, and F) were chosen for evaluation. These ion exchange resins comprised various polymers, had various pore and particle sizes, and had various different types of acidic surface groups (see Table 2). It is believed that ion exchange resins with smaller particle diameters and larger pore sizes should have faster kinetics. It is also believed that ion exchange resins comprising the relatively weaker carboxylate functional group should have lower affinity for the metals tested here than the relatively stronger sulfonate functional group.

TABLE 2

| Resin Type | Polymer | Functional Group | Number Average Particle Size | Number Average Pore Size | Bed Density | Binding Capacity |
| --- | --- | --- | --- | --- | --- | --- |
| A (Amberlyst 15) | Styrene divinylbenzene | Sulfonate | 743.5 microns | 30 nm | 0.61 g/mL | 2867 μeq/mL, 4700 μeq/g |
| B | Styrene divinylbenzene | Sulfonate | 80 microns | 10 s of nm | 0.80 g/mL | 1500 μeq/mL, 1875 μeq/g |
| C | Polyvinyl acrylamide | Sulfonate | 85 ± 15 microns | ~100 nm | 0.22 g/mL | 120 ± 30 μeq/mL, 557 μeq/g |
| D | Methacrylate | Carboxylate | 50 microns | 60-90 microns | 0.33 g/mL | 210 ± 40 μeq/mL, 644 μeq/g |
| E | Methacrylate | Sulfonate | 50 microns | 60-90 microns | 0.34 g/mL | 160 ± 40 μeq/mL, 471 μeq/g |
| F | Polyvinyl acrylamide | Sulfonate and carboxylate | 80 microns | >200 microns | 0.19 g/mL | 280 ± 30 μeq/mL, 1452 μeq/g |

The ion exchange resins were first evaluated by measuring the rate of Ho and Nd loading onto the resin surface using tributyl phosphate. $Ho(NO_3)_3 \cdot 5H_2O$ or $Nd(NO_3)_3 \cdot 6H_2O$ was dissolved in tributyl phosphate and hexanes. This mixture was then combined with each ion exchange resin in a separate test tube. The test tubes were shaken, and peak heights associated with Ho (451 nm) or Nd (575 nm) were measured at regular intervals by analyzing the liquid phase with UV Vis spectroscopy. The peak heights were translated to concentrations by comparing with a calibration curve. These experiments were performed in duplicate.

Figure 29:
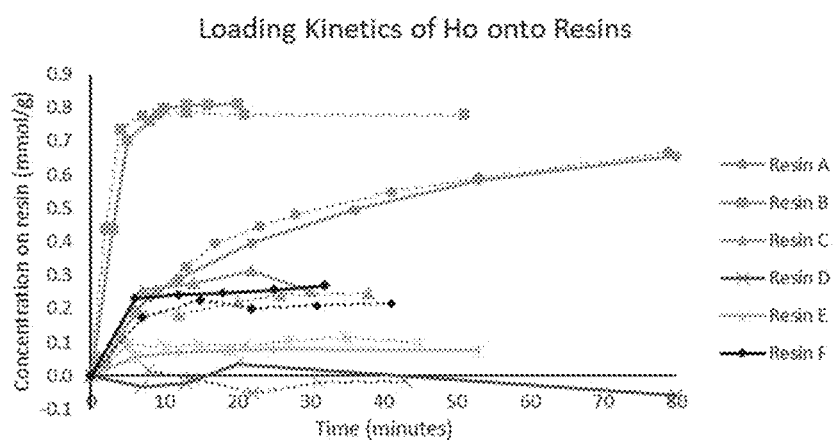
FIG. 29 is a plot showing the loading kinetics of Ho onto various ion exchange resins, in accordance with some embodiments.
Figure 30:
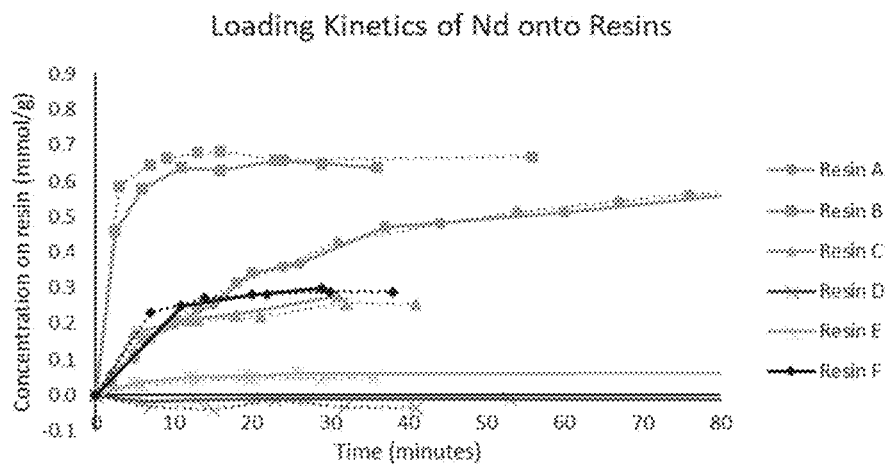
FIG. 30 is a plot showing the loading kinetics of Nd onto various ion exchange resins, in accordance with some embodiments.

The results are shown in FIGS. 29 and 30. From these FIGs., it is clear that Resin A has the slowest loading kinetics of all the resins. The other resins tested all reached equilibrium within 10 minutes, though their kinetics are indistinguishable from each other at this coarse time resolution. The ion exchange resins also have various loading capacities, with Resin B having the highest loading capacity along with Resin A. Based on the performance of Resins D and F, it appears that carboxyl groups load metals less effectively than sulfonate functional groups.

Figure 31:
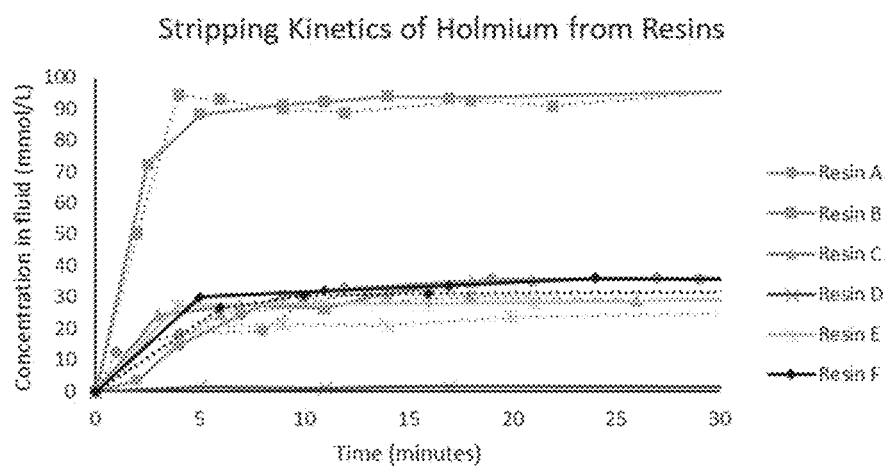
FIG. 31 is a plot showing the stripping kinetics of Ho from various ion exchange resins, in accordance with some embodiments.
Figure 32:
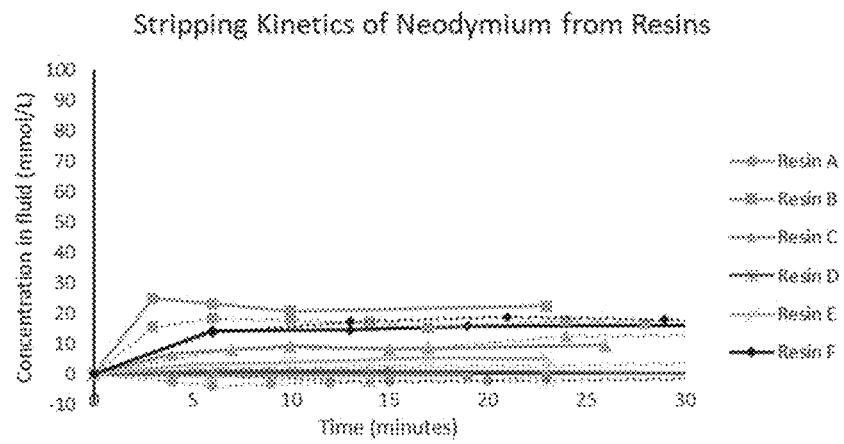
FIG. 32 is a plot showing the stripping kinetics of Nd from various ion exchange resins, in accordance with some embodiments.

Next, each loaded ion exchange resin sample was washed three times with hexanes to remove all of the tributyl phosphate and all of the liquid-phase Ho or Nd (full removal of the liquid-phase Ho or Nd was confirmed by measuring absorbance after washing). The ion exchange resin samples were then combined with HDEHP in hexanes to extract the metals back off of the ion exchange resins. The ion exchange resin samples were shaken and the peak heights were measured at regular time intervals to evaluate the concentration of Ho and Nd in the liquid phase. The duplicate results are shown in FIGS. 31 and 32.

These results show that, of the ion exchange resins tested, Resin B results in the greatest fluid-phase concentration of Ho after stripping. Kinetics cannot be easily distinguished with this coarse time resolution, but it is clear that stripping is complete after 5-10 minutes. Ho was more easily extracted off of the resin compared to Nd, possibly due to its greater affinity with HDEHP. The kinetics of Ho and Nd cannot be compared because of low time resolution in these tests.

Example 8

This Example describes the measurement of the separation factors for pairs of lanthanides employing Resin B from Example 7 and HDEHP. The lanthanides tested included Ho, Er, and Nd and the experiments were performed in hexanes.

The setup employed involved two syringe pumps, one to deliver hexanes as a solvent, and one to deliver HDEHP. The two streams came together, were mixed in a premixer to achieve a single phase, and then flowed through a cell containing a bed of packed ion exchange resin (see FIG. 33). The ion exchange resin had been pre-loaded with Ho and Er or Ho and Nd. The outlet fractions were collected in a series of test tubes, and metal concentrations were measured using UV Vis spectroscopy.

The flowrates of each pump were set to achieve a 6 minute residence time in the ion exchange resin bed, and therefore achieve full equilibrium stripping of Ho and Er. The experiment was repeated at different concentrations of HDEHP in hexanes to evaluate the impact on Ho/Er or Ho/Nd separation. Each test was performed in duplicate. The results are shown in FIGS. 34-39.

Separation factors of 2.2-3.5 were observed for Ho and Er. Lower concentrations were observed to result in higher separation factors, but higher concentrations were observed to result in faster extraction. The 2 mol/L condition resulted in slightly slower extraction, possibly due to the high viscosity of the mixture reducing mass transfer rates. For Ho and Nd separation, it was apparent that very little Nd was extracted due to its low affinity for HDEHP. From these results, it was apparent that Resin B has satisfactory performance in terms of kinetics, metal affinity, and separation.

Example 9

This Example describes the measurement of the separation factors for Yb and Lu employing Resin B from Example 7 and HDEHP or EHEHPA. A sample of Resin B was loaded with Yb and Lu, and the metals were stripped off of the resin using HDEHP. ICP MS was employed to analyze Lu and Yb concentration. The experiment was repeated at several concentrations of HDEHP, and one concentration of EHEHPA. The results are shown in FIGS. 40-43. The Lu and Yb separation factors with HDEHP were found to be approximately 1.5-1.7. The Yb and Lu separation factors with EHEHPA were found to be about the same.

Example 10

This Example describes the development of a prototype column chromatography system for the purification of Yb and Lu.

Figure 33:
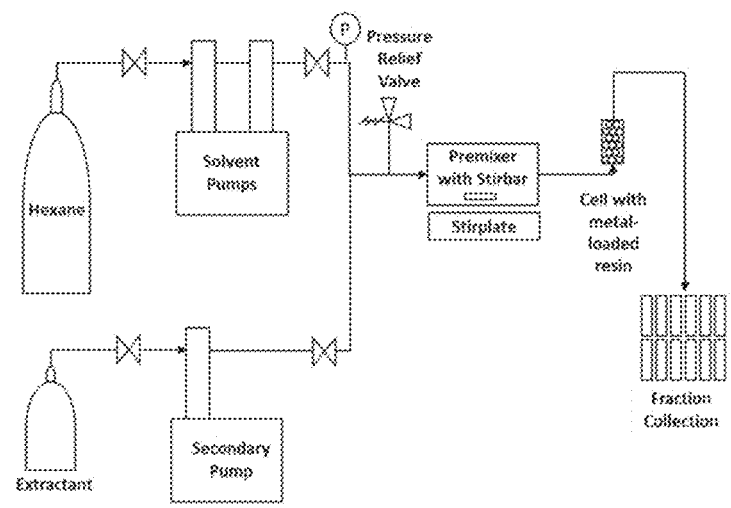
Figure 34:
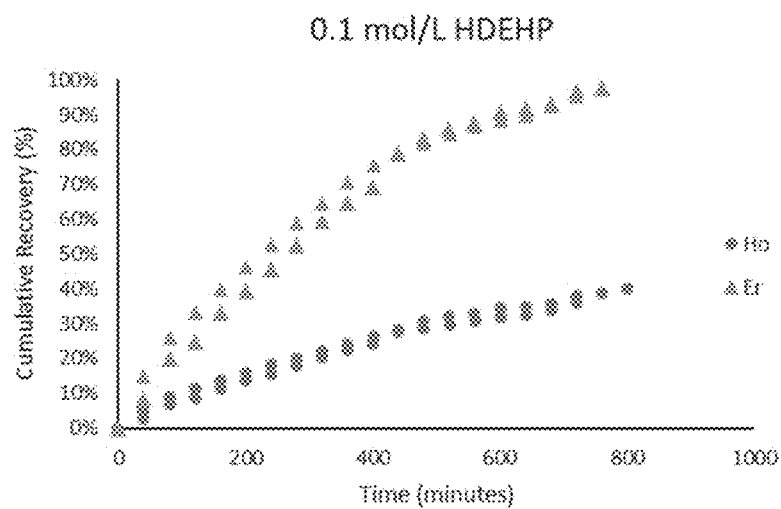
FIGS. 34-37 are plots showing the recovery of Ho and Er from an ion exchange resin, in accordance with some embodiments.
Figure 35:
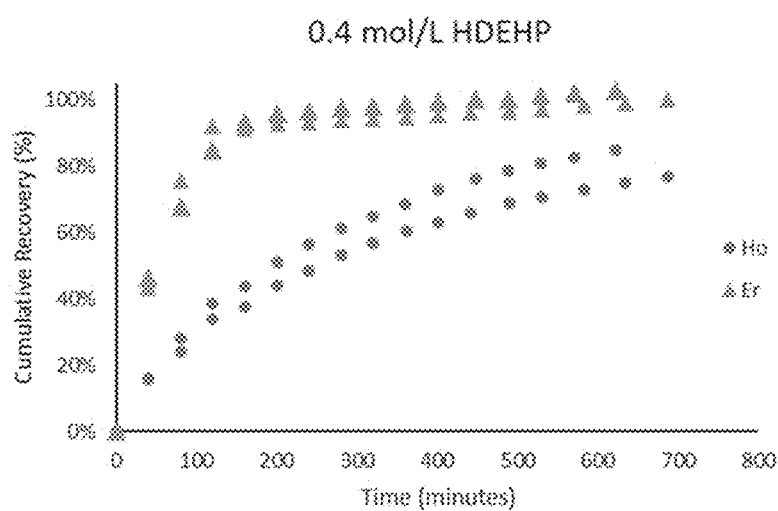
Figure 36:
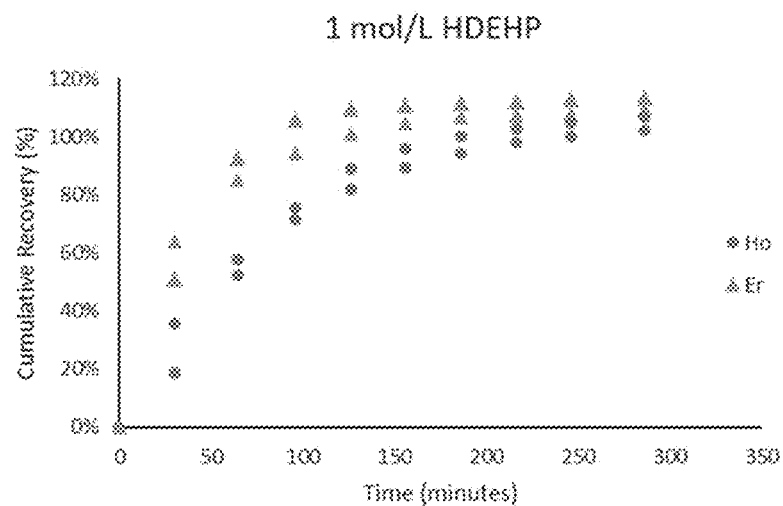
Figure 37:
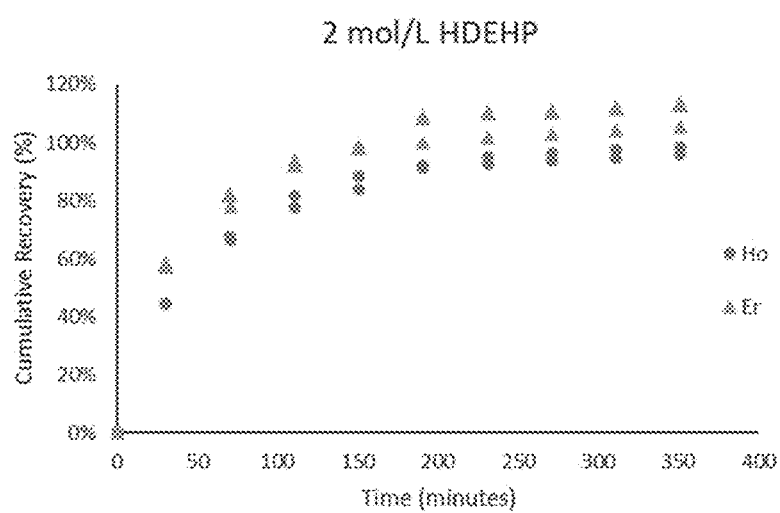
Figure 38:
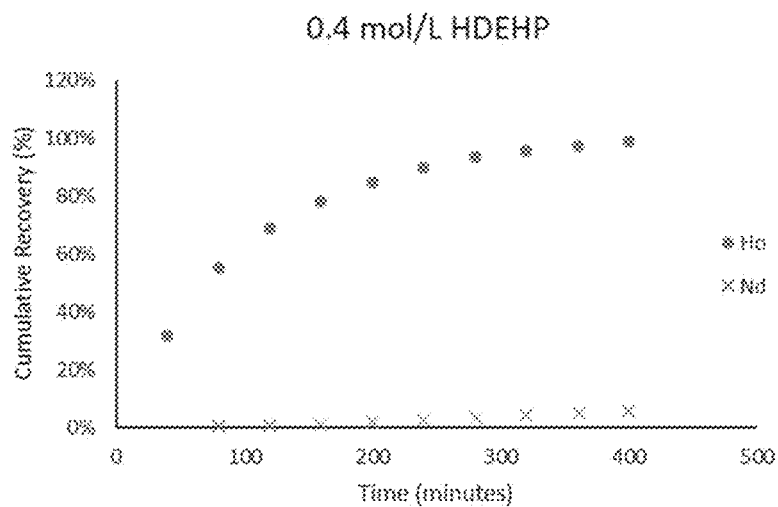
FIGS. 38-39 are plots showing the recovery of Ho and Nd from an ion exchange resin, in accordance with some embodiments.
Figure 39:
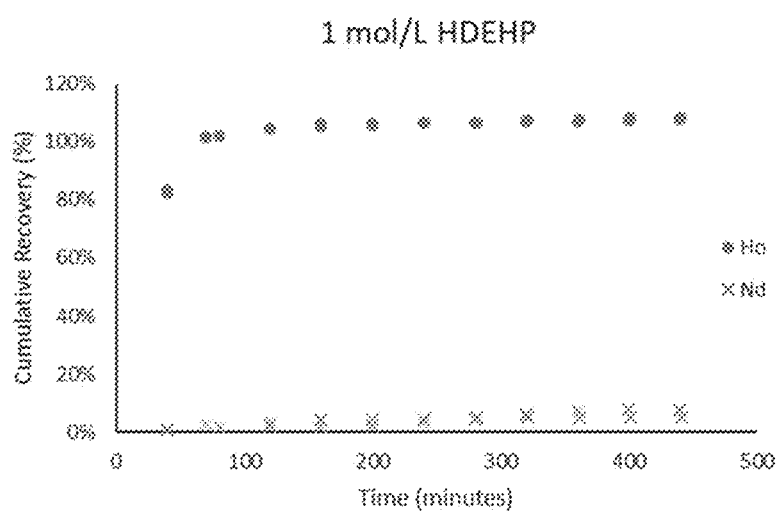
Figure 40:
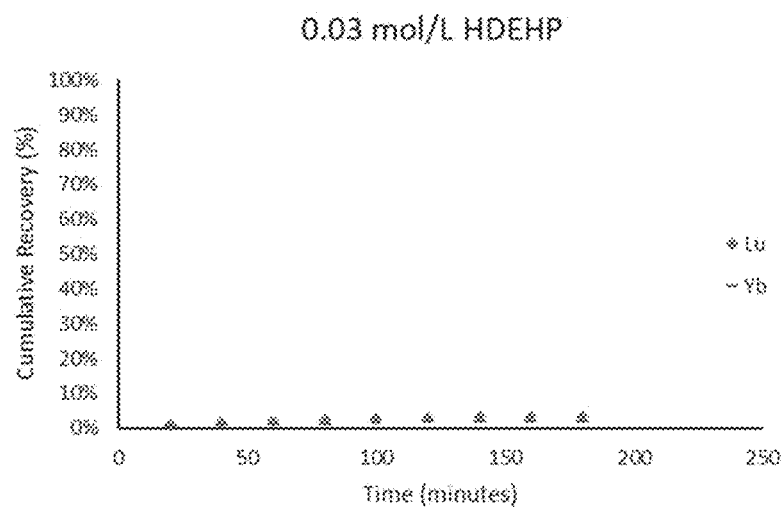
FIGS. 40-43 are plots showing the recovery of Lu and Yb from an ion exchange resin, in accordance with some embodiments.
Figure 41:
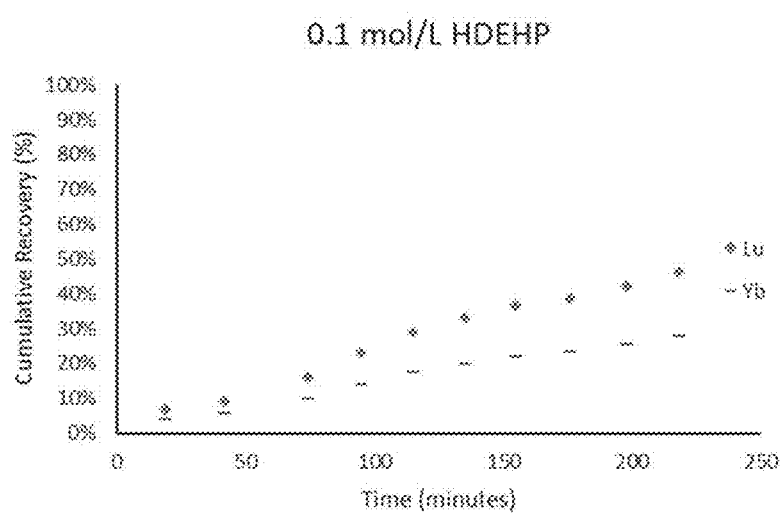
Figure 42:
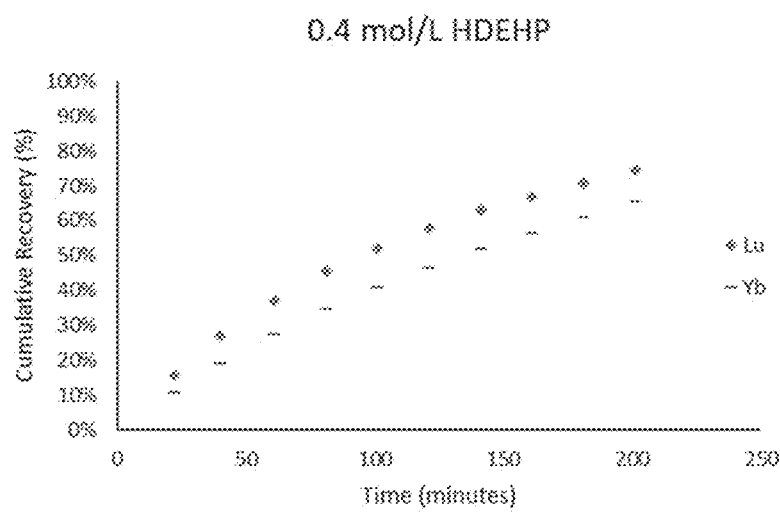
Figure 43:
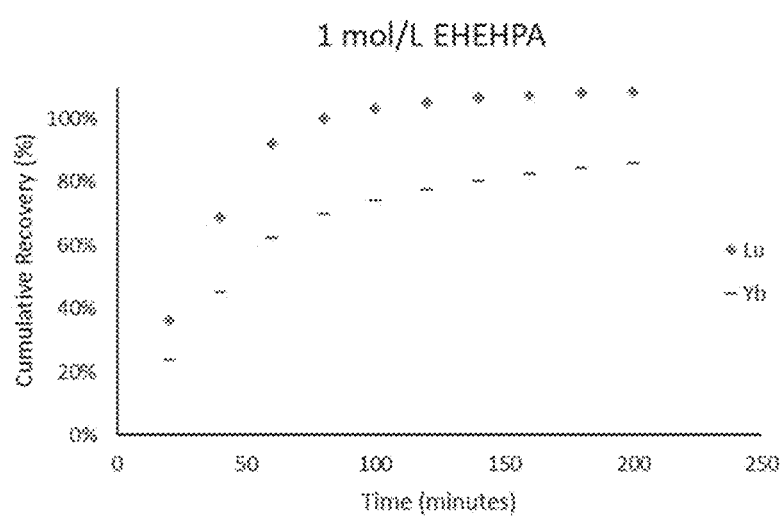

The system shown in FIG. 33 was modified by:

Replacing the stirred premixer with an in-line mixer;

Replacing the cell with a column containing an ion exchange resin in its protonated form. This column was approximately 16 inches long unless otherwise indicated; and Adding a six-way valve for sample injection. Using this six-way valve, 1-20 mg of metal dissolved in HDEHP hexanes could be injected into the system.

Figure 44:
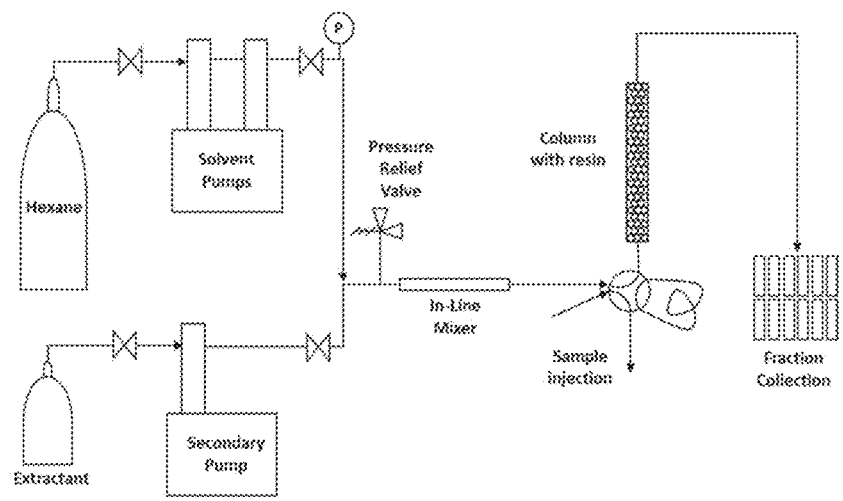
FIG. 44 shows a system for selectively recovering a target metal from an ion exchange resin, in accordance with some embodiments.
Figure 45:
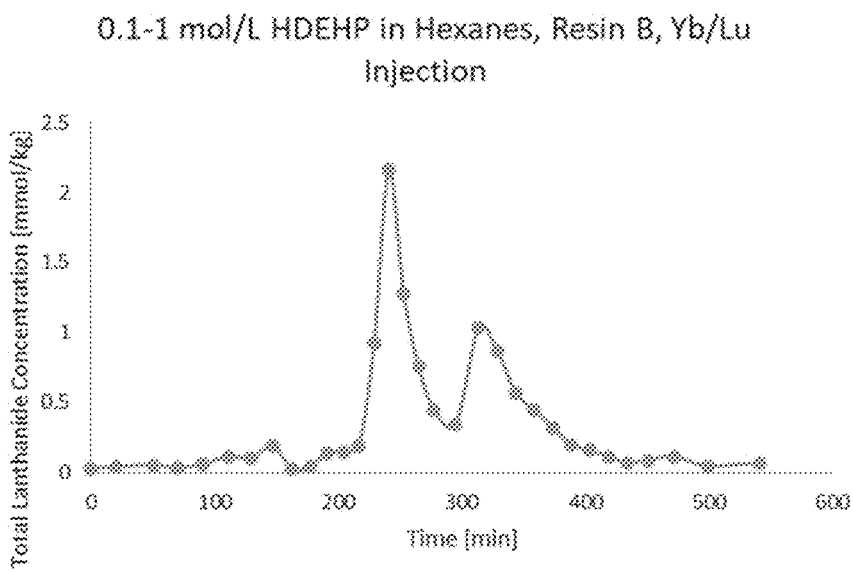
FIGS. 45-56 are plots showing the recoveries of various metals from various resins under various experimental conditions, in accordance with some embodiments.
Figure 46:
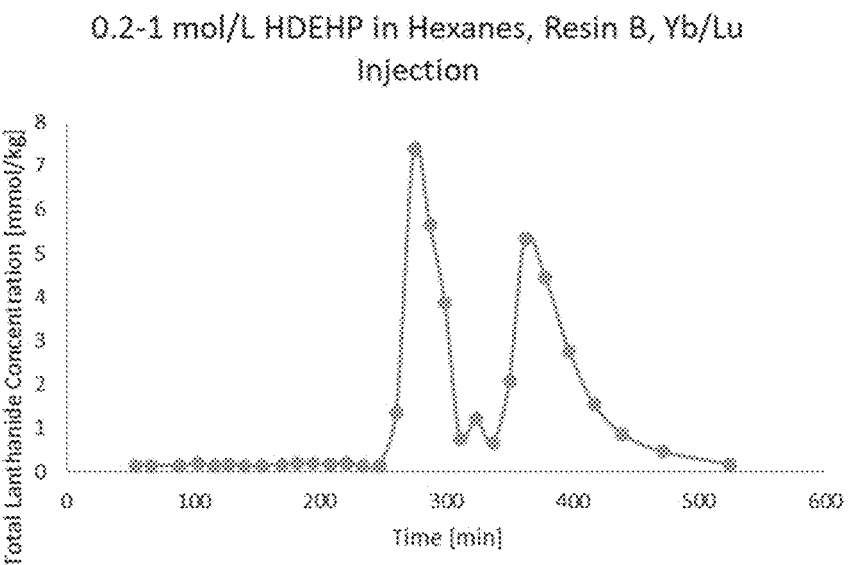
Figure 47:
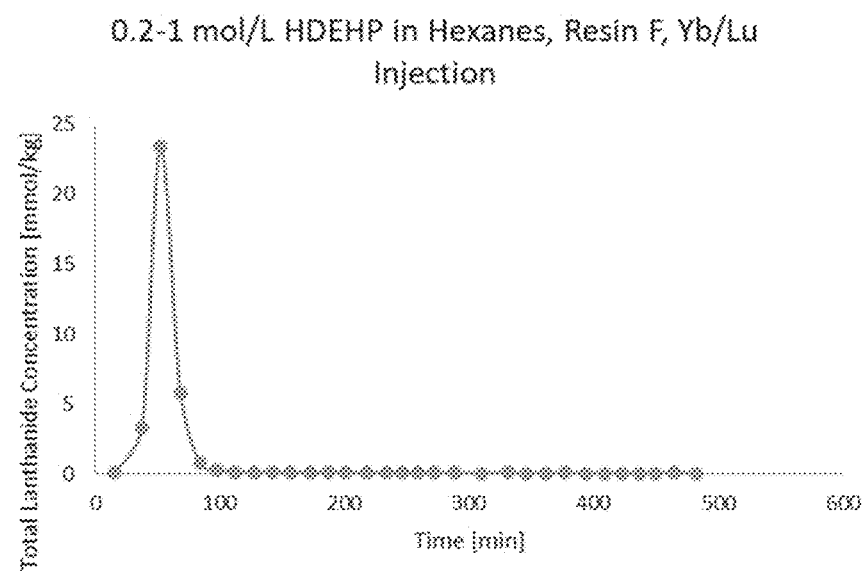
Figure 48:
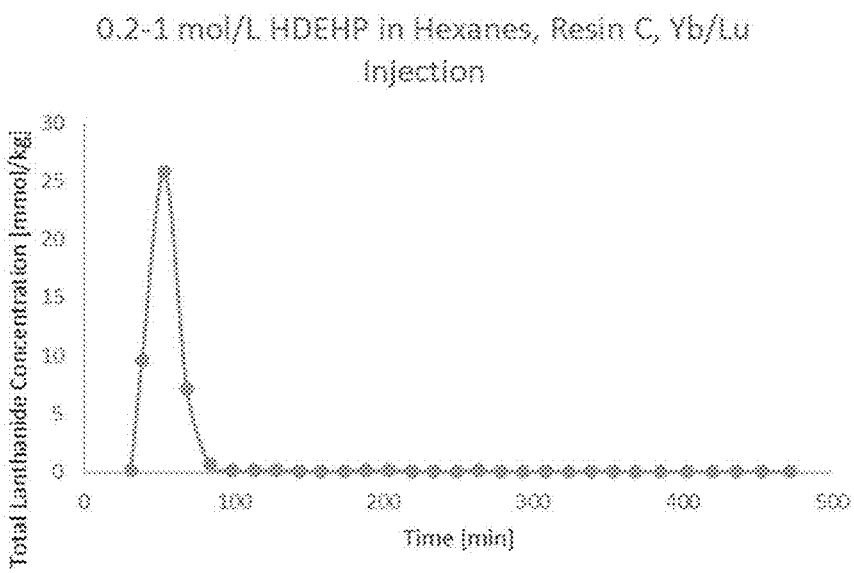
Figure 49:
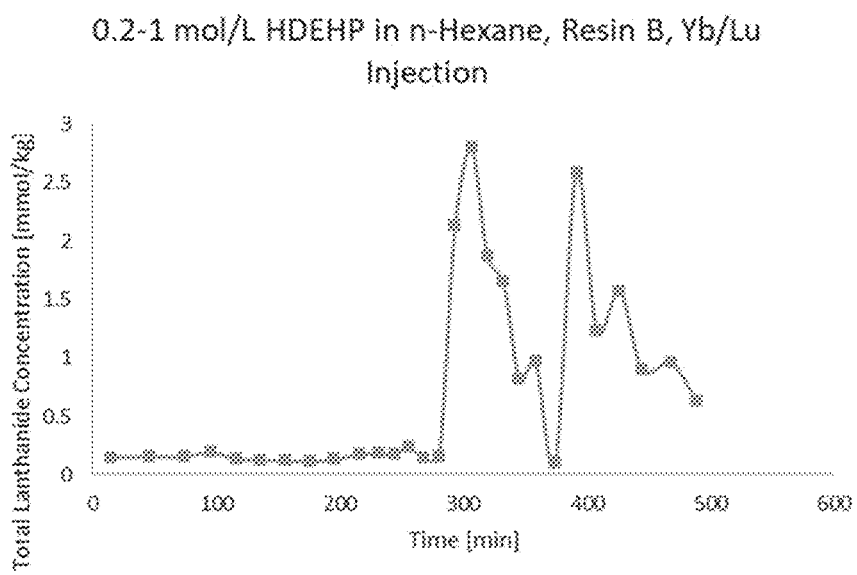
Figure 50:
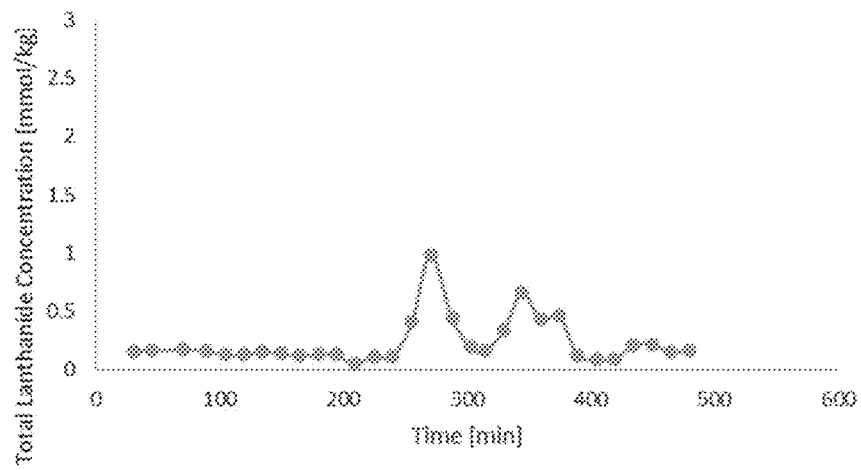
Figure 51:
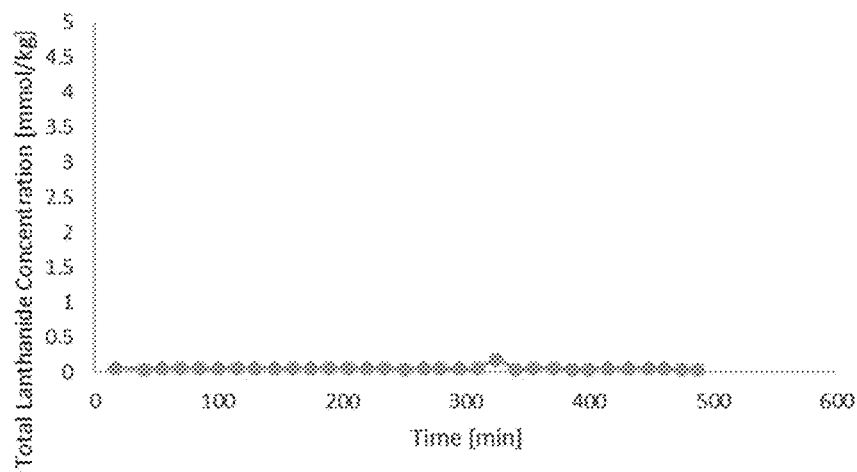
Figure 52:
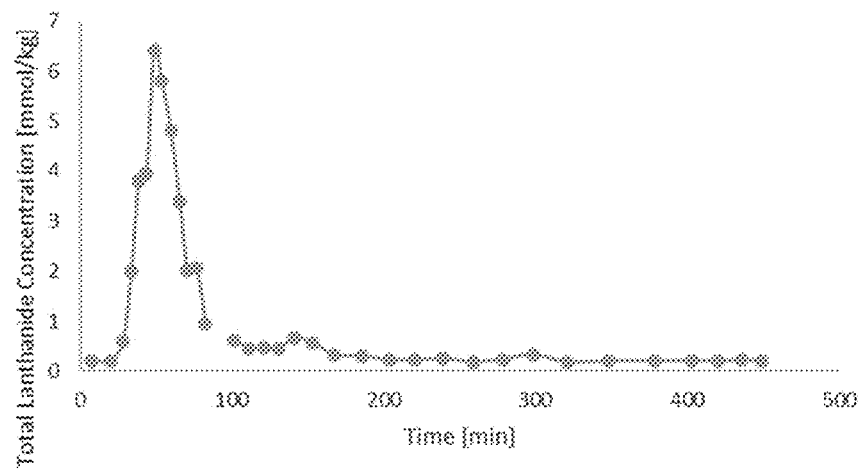
Figure 53:
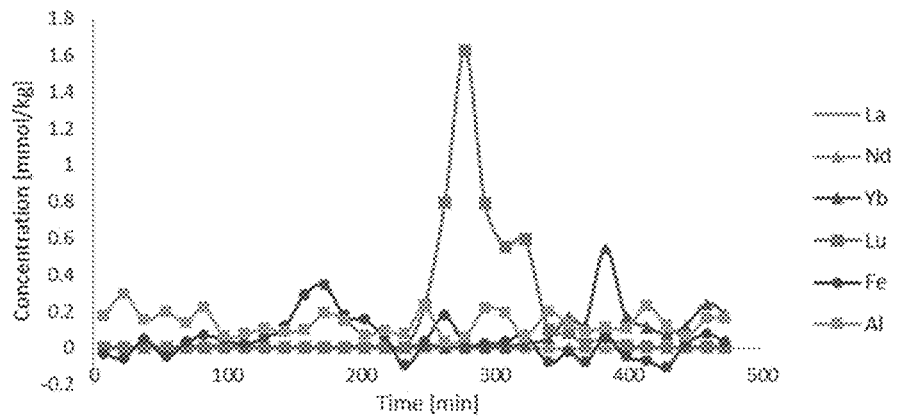
Figure 54:
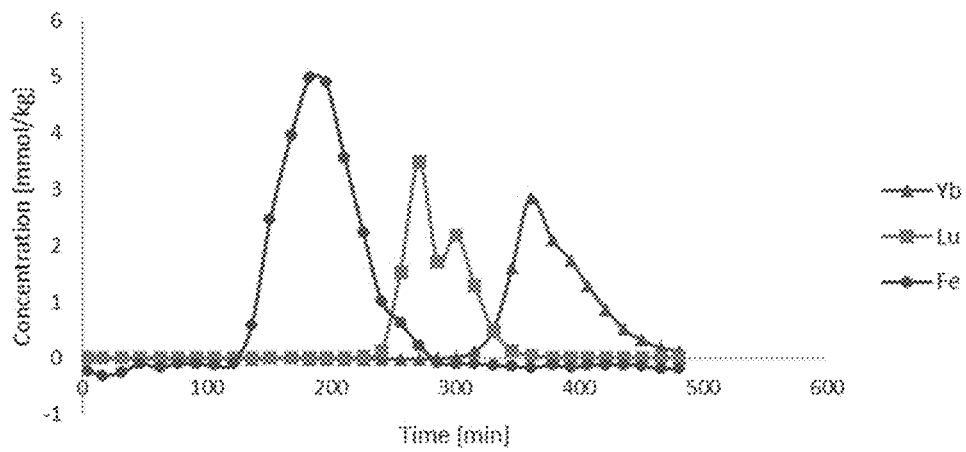
Figure 55:
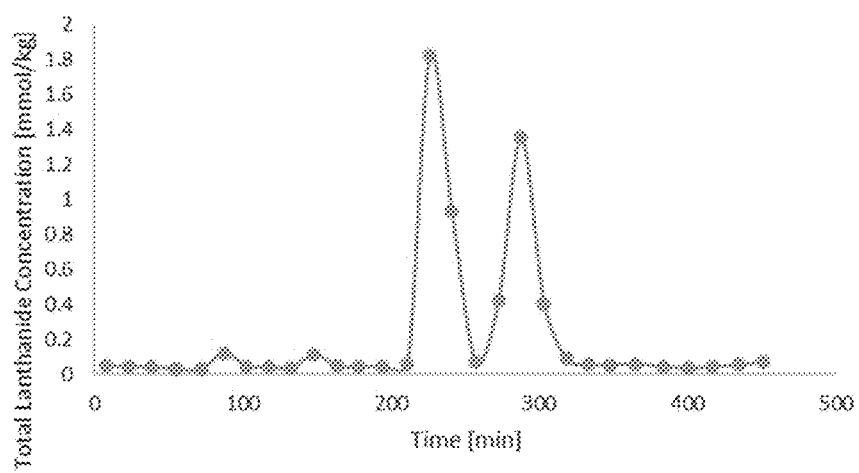
Figure 56:
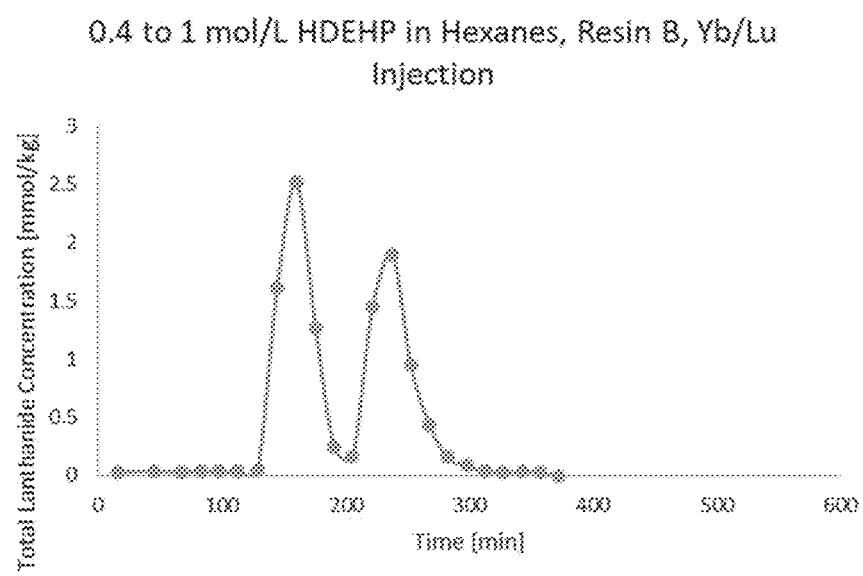

The modified system is shown in FIG. 44. To perform a run, first, a flow of solvent (e.g., hexanes) and extractant (e.g., HDEHP and/or EHEHPA) may be initiated through the column at approximately 0.15 mL/min at an extractant concentration, for example 0.1 mol/L. Then, a composition comprising a mixture of Yb and Lu may be injected into the system using the injection valve. The flowrates may be adjusted over a set time interval such that the extractant concentration is increased in a linear fashion. Samples may be collected at the outlet of the column and analyzed using Arzenazo III dye (a lanthanide-sensitive colorimetric dye) and/or UV Vis spectroscopy. It is believed that this method can detect total lanthanide concentrations but cannot distinguish between various metals.

Various conditions were tested and analyzed to determine their effects on Yb and Lu purification. These conditions are listed in Table 3 and the elution curves are shown in FIGS. 45-56.

TABLE 3

| Test No. | Extractant Concentration Ramp | Injected Sample Composition | Solvent | Solvent Flow Rate | Resin (as described in Example 7) |
|---|---|---|---|---|---|
| 1 | 0.1 to 1 mol/L HDEHP over 300 minutes | 2.1 mg Yb, 2.6 mg Lu | Hexanes | 0.15 mL/min | Resin B |

TABLE 3-continued

| Test No. | Extractant Concentration Ramp | Injected Sample Composition | Solvent | Solvent Flow Rate | Resin (as described in Example 7) |
|---|---|---|---|---|---|
| 2 | 0.2 to 1 mol/L HDEHP over 300 minutes | 5.3 mg Yb, 6.5 mg Lu | Hexanes | 0.15 mL/min | Resin B |
| 3 | 0.2 to 1 mol/L HDEHP over 300 minutes | 7.3 mg Yb, 6.5 mg Lu | Hexanes | 0.15 mL/min | Resin F |
| 4 | 0.2 to 1 mol/L HDEHP over 300 minutes | 6.5 mg Yb, 6.3 mg Lu | Hexanes | 0.15 mL/min | Resin C |
| 5 | 0.2 to 1 mol/L HDEHP over 300 minutes | 6.5 mg Yb, 6.3 mg Lu | n-hexane | 0.15 mL/min | Resin B |
| 6 | 0.2 to 1 mol/L ammonium-substituted HDEHP over 300 minutes | 2.1 mg Yb, 6.3 mg Lu | Hexanes | 0.15 mL/min | Resin B |
| 7 | 0.2 to 1 mol/L EHEHPA over 300 minutes | 2.1 mg Yb, 2.3 mg Lu | Hexanes | 0.15 mL/min | Resin B |
| 8 | 0.2 to 1 mol/L HDEHPA over 300 minutes | 2.4 mg La, 2.1 mg Nd, 2.3 mg Ho, 2.5 mg Yb, 2.0 mg Lu | Hexanes | 0.15 mL/min | Resin B |
| 9 | 0.2 to 1 mol/L HDEHPA over 300 minutes | 0.1 mg Fe, 0.4 mg La, 1.0 mg Nd, 2.1 mg Yb, 2.3 mg Lu | Hexanes | 0.15 mL/min | Resin B |
| 10 | 0.2 to 1 mol/L HDEHPA over 300 minutes | 3.0 mg Fe, 3.6 mg Yb, 3.4 mg Lu | Hexanes | 0.15 mL/min | Resin B |
| 11 | 1 mol/L EHEHPA to 1 mol/L HDEHP over 300 minutes | 2.3 mg Yb, 2.1 mg Lu | Hexanes | 0.15 mL/min | Resin B |
| 12 | 0.4 to 1 mol/L HDEHPA over 300 minutes | 2.3 mg Yb, 2.1 mg Lu | Hexanes | 0.15 mL/min | Resin B |

The elution curves from Tests 1 and 2 show distinct peaks corresponding to the elution of Lu (first peak) and Yb (second peak).

The elution curves from Tests 3 and 4 display single peaks at break times earlier than those from Tests 1 and 2. It is believed that this effect is cause by low uptake of the metals on the ion exchange resins employed in Tests 3 and 4 and/or poor separation factors The elution curve from Test 5 indicates that n-hexane behaves similarly to mixed hexanes in the experimental conditions tested here.

The ammonium-substituted HDEHP employed in Test 6 was prepared by adding ammonium hydroxide to HDEHP. The ammonium substitution caused the Yb and Lu elution peaks to be shorter than those generated by employing non-ammonium-substituted HDEHP.

This may indicate that the ammonium substitution decreases the ability of HDEHP to extract metals from ion exchange resins.

No elution peaks were observed for Test 7. It is possible that EHEHPA is a weaker extractant than HDEHP, and so is unable to transport any metals it extracts all the way to the column outlet. It is possible that performing extraction in the presence of larger concentrations of EHEHPA and/or in the presence of both EHEHPA and a stronger extractant may result in better performance, as shown in Test 11.

Tests 8-10 were performed in the presence of a composition comprising more metals than those in Tests 1-7. Test 8 showed that Resin F was ineffective at purifying metals under such conditions. The elution large peak at 250-350 minutes in Test 9 is due to Lu elution. The later Yb peak is small, and the La and Nd peaks are not visible. In Test 10, in which the concentrations of Yb, Lu, and Fe were higher, Fe was observed to elute first, followed by Yb and then Lu.

Test 11 showed differential elution of Yb and Lu, with both eluting between 200 and 350 minutes.

Test 12 showed differential elution of Yb and Lu. Lu eluted between 100 and 200 minutes, and Yb eluted at between 200 and 300 minutes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of selectively recovering a first metal from an ion exchange resin, comprising:
    contacting a non-polar fluid and an extractant with the ion exchange resin, the first metal, and a second metal, wherein at least one of the first metal and the second metal are bound to the ion exchange resin, wherein the ion exchange resin comprises a plurality of functional groups having a proton dissociation constant of greater than or equal to $10^{-5}$ and less than or equal to $10^4$; and
    selectively eluting the first metal from the ion exchange resin into the non-polar fluid such that a ratio of the first metal to the second metal in the non-polar fluid is greater than a ratio of the first metal to the second metal bound to the ion exchange resin,
    wherein the extractant comprises a phosphoric acid, a phosphoric acid ester that serves as a source of a proton and/or serves as a source of an anion, a phosphonic acid, a phosphinic acid, a monothiophosphinic acid, and/or a dithiophosphinic acid, and
    wherein the ion exchange resin is a macroporous resin that comprises rigid pores.

2. The method of claim 1, wherein the contacting step comprises introducing the non-polar fluid and the extractant into a column containing the ion exchange resin, the first metal, and the second metal; wherein the non-polar fluid and the extractant are made to flow through the column; and wherein the first metal is selectively eluted from the ion exchange resin such that a ratio of the first metal to the second metal in the non-polar fluid exiting the column is greater than a ratio of the first metal to the second metal in the column.

3. The method of claim 1, wherein at least one of the first metal and the second metal is a rare earth metal.

4. The method of claim 1, wherein at least one of the first metal and the second metal is a lanthanide.

5. The method of claim 1, wherein at least one of the first metal and the second metal is in an ionic form.

6. The method of claim 1, wherein at least one of the first metal and the second metal is radioactive.

7. The method of claim 1, wherein at least one of the first metal and the second metal is $^{177}$Lu.

8. The method of claim 1, wherein the non-polar fluid is a supercritical fluid.

9. The method of claim 1, wherein the non-polar fluid comprises $CO_2$.

10. The method of claim 1, wherein the non-polar fluid comprises one or more organic solvents.

11. The method of claim 1, wherein the non-polar fluid comprises one or more alkanes.

12. The method of claim 1, wherein the plurality of functional groups comprises sulfonate functional groups, styrene sulfonate functional groups, carboxylate functional groups, methyl sulfonate functional groups, phosphonate functional groups, phosphinate functional groups, iminodiacetate functional groups, methyl phosphonate functional groups, aminophosphonate functional groups, and/or thiourea functional groups.

13. The method of claim 1, wherein the ion exchange resin comprises styrene divinylbenzene, polyvinyl acrylamide, vinyl acrylamide, and/or a methacrylate polymer.

14. The method of claim 1, wherein the phosphoric acid ester comprises bis(2-ethylhexyl) phosphate.

15. The method of claim 1, wherein the phosphonic acid comprises 2-ethylhexylphosphonic acid mono-2-ethylhexyl ester.

16. The method of claim 1, wherein contacting the non-polar fluid and the extractant with the ion exchange resin comprises introducing the non-polar fluid and the extractant into a column comprising the ion exchange resin, the first metal, and the second metal, and wherein an initial concentration of the extractant in the non-polar fluid during introduction of the non-polar fluid to the column is greater than or equal to 50 mmol/L and less than or equal to 3000 mmol/L.

17. The method of claim 1, wherein a column contains the ion exchange resin, the first metal, and the second metal, and wherein the non-polar fluid experiences a superficial velocity in the column of greater than or equal to 0.1 cm/min and less than or equal to 300 cm/min.

18. The method of claim 1, wherein contacting the non-polar fluid and the extractant with the ion exchange resin comprises introducing the non-polar fluid and the extractant into a column containing the ion exchange resin, the first metal, and the second metal, and wherein a concentration of the extractant in the non-polar fluid being introduced is varied with time.

19. The method of claim 1, wherein at least one of the first metal and the second metal is $^{149}$Sm, $^{148}$Sm, $^{150}$Sm, or $^{153}$Sm.

20. The method of claim 1, wherein at least one of the first metal and the second metal is $^{161}$Ho or $^{166}$Ho.

21. The method of claim 1, wherein at least one of the first metal and the second metal is $^{161}$Tb or $^{149}$Tb.

22. The method of claim 1, wherein the plurality of functional groups comprises functional groups initially bound to displaceable ions that are replaced in use by the first metal or the second metal.

23. The method of claim 22, wherein the displaceable ions comprise protons, sodium ions, potassium ions, and/or ammonium ions.

24. A method of selectively recovering a first metal from an ion exchange resin, comprising:

contacting a non-polar fluid and an extractant with the ion exchange resin, the first metal, and a second metal, wherein at least one of the first metal and the second metal are bound to the ion exchange resin, wherein the ion exchange resin comprises a plurality of functional groups having a proton dissociation constant of greater than or equal to $10^{-5}$ and less than or equal to $10^4$; and selectively eluting the first metal from the ion exchange resin into the non-polar fluid such that a ratio of the first metal to the second metal in the non-polar fluid is greater than a ratio of the first metal to the second metal bound to the ion exchange resin, wherein the extractant comprises a phosphoric acid, a phosphoric acid ester that serves as a source of a proton and/or serves as a source of an anion, a phosphonic acid, a phosphinic acid, a monothiophosphinic acid, and/or a dithiophosphinic acid, and wherein the ion exchange resin is a macroporous resin that comprises pores that resist solvent swelling.

25. A method of selectively recovering a first metal from an ion exchange resin, comprising:

contacting a non-polar fluid and an extractant with the ion exchange resin, the first metal, and a second metal, wherein at least one of the first metal and the second metal are bound to the ion exchange resin, wherein the ion exchange resin comprises a plurality of functional groups having a proton dissociation constant of greater than or equal to $10^{-5}$ and less than or equal to $10^4$; and selectively eluting the first metal from the ion exchange resin into the non-polar fluid such that a ratio of the first metal to the second metal in the non-polar fluid is greater than a ratio of the first metal to the second metal bound to the ion exchange resin, wherein the extractant comprises a phosphoric acid, a phosphoric acid ester that serves as a source of a proton and/or serves as a source of an anion, a phosphonic acid, a phosphinic acid, a monothiophosphinic acid, and/or a dithiophosphinic acid, and wherein the ion exchange resin comprises a solid phase having rigid, minimally-swelling macropores.

* * * * *